US008559729B2

(12) United States Patent
Bastos dos Santos et al.

(10) Patent No.: US 8,559,729 B2
(45) Date of Patent: *Oct. 15, 2013

(54) AUTOMATIC FORMS IDENTIFICATION SYSTEMS AND METHODS

(75) Inventors: Jose Eduardo Bastos dos Santos, Shawnee, KS (US); Brian G. Anderson, Overland Park, KS (US); David E. Kelley, Olathe, KS (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,319

(22) Filed: Aug. 6, 2010

(65) Prior Publication Data

US 2011/0123123 A1 May 26, 2011

Related U.S. Application Data

(63) Continuation of application No. 12/059,847, filed on Mar. 31, 2008.

(51) Int. Cl.
*G06K 9/46* (2006.01)

(52) U.S. Cl.
USPC ........... 382/203; 382/100; 382/181; 382/209; 382/216; 382/217; 382/305; 382/306; 715/221; 715/224; 715/226

(58) Field of Classification Search
USPC ................ 382/100, 112, 181, 183, 203, 209, 382/216–218, 229, 305, 306; 715/221, 224, 715/226
See application file for complete search history.

(56) References Cited

U.S. PATENT DOCUMENTS

| | | | | |
|---|---|---|---|---|
| 4,933,979 | A * | 6/1990 | Suzuki et al. | 382/173 |
| 4,949,392 | A * | 8/1990 | Barski et al. | 382/283 |
| 5,101,448 | A * | 3/1992 | Kawachiya et al. | 382/287 |
| 5,293,429 | A * | 3/1994 | Pizano et al. | 382/202 |
| 5,835,640 | A * | 11/1998 | Clements | 382/289 |
| 5,841,905 | A * | 11/1998 | Lee | 382/203 |
| 5,907,630 | A * | 5/1999 | Naoi et al. | 382/173 |
| 6,721,463 | B2 * | 4/2004 | Naoi et al. | 382/305 |
| 7,142,728 | B2 * | 11/2006 | Wnek | 382/294 |
| 2005/0185841 | A1 * | 8/2005 | Tyan et al. | 382/181 |

* cited by examiner

*Primary Examiner* — Eric Rush

(57) ABSTRACT

Systems and methods automatically generate a model of a form or other document and identify the form or other document. In one aspect, a system and method normalize an image of a document and identify the relative positions of vertical and horizontal lines in the normalized image. The relative positions of vertical and horizontal lines of the normalized image are the model of the document image. The model may be stored in a record, such as an array. The system and method compare the relative positions of vertical and horizontal lines of the model to the relative positions of vertical and horizontal lines of other models to identify a matching model.

34 Claims, 39 Drawing Sheets

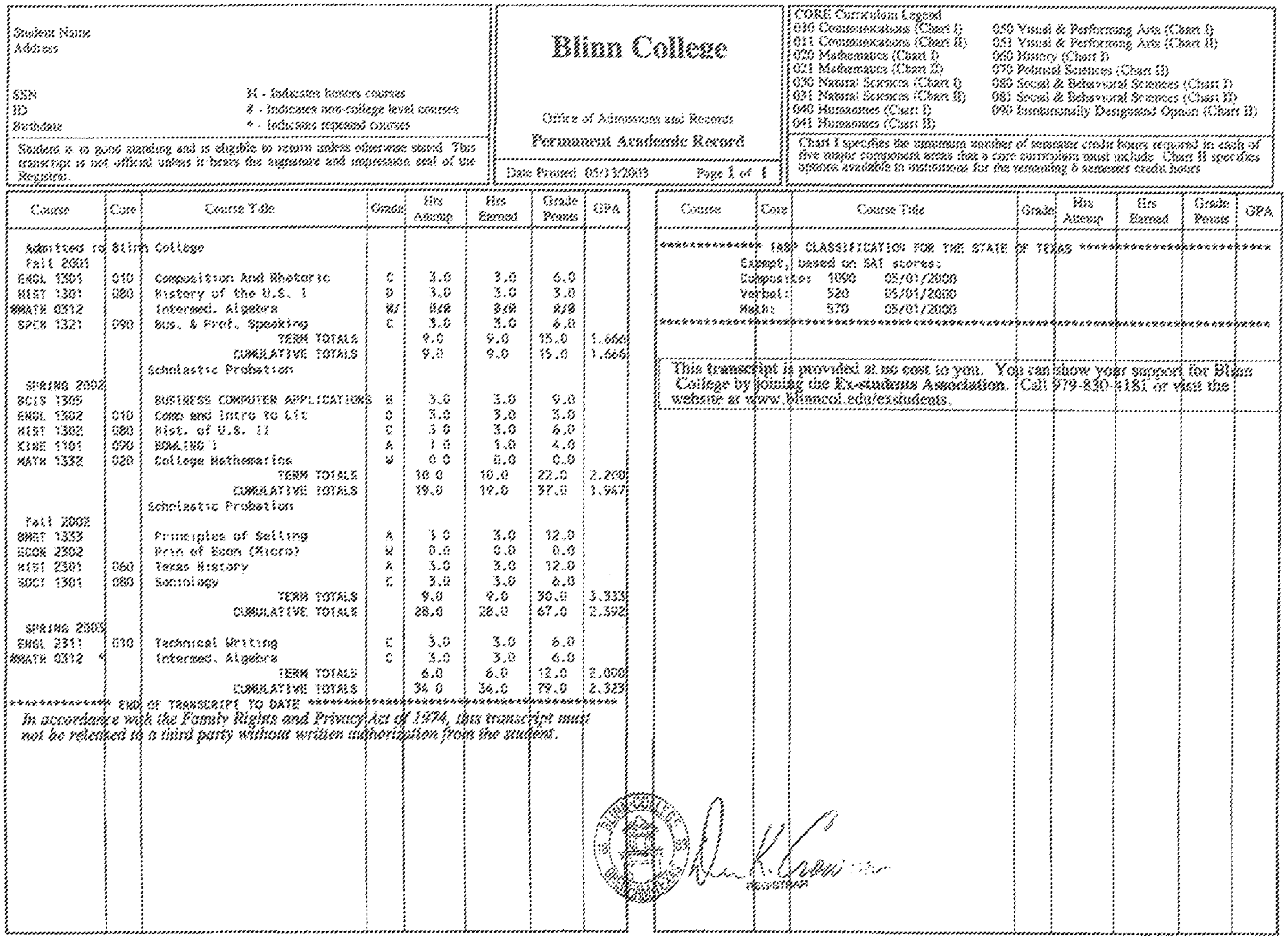

Student Name
Address

SSN
ID
Birthdate

H - Indicates honors courses
- Indicates non-college level courses
* - Indicates repeated courses Student is in good standing and is eligible to return unless otherwise stated. This transcript is not official unless it bears the signature and impression seal of the Registrar.

Blinn College

Office of Admissions and Records

Permanent Academic Record

Date Printed 05/03/2003 Page 1 of 1

CORE Curriculum Legend
010 Communications (Chart I) 050 Visual & Performing Arts (Chart I)
011 Communications (Chart II) 051 Visual & Performing Arts (Chart II)
020 Mathematics (Chart I) 060 History (Chart I)
021 Mathematics (Chart II) 070 Political Sciences (Chart II)
030 Natural Sciences (Chart I) 080 Social & Behavioral Sciences (Chart I)
031 Natural Sciences (Chart II) 081 Social & Behavioral Sciences (Chart II)
040 Humanities (Chart I) 090 Institutionally Designated Option (Chart II)
041 Humanities (Chart II)

Chart I specifies the minimum number of semester credit hours required in each of five major component areas that a core curriculum must include. Chart II specifies options available to institutions for the remaining 6 semester credit hours

| Course | Core | Course Title | Grade | Hrs Attemp | Hrs Earned | Grade Points | GPA |
|---|---|---|---|---|---|---|---|
| Admitted to | | Blinn College | | | | | |
| Fall 2001 | | | | | | | |
| ENGL 1301 | 010 | Composition And Rhetoric | C | 3.0 | 3.0 | 6.0 | |
| HIST 1301 | 080 | History of the U.S. I | D | 3.0 | 3.0 | 3.0 | |
| #MATH 0312 | | Intermed. Algebra | W/ | 0/0 | 0/0 | 0/0 | |
| SPCH 1321 | 090 | Bus. & Prof. Speaking | C | 3.0 | 3.0 | 6.0 | |
| | | TERM TOTALS | | 9.0 | 9.0 | 15.0 | 1.666 |
| | | CUMULATIVE TOTALS | | 9.0 | 9.0 | 15.0 | 1.666 |
| | | Scholastic Probation | | | | | |
| SPRING 2002 | | | | | | | |
| BCIS 1305 | | BUSINESS COMPUTER APPLICATIONS | B | 3.0 | 3.0 | 9.0 | |
| ENGL 1302 | 010 | Comp and Intro to Lit | D | 3.0 | 3.0 | 3.0 | |
| HIST 1302 | 080 | Hist. of U.S. II | C | 3.0 | 3.0 | 6.0 | |
| KINE 1101 | 070 | BOWLING I | A | 1.0 | 1.0 | 4.0 | |
| MATH 1332 | 020 | College Mathematics | W | 0.0 | 0.0 | 0.0 | |
| | | TERM TOTALS | | 10.0 | 10.0 | 22.0 | 2.200 |
| | | CUMULATIVE TOTALS | | 19.0 | 19.0 | 37.0 | 1.947 |
| | | Scholastic Probation | | | | | |
| Fall 2002 | | | | | | | |
| BMGT 1333 | | Principles of Selling | A | 3.0 | 3.0 | 12.0 | |
| ECON 2302 | | Prin of Econ (Micro) | W | 0.0 | 0.0 | 0.0 | |
| HIST 2301 | 060 | Texas History | A | 3.0 | 3.0 | 12.0 | |
| SOCI 1301 | 080 | Sociology | C | 3.0 | 3.0 | 6.0 | |
| | | TERM TOTALS | | 9.0 | 9.0 | 30.0 | 3.333 |
| | | CUMULATIVE TOTALS | | 28.0 | 28.0 | 67.0 | 2.392 |
| SPRING 2003 | | | | | | | |
| ENGL 2311 | 010 | Technical Writing | C | 3.0 | 3.0 | 6.0 | |
| #MATH 0312 | * | Intermed. Algebra | C | 3.0 | 3.0 | 6.0 | |
| | | TERM TOTALS | | 6.0 | 6.0 | 12.0 | 2.000 |
| | | CUMULATIVE TOTALS | | 34.0 | 34.0 | 79.0 | 2.323 |

*********** END OF TRANSCRIPT TO DATE ***********

*In accordance with the Family Rights and Privacy Act of 1974, this transcript must not be released to a third party without written authorization from the student.*

| Course | Core | Course Title | Grade | Hrs Attemp | Hrs Earned | Grade Points | GPA |
|---|---|---|---|---|---|---|---|
| ************* TASP CLASSIFICATION FOR THE STATE OF TEXAS ************* | | | | | | | |
| Exempt, based on SAT scores: | | | | | | | |
| Composite: 1090 05/01/2000 | | | | | | | |
| Verbal: 520 05/01/2000 | | | | | | | |
| Math: 570 05/01/2000 | | | | | | | |

This transcript is provided at no cost to you. You can show your support for Blinn College by joining the Ex-students Association. Call 979-830-4181 or visit the website at www.blinncol.edu/exstudents.

Registrar

FIG. 18

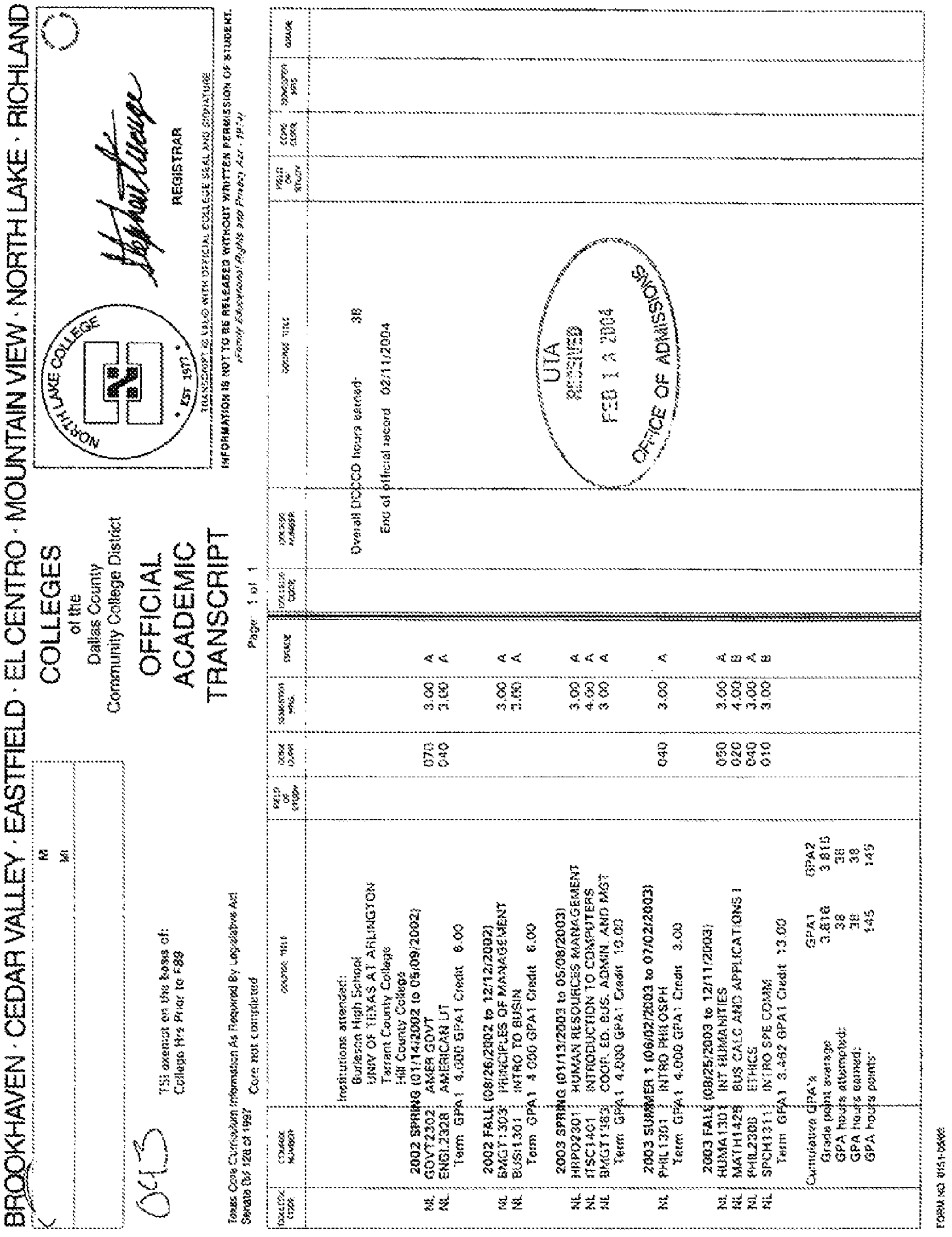
BROOKHAVEN · CEDAR VALLEY · EASTFIELD · EL CENTRO · MOUNTAIN VIEW · NORTH LAKE · RICHLAND COLLEGES of the Dallas County Community College District

OFFICIAL ACADEMIC TRANSCRIPT

Page 1 of 1

NORTH LAKE COLLEGE · EST. 1977 ·

REGISTRAR

INFORMATION IS NOT TO BE RELEASED WITHOUT WRITTEN PERMISSION OF STUDENT.

TSI exempt on the basis of: College hrs Prior to F89

Texas Core Curriculum Information As Required By Legislative Act Senate Bill 148 of 1997

Core not completed

Institutions attended:
Burleson High School
UNIV OF TEXAS AT ARLINGTON
Tarrant County College
Hill County College

| | Course Number | Course Title | Core Code | Semester Hrs | Grade |
|---|---|---|---|---|---|
| | 2002 SPRING | (01/14/2002 to 05/09/2002) | | | |
| NL | GOVT2302 | AMER GOVT | 070 | 3.00 | A |
| NL | ENGL2328 | AMERICAN LIT | 040 | 3.00 | A |
| | | Term GPA1 4.000 GPA1 Credit 6.00 | | | |
| | 2002 FALL | (08/26/2002 to 12/12/2002) | | | |
| NL | BMGT1303 | PRINCIPLES OF MANAGEMENT | | 3.00 | A |
| NL | BUSI1301 | INTRO TO BUSIN | | 3.00 | A |
| | | Term GPA1 4.000 GPA1 Credit 6.00 | | | |
| | 2003 SPRING | (01/13/2003 to 05/08/2003) | | | |
| NL | HRPO2301 | HUMAN RESOURCES MANAGEMENT | | 3.00 | A |
| NL | ITSC1401 | INTRODUCTION TO COMPUTERS | | 4.00 | A |
| NL | BMGT1385 | COOP. ED. BUS. ADMIN. AND MGT | | 3.00 | A |
| | | Term GPA1 4.000 GPA1 Credit 10.00 | | | |
| | 2003 SUMMER 1 | (06/02/2003 to 07/02/2003) | | | |
| NL | PHIL1301 | INTRO PHILOSPH | 040 | 3.00 | A |
| | | Term GPA1 4.000 GPA1 Credit 3.00 | | | |
| | 2003 FALL | (08/25/2003 to 12/11/2003) | | | |
| NL | HUMA1301 | INT HUMANITIES | 050 | 3.00 | A |
| NL | MATH1425 | BUS CALC AND APPLICATIONS I | 020 | 4.00 | B |
| NL | PHIL2306 | ETHICS | 040 | 3.00 | A |
| NL | SPCH1311 | INTRO SPE COMM | 010 | 3.00 | B |
| | | Term GPA1 3.462 GPA1 Credit 13.00 | | | |

| Cumulative GPA's | GPA1 | GPA2 |
|---|---|---|
| Grade point average | 3.816 | 3.816 |
| GPA hours attempted | 38 | 38 |
| GPA hours earned | 38 | 38 |
| GPA hours points | 145 | 145 |

Overall DCCCD hours earned 38

End of official record 02/11/2004

UTA RECEIVED FEB 1 3 2004 OFFICE OF ADMISSIONS

FIG. 19

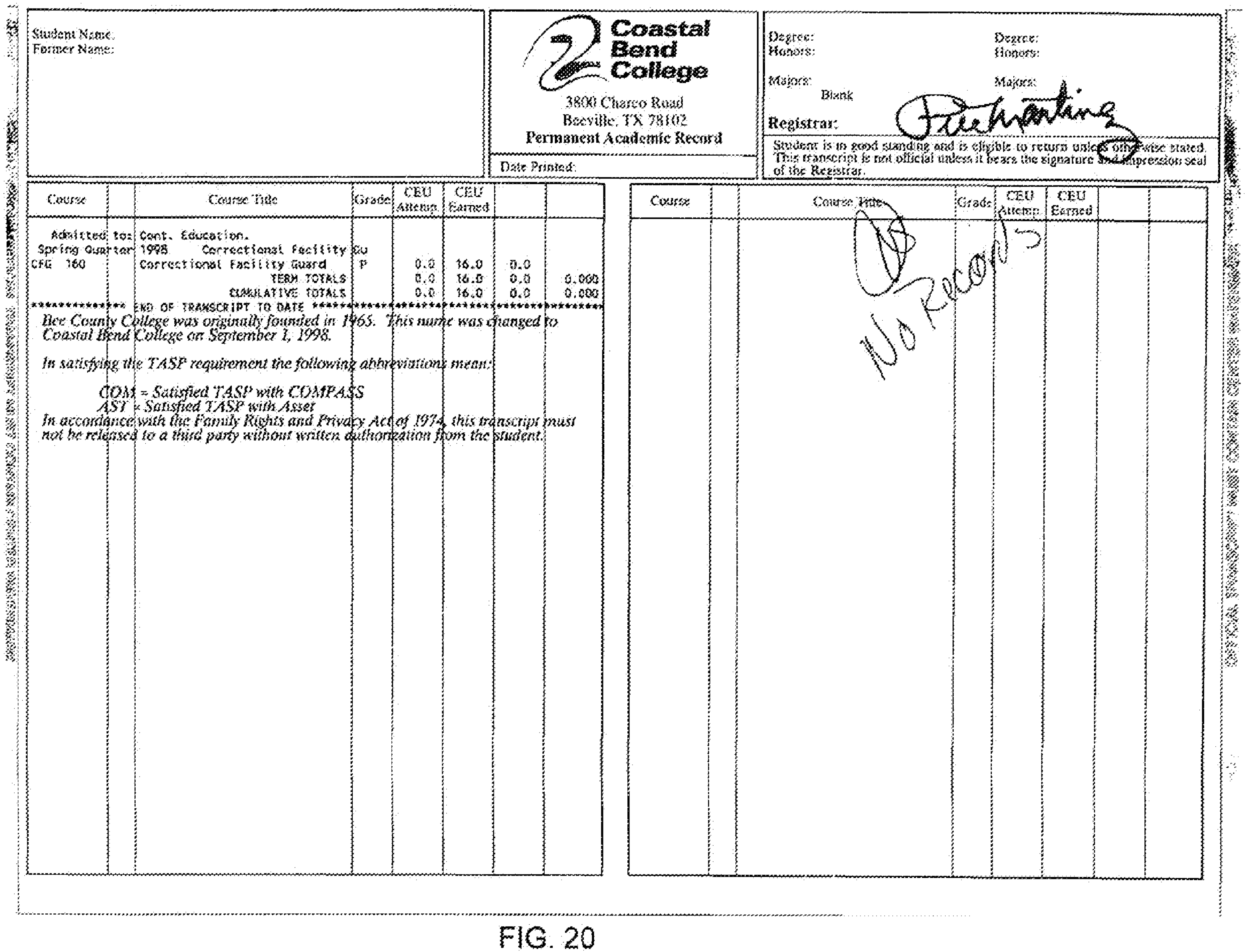

Student Name:
Former Name:

Coastal Bend College
3800 Charco Road
Beeville, TX 78102
Permanent Academic Record Date Printed:

Degree:
Honors:
Majors:
Blank

Degree:
Honors:
Majors:

Registrar:

Student is in good standing and is eligible to return unless otherwise stated. This transcript is not official unless it bears the signature and impression seal of the Registrar.

| Course | | Course Title | Grade | CEU Attemp. | CEU Earned | | |
|---|---|---|---|---|---|---|---|
| Admitted to: | | Cont. Education. | | | | | |
| Spring Quarter | | 1998 Correctional Facility Gu | | | | | |
| CFG 160 | | Correctional Facility Guard | P | 0.0 | 16.0 | 0.0 | |
| | | TERM TOTALS | | 0.0 | 16.0 | 0.0 | 0.000 |
| | | CUMULATIVE TOTALS | | 0.0 | 16.0 | 0.0 | 0.000 |

************ END OF TRANSCRIPT TO DATE ************

*Bee County College was originally founded in 1965. This name was changed to Coastal Bend College on September 1, 1998.*

*In satisfying the TASP requirement the following abbreviations mean:*

*COM = Satisfied TASP with COMPASS*
*AST = Satisfied TASP with Asset*

*In accordance with the Family Rights and Privacy Act of 1974, this transcript must not be released to a third party without written authorization from the student.*

| Course | | Course Title | Grade | CEU Attemp. | CEU Earned | | |
|---|---|---|---|---|---|---|---|

No Records

FIG. 20

DEVRY INSTITUTE OF TECHNOLOGY PAGE 1

DeVRY

ACADEMIC TRANSCRIPT

| COURSE | TITLE | GRADE/CR HRS | COURSE | TITLE | GRADE/CR HRS | COURSE | TITLE | GRADE/CR HRS |
|---|---|---|---|---|---|---|---|---|

ENROLLED AT DEVRY-LONG BEACH
SPRING 2002 SECTION 01DDJ1 BS
COLL148 B CRIT THINK/SOLV B 1.00
EET122L A DIGITAL CKTS LB B 1.00
PSYC110 B PRIN OF PSYCHOL A 3.00
MATH150 A COLLEGE ALGEBRA B 4.00
EET122 A DIGITAL CKTS B 4.00
COMP123 A INTRO COMPUT/LB B 4.00
TERM HRS 17.00 PTS 54.00 GPA 3.18
CUM HRS 17.00 PTS 54.00 GPA 3.18

SUMMER 2002 SECTION 02DDJ1 BS
EET108L A DC CKT ANAL LAB X 1.00
EET202L A DIGITAL SYST LB X 1.00
EET108 A DC CKT ANALYSIS X 4.00
EET202 A DIGITAL SYSTEMS X 4.00
MATH185 A PRE CALCULUS X 4.00
ENGL110 A COMPOSITION X 3.00
ENGL110LA COMPOSITION LAB X 1.00
TERM HRS 0.00 PTS 0.00 GPA 0.00
CUM HRS 17.00 PTS 54.00 GPA 3.18

CEASED TO ATTEND

**** END OF TRANSCRIPT ****

DATE PRINTED

UNDER THE FAMILY EDUCATIONAL RIGHTS AND PRIVACY ACT OF 1974 AS AMENDED THE INFORMATION CONTAINED ON THIS TRANSCRIPT MAY NOT BE RELEASED TO ANY OTHER PARTY WITHOUT THE WRITTEN CONSENT OF THE STUDENT

Registrar Clerk

THIS TRANSCRIPT MUST BE VALIDATED WITH AN OFFICIAL'S SIGNATURE AND THE INSTITUTE SEAL

DATE OF ISSUE

FIG. 21

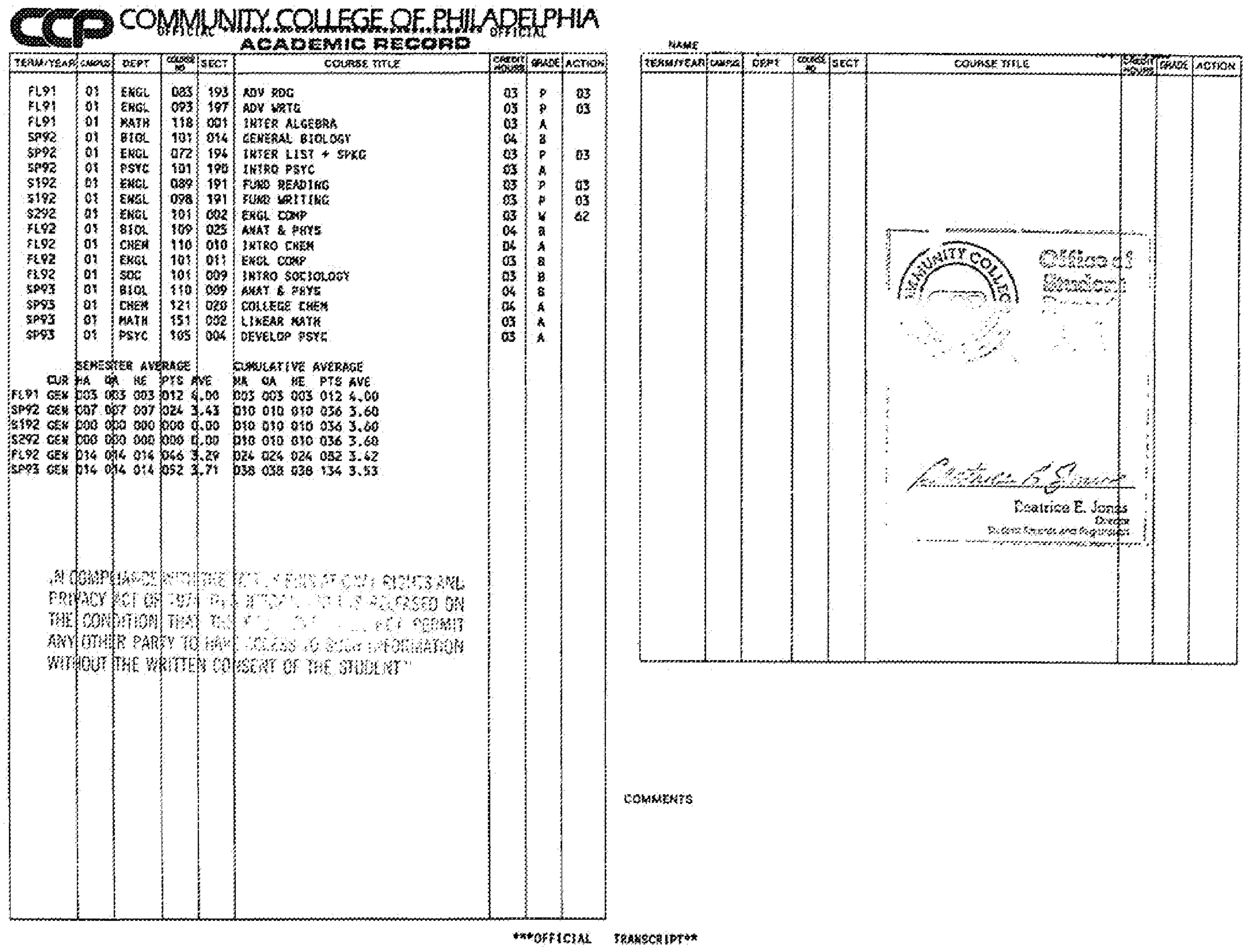

CCP COMMUNITY COLLEGE OF PHILADELPHIA
OFFICIAL OFFICIAL
ACADEMIC RECORD

| TERM/YEAR | CAMPUS | DEPT | COURSE NO | SECT | COURSE TITLE | CREDIT HOURS | GRADE | ACTION |
|---|---|---|---|---|---|---|---|---|
| FL91 | 01 | ENGL | 083 | 193 | ADV RDG | 03 | P | 03 |
| FL91 | 01 | ENGL | 093 | 197 | ADV WRTG | 03 | P | 03 |
| FL91 | 01 | MATH | 118 | 001 | INTER ALGEBRA | 03 | A | |
| SP92 | 01 | BIOL | 101 | 014 | GENERAL BIOLOGY | 04 | B | |
| SP92 | 01 | ENGL | 072 | 194 | INTER LIST + SPKG | 03 | P | 03 |
| SP92 | 01 | PSYC | 101 | 198 | INTRO PSYC | 03 | A | |
| S192 | 01 | ENGL | 089 | 191 | FUND READING | 03 | P | 03 |
| S192 | 01 | ENGL | 098 | 191 | FUND WRITING | 03 | P | 03 |
| S292 | 01 | ENGL | 101 | 002 | ENGL COMP | 03 | W | 62 |
| FL92 | 01 | BIOL | 109 | 025 | ANAT & PHYS | 04 | B | |
| FL92 | 01 | CHEM | 110 | 010 | INTRO CHEM | 04 | A | |
| FL92 | 01 | ENGL | 101 | 011 | ENGL COMP | 03 | B | |
| FL92 | 01 | SOC | 101 | 009 | INTRO SOCIOLOGY | 03 | B | |
| SP93 | 01 | BIOL | 110 | 009 | ANAT & PHYS | 04 | B | |
| SP93 | 01 | CHEM | 121 | 020 | COLLEGE CHEM | 04 | A | |
| SP93 | 01 | MATH | 151 | 002 | LINEAR MATH | 03 | A | |
| SP93 | 01 | PSYC | 105 | 004 | DEVELOP PSYC | 03 | A | |

| | CUR | SEMESTER AVERAGE HA | QA | HE | PTS | AVE | CUMULATIVE AVERAGE HA | QA | HE | PTS | AVE |
|---|---|---|---|---|---|---|---|---|---|---|---|
| FL91 | GEN | 003 | 003 | 003 | 012 | 4.00 | 003 | 003 | 003 | 012 | 4.00 |
| SP92 | GEN | 007 | 007 | 007 | 024 | 3.43 | 010 | 010 | 010 | 036 | 3.60 |
| S192 | GEN | 000 | 000 | 000 | 000 | 0.00 | 010 | 010 | 010 | 036 | 3.60 |
| S292 | GEN | 000 | 000 | 000 | 000 | 0.00 | 010 | 010 | 010 | 036 | 3.60 |
| FL92 | GEN | 014 | 014 | 014 | 046 | 3.29 | 024 | 024 | 024 | 082 | 3.42 |
| SP93 | GEN | 014 | 014 | 014 | 052 | 3.71 | 038 | 038 | 038 | 134 | 3.53 |

"IN COMPLIANCE WITH THE [illegible] RIGHTS AND PRIVACY ACT OF 1974 [illegible] RELEASED ON THE CONDITION THAT [illegible] PERMIT ANY OTHER PARTY TO HAVE ACCESS TO SUCH INFORMATION WITHOUT THE WRITTEN CONSENT OF THE STUDENT"

NAME

| TERM/YEAR | CAMPUS | DEPT | COURSE NO | SECT | COURSE TITLE | CREDIT HOURS | GRADE | ACTION |
|---|---|---|---|---|---|---|---|---|
| | | | | | | | | |

COMMUNITY COLLEGE
Office of Student [illegible]
Beatrice E. Jones
Director
Student Records and Registration

COMMENTS

*OFFICIAL TRANSCRIPT

FIG. 22

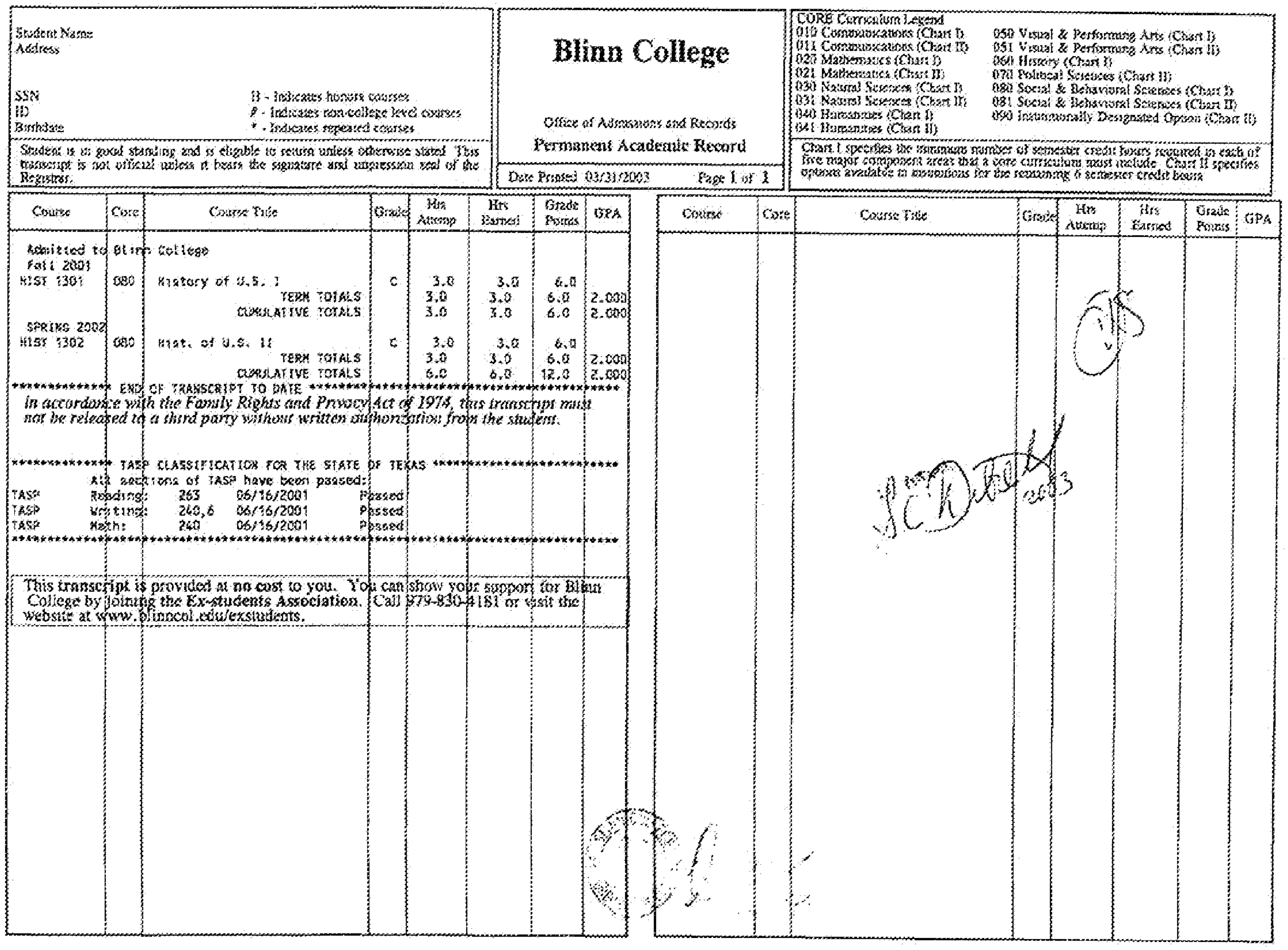

Student Name
Address

SSN
ID
Birthdate

H - Indicates honors courses
- Indicates non-college level courses
* - Indicates repeated courses Student is in good standing and is eligible to return unless otherwise stated. This transcript is not official unless it bears the signature and impression seal of the Registrar.

Blinn College

Office of Admissions and Records
Permanent Academic Record

Date Printed 03/31/2003 Page 1 of 1

CORE Curriculum Legend
010 Communications (Chart I)
011 Communications (Chart II)
020 Mathematics (Chart I)
021 Mathematics (Chart II)
030 Natural Sciences (Chart I)
031 Natural Sciences (Chart II)
040 Humanities (Chart I)
041 Humanities (Chart II)
050 Visual & Performing Arts (Chart I)
051 Visual & Performing Arts (Chart II)
060 History (Chart I)
070 Political Sciences (Chart II)
080 Social & Behavioral Sciences (Chart I)
081 Social & Behavioral Sciences (Chart II)
090 Institutionally Designated Option (Chart II)

Chart I specifies the minimum number of semester credit hours required in each of five major component areas that a core curriculum must include. Chart II specifies options available to institutions for the remaining 6 semester credit hours.

| Course | Core | Course Title | Grade | Hrs Attemp | Hrs Earned | Grade Points | GPA |
|---|---|---|---|---|---|---|---|
| Admitted to Blinn College | | | | | | | |
| Fall 2001 | | | | | | | |
| HIST 1301 | 080 | History of U.S. I | C | 3.0 | 3.0 | 6.0 | |
| | | TERM TOTALS | | 3.0 | 3.0 | 6.0 | 2.000 |
| | | CUMULATIVE TOTALS | | 3.0 | 3.0 | 6.0 | 2.000 |
| SPRING 2002 | | | | | | | |
| HIST 1302 | 080 | Hist. of U.S. II | C | 3.0 | 3.0 | 6.0 | |
| | | TERM TOTALS | | 3.0 | 3.0 | 6.0 | 2.000 |
| | | CUMULATIVE TOTALS | | 6.0 | 6.0 | 12.0 | 2.000 |

************ END OF TRANSCRIPT TO DATE ************

*In accordance with the Family Rights and Privacy Act of 1974, this transcript must not be released to a third party without written authorization from the student.*

************ TASP CLASSIFICATION FOR THE STATE OF TEXAS ************

All sections of TASP have been passed:

| | | | | |
|---|---|---|---|---|
| TASP | Reading: | 263 | 06/16/2001 | Passed |
| TASP | Writing: | 240,6 | 06/16/2001 | Passed |
| TASP | Math: | 240 | 06/16/2001 | Passed |

This transcript is provided at no cost to you. You can show your support for Blinn College by joining the Ex-students Association. Call 979-830-4181 or visit the website at www.blinncol.edu/exstudents.

| Course | Core | Course Title | Grade | Hrs Attemp | Hrs Earned | Grade Points | GPA |
|---|---|---|---|---|---|---|---|

FIG. 23

| | | | | | | | | | | | | | |
|---|---|---|---|---|---|---|---|---|---|---|---|---|---|
| C | 0.0147 | 0.0225 | 0.0872 | 0.1094 | | 0.2838 | 0.3156 | 0.3566 | 0.3919 | 0.4387 | | 0.4863 | 0.5072 |
| X | | 0.0278 | | 0.1 | 0.1281 | 0.2975 | 0.3262 | 0.3719 | 0.3916 | 0.4203 | 0.4597 | 0.4931 | 0.5144 |
| $(C-X)^2$ | 0.000172 | 2.81E-05 | 0.007604 | 8.84E-05 | 0.01641 | 0.000188 | 0.000112 | 0.000234 | 9E-08 | 0.000339 | 0.211324 | 4.62E-05 | 5.18E-05 |

FIG. 48A

| | | | | | | | | | | | |
|---|---|---|---|---|---|---|---|---|---|---|---|
| C | 0.5719 | 0.5938 | 0.6116 | 0.7669 | 0.7978 | 0.84 | 0.8819 | 0.9228 | 0.9694 | 0.9794 | 4802 |
| X | 0.5884 | | 0.6103 | | 0.7809 | 0.8106 | 0.8569 | | 0.9472 | 0.9772 | 4804 |
| $(C-X)^2$ | 0.000272 | 4.84E-06 | 1.69E-06 | 0.588136 | 0.000286 | 0.000864 | 0.000625 | 0.85156 | 0.000493 | 4.84E-06 | 4806 |

| 4808 | 4810 |
|---|---|
| DIST. | GAPS |
| | |
| 1.42545 | 7 |

FIG. 48B

| | | | | | | | | | | | | | | | |
|---|---|---|---|---|---|---|---|---|---|---|---|---|---|---|---|
| A | 0.0294 | 0.1022 | 0.1291 | 0.2984 | 0.3272 | 0.3731 | 0.3934 | 0.4228 | 0.4619 | 0.4947 | 0.5166 | 0.5894 | 0.6112 | 0.7853 | 0.8144 |
| X | 0.0278 | 0.1 | 0.1281 | 0.2975 | 0.3262 | 0.3719 | 0.3916 | 0.4203 | 0.4597 | 0.4931 | 0.5144 | 0.5884 | 0.6103 | 0.7809 | 0.8106 |
| $(A-X)^2$ | 2.6E-06 | 4.8E-06 | 1E-06 | 8.1E-07 | 1E-06 | 1.4E-06 | 3.2E-06 | 6.3E-06 | 4.8E-06 | 2.6E-06 | 4.8E-06 | 1E-06 | 8.1E-07 | 1.9E-05 | 1.4E-05 |

FIG. 49A

| | | | | |
|---|---|---|---|---|
| A | 0.86 | 0.9087 | 0.9481 | 0.9788 |
| X | 0.8569 | 0.9087 | 0.9472 | 0.9772 |
| $(A-X)^2$ | 9.6E-06 | 0 | 8.1E-07 | 2.6E-06 |

| DIST. | GAPS |
|---|---|
| | |
| 0.00905 | 0 |

FIG. 49B

| | | | | | | | | | | | | | | |
|---|---|---|---|---|---|---|---|---|---|---|---|---|---|---|
| B | 0.0228 | 0.0547 | 0.1187 | | 0.3416 | 0.375 | | 0.41 | 0.4519 | 0.5 | 0.5363 | 0.5988 | 0.6147 | 0.6503 |
| X | 0.0278 | 0.1 | 0.1281 | 0.2975 | 0.3262 | 0.3719 | 0.3916 | 0.4203 | 0.4597 | 0.4931 | 0.5144 | 0.5884 | 0.6103 | |
| $(B-X)^2$ | 2.5E-05 | 0.00205 | 8.8E-05 | 0.08851 | 0.00024 | 9.61E-06 | 0.15335 | 0.00011 | 6.1E-05 | 4.8E-05 | 0.00048 | 0.00011 | 1.9E-05 | 0.42289 |

FIG. 50A

| | | | | | | |
|---|---|---|---|---|---|---|
| B | 0.7134 | 0.8222 | 0.8566 | 0.8906 | 0.9325 | 0.9712 |
| X | 0.7809 | 0.8106 | 0.8569 | | 0.9472 | 0.9772 |
| $(B-X)^2$ | 0.00456 | 0.00013 | 9E-08 | 0.79317 | 0.00022 | 3.6E-05 |

| DIST. | GAPS |
|---|---|
| | |
| 1.21081 | 4 |

FIG. 50B

| | | | | | | | | | | | | | |
|---|---|---|---|---|---|---|---|---|---|---|---|---|---|
| D | | | | | 0.3378 | | | | | | | | 0.6641 |
| X | 0.0278 | 0.1 | 0.1281 | 0.2975 | 0.3262 | 0.3719 | 0.3916 | 0.4203 | 0.4597 | 0.4931 | 0.5144 | 0.5884 | 0.6103 |
| $(D-X)^2$ | 0.00077 | 0.01 | 0.01641 | 0.08851 | 0.00013 | 0.13830961 | 0.15335 | 0.17665 | 0.21132 | 0.24315 | 0.26461 | 0.34621 | 0.00289 |

FIG. 51A

| | | | | | |
|---|---|---|---|---|---|
| D | | | | | |
| X | 0.7809 | 0.8106 | 0.8569 | 0.9472 | 0.9772 |
| $(D-X)^2$ | 0.6098 | 0.65707 | 0.73428 | 0.89719 | 0.95492 |

| DIST. | GAPS |
|---|---|
| | |
| 2.3464 | 16 |

FIG. 51B

| E | 0.0594 | 0.1141 | 0.1388 | 0.1744 | 0.2041 | 0.2319 | | | | 0.4238 | 0.4497 | 0.4791 | 0.5125 | 0.5397 | 0.59 |
|---|---|---|---|---|---|---|---|---|---|---|---|---|---|---|---|
| X | 0.0278 | 0.1 | 0.1281 | | | 0.2975 | 0.3262 | 0.3719 | 0.3916 | 0.4203 | 0.4597 | 0.4931 | 0.5144 | | 0.5884 |
| $(E-X)^2$ | 0.001 | 0.0002 | 0.00011 | 0.03042 | 0.04166 | 0.0043 | 0.10641 | 0.13831 | 0.15335 | 1.2E-05 | 0.0001 | 0.0002 | 3.6E-06 | 0.29128 | 2.6E-06 |

FIG. 52A

| E | 0.6175 | 0.6547 | 0.6822 | 0.71 | | | 0.9034 | 0.93 | 0.9578 | 0.9947 |
|---|---|---|---|---|---|---|---|---|---|---|
| X | 0.6103 | | | | 0.7809 | 0.8106 | 0.8569 | 0.9472 | | 0.9772 |
| $(E-X)^2$ | 5.2E-05 | 0.42863 | 0.4654 | 0.5041 | 0.6098 | 0.65707 | 0.00216 | 0.0003 | 0.91738 | 0.00031 |

| DIST. | GAPS |
|---|---|
| | |
| 1.47157 | 12 |

FIG. 52B

| C | 0.048 | 0.1756 | 0.1964 | 0.2228 | 0.2604 | | | 0.9544 | 5302 |
|---|---|---|---|---|---|---|---|---|---|
| X | 0.0548 | 0.1784 | 0.2012 | 0.2304 | 0.2676 | 0.6032 | 0.6524 | 0.9552 | 5304 |
| $(C-X)^2$ | 4.6E-05 | 7.8E-06 | 2.3E-05 | 5.8E-05 | 5.184E-05 | 0.36385 | 0.42563 | 6.4E-07 | 5306 |

| 5308 | 5310 |
|---|---|
| DIST. | GAPS |
| | |
| 0.88863 | 2 |

FIG. 53

| A | 0.0524 | 0.1768 | 0.1992 | 0.2288 | 0.2688 | 0.3944 | 0.444 | | | 0.9528 |
|---|---|---|---|---|---|---|---|---|---|---|
| X | 0.0548 | 0.1784 | 0.2012 | 0.2304 | 0.2676 | | | 0.6032 | 0.6524 | 0.9552 |
| $(A-X)^2$ | 5.8E-06 | 2.6E-06 | 4E-06 | 2.6E-06 | 1.4E-06 | 0.15555 | 0.19714 | 0.36385 | 0.42563 | 5.8E-06 |

| DIST. | GAPS |
|---|---|
| | |
| 1.06873 | 4 |

FIG. 54

| B | 0.0579 | 0.1028 | 0.1384 | 0.1792 | | 0.2296 | 0.2848 | 0.3244 | | | 0.9432 |
|---|---|---|---|---|---|---|---|---|---|---|---|
| X | 0.0548 | | | 0.1784 | 0.2012 | 0.2304 | 0.2676 | | 0.6032 | 0.6524 | 0.9552 |
| $(B-X)^2$ | 9.6E-06 | 0.01057 | 0.01915 | 6.4E-07 | 0.04048 | 6.4E-07 | 0.0003 | 0.10524 | 0.36385 | 0.42563 | 0.00014 |

| DIST. | GAPS |
|---|---|
| | |
| 0.73457 | 6 |

FIG. 55

| | | | | | | | | |
|---|---|---|---|---|---|---|---|---|
| D | | 0.1216 | | | | | | 0.886 |
| X | 0.0548 | 0.1784 | 0.2012 | 0.2304 | 0.2676 | 0.6032 | 0.6524 | 0.9552 |
| $(D-X)^2$ | 0.003 | 0.00323 | 0.04048 | 0.05308 | 0.07161 | 0.36385 | 0.42563 | 0.00479 |

| DIST. | GAPS |
|---|---|
| | |
| 0.98268 | 6 |

FIG. 56

| | | | | | | | | | | | | |
|---|---|---|---|---|---|---|---|---|---|---|---|---|
| E | 0.0384 | 0.0428 | 0.0664 | 0.0856 | | | 0.238 | | 0.4916 | 0.5468 | 0.6676 | 0.924 |
| X | | 0.0548 | | | 0.1784 | 0.2012 | 0.2304 | 0.2676 | | 0.6032 | 0.6524 | 0.9552 |
| $(E-X)^2$ | 0.00147 | 0.00014 | 0.00440896 | 0.00733 | 0.03183 | 0.04048 | 5.8E-05 | 0.07161 | 0.24167 | 0.00318 | 0.00023 | 0.00097 |

| DIST. | GAPS |
|---|---|
| | |
| 0.6329 | 7 |

FIG. 57

| | | | | | | | |
|---|---|---|---|---|---|---|---|
| A | 0.0524 | 0.1768 | 0.1992 | 0.2288 | 0.2688 | | 0.9528 |
| X | 0.0548 | 0.1784 | 0.2012 | 0.2304 | 0.2676 | | 0.9552 |
| $(A-X)^2$ | 5.8E-06 | 2.6E-06 | 4E-06 | 2.6E-06 | 1.4E-06 | 0 | 5.8E-06 |

| DIST. | GAPS |
|---|---|
| | |
| 0.0047 | 0 |

FIG. 58

AUTOMATIC FORMS IDENTIFICATION SYSTEMS AND METHODS

RELATED APPLICATIONS

This application is a continuation of U.S. patent application Ser. No. 12/059,847, entitled Automatic Forms Identification Systems and Methods, filed on Mar. 31, 2008, and is related to U.S. patent application Ser. No. 12/852,359, entitled Automatic Forms Identification Systems and Methods, filed on the same date as this application, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

Many different types of forms are used in businesses and governmental entities, including educational institutions. Forms include transcripts, invoices, business forms, and other types of forms. Forms generally are classified by their content, including structured forms, semi-structured forms, and non-structured forms. For each classification, forms can be further divided into groups, including frame-based forms, white space-based forms, and forms having a mix of frames and white space.

Automated processes attempt to automatically identify the type of form and to subsequently identify the form's content. The automated processes may be different based on whether the form is frame-based, white space-based, or having a mix of frames and white space.

However, many of these processes are extremely time consuming and require a large amount of processing power. For example, image registration compares the actual images from two forms, almost as if one was holding two pieces of paper up to a light and manually comparing the two forms. The image registration requires a significant amount of storage and processing power since the images typically are stored in large files. Therefore, improved systems and methods are needed to automatically identify forms, including frame-based documents.

SUMMARY

A computer-readable storage medium is encoded with systems to automatically generate a model of a form or other document and identify the form or other document. In one aspect, a computer-readable storage medium is encoded with a system to normalize an image of a document and identify the relative positions of the vertical and horizontal lines in the normalized image. The relative positions of vertical and horizontal lines of the normalized image are the model of the document image. The model may be stored in a record, such as an array. The system compares the relative positions of vertical and horizontal lines of the model to the relative positions of vertical and horizontal lines of other models to identify a matching model.

In another aspect, a computer-readable storage medium is encoded with a system to identify a form from model data. The model data identifies relative positions of vertical and horizontal lines for a plurality of form models having dimensions normalized for a selected scale. The system comprises a plurality of modules executable by at least one processor. The modules comprise a preprocessing system, a layout extractor, a model image generator, a model representation system, and a matching system. The preprocessing system binarizes, deskews, denoises, and despeckles a form image of at least one document. The layout extractor extracts a frame of the form image by performing a morphological opening by reconstruction on the form image, where the opening uses a zero degree structuring element and a ninety degree structuring element, and each structuring element has a size based on an average text size of average text in the form image. The model image generator aligns, vectorizes, and morphologically closes the frame of the form image using the zero degree structuring element and the ninety degree structuring element to generate a model image. The model representation system normalizes dimensions of the model image for the selected scale, generates a vertical projection profile of the normalized model image, and determines relative positions of vertical lines of the normalized model image from the vertical projection profile. The model representation system also generates a horizontal projection profile of the normalized model image, determines relative positions of horizontal lines of the normalized model image from the horizontal projection profile, and generates an array with the relative positions of vertical lines and the relative positions of horizontal lines.

The matching system performs multiple operations for each of the plurality of form models. For each form model, the matching system aligns the relative positions of vertical lines of the normalized model image with closest corresponding relative positions of vertical lines of the form model. For each form model, the matching system also aligns the relative positions of horizontal lines of the normalized model image with closest corresponding relative positions of horizontal lines of the form model. For each form model, the matching system compares the aligned relative positions of vertical lines of the normalized model image to the corresponding relative positions of vertical lines of the form model to determine a number of vertical line gaps between the model image and the form model, each vertical line gaps number indicating a location where at least one vertical line of the normalized model image does not have a corresponding vertical line in the form model. For each form model, the matching system also compares the aligned relative positions of horizontal lines of the normalized model image to the corresponding relative positions of horizontal lines of the form model to determine a number of horizontal line gaps between the model image and the form model, each horizontal line gaps number indicating a location where at least one horizontal line of the normalized model image does not have a corresponding horizontal line in the form model. For each form model, the matching system determines a first Euclidean norm between the aligned relative positions of vertical lines of the normalized model image and the corresponding relative positions of vertical lines of the form model. For each form model, the matching system determines a second Euclidean norm between the aligned relative positions of horizontal lines of the normalized model image and the corresponding relative positions of horizontal lines of the form model. The matching system then determines a first smallest distance from the first Euclidean norms, a second smallest distance from the second Euclidean norms, a smallest vertical line gaps number from the vertical line gaps numbers, and a smallest horizontal line gaps number from the horizontal line gaps numbers. The matching system selects a particular form model from the plurality of form models. The selected form model has the first smallest distance, the second smallest distance, the smallest vertical line gaps number, and the smallest horizontal line gaps number.

In another aspect, a computer-readable storage medium is encoded with a system to identify a form from a plurality of form models identifying relative positions of vertical and horizontal lines for a corresponding normalized form image normalized for a same selected scale. The system comprises a plurality of modules executable by at least one processor. The modules comprise a layout extractor, a model image generator, a model representation system, and a matching system. The layout extractor extracts a frame of another form image. The model image generator aligns and vectorizes the frame to generate a model image. The model representation system normalizes the model image for the same selected scale, determines relative positions of vertical and horizontal lines of the normalized model image, and generates a model with the relative positions of vertical and horizontal lines of the normalized model image.

The matching system aligns the relative positions of vertical and horizontal lines of the model with relative positions of vertical and horizontal lines of at least one form model. The matching system determines a first Euclidean norm between the aligned relative positions of vertical lines of the model and the relative positions of vertical lines of the at least one form model and determines a second Euclidean norm between the aligned relative positions of horizontal lines of the model and the relative positions of horizontal lines of the at least one form model. The matching system then determines whether the at least one form model matches the model based on the first Euclidean norm and the second Euclidean norm.

In another aspect, a computer-readable storage medium is encoded with a system to identify a plurality of form models, each form model comprising vertical position tags identifying relative positions of vertical lines for a corresponding normalized form image normalized for a same selected scale and horizontal position tags identifying relative positions of horizontal lines for the corresponding normalized form image normalized for the same selected scale. The system comprises a plurality of modules executable by at least one processor. The modules comprise a layout extractor, a model image generator, a model representation system, and a matching system. The layout extractor extracts a frame of another form image. The model image generator aligns and vectorizes the frame to generate a model image. The model representation system normalizes the model image for the same selected scale, determines first relative vertical positions of vertical lines of the normalized model image using projection profiling, and determines first relative horizontal positions of horizontal lines of the normalized model image using projection profiling. The model representation system then generates a model with first vertical position tags identifying the first relative vertical positions of vertical lines of the normalized model image and first horizontal position tags identifying the first relative horizontal positions of horizontal lines of the normalized model image. The matching system aligns the first vertical position tags with second vertical position tags of at least one form model and aligns the first horizontal position tags with second horizontal position tags of the at least one form model. The matching system calculates a first Euclidean norm between the aligned first and second vertical position tags and calculates a second Euclidean norm between the aligned first and second horizontal position tags. The matching system selects the at least one form model as a matching model when the first Euclidean norm is smaller than other first Euclidean norms calculated between the first vertical position tags and other vertical position tags of other form models and the second Euclidean norm is smaller than other second Euclidean norms calculated between the first horizontal position tags and other horizontal position tags of the other form models.

In another aspect, a computer-readable storage medium is encoded with a system to identify a plurality of form models, each form model comprising vertical position tags identifying relative positions of vertical lines for a corresponding normalized form image normalized for a same selected scale and horizontal position tags identifying relative positions of horizontal lines for the corresponding normalized form image normalized for the same selected scale. The system comprises a plurality of modules executable by at least one processor. The modules comprise a layout extractor, a model image generator, a model representation system, and a matching system. The layout extractor extracts a frame of another form image. The model image generator aligns and vectorizes the frame to generate a model image. The model representation system normalizes the model image for the same selected scale, determines first relative vertical positions of vertical lines of the normalized model image using projection profiling, and determines first relative horizontal positions of horizontal lines of the normalized model image using projection profiling. The model representation system also generates a model with first vertical position tags identifying the first relative vertical positions of vertical lines of the normalized model image and first horizontal position tags identifying the first relative horizontal positions of horizontal lines of the normalized model image. The matching system aligns the first vertical position tags with second vertical position tags of at least one form model and aligns the first horizontal position tags with second horizontal position tags of the at least one form model. The matching system calculates a Euclidean norm between at least one member of a group consisting of: the aligned first and second vertical position tags and the aligned first and second horizontal position tags. The matching system selects the at least one form model as a matching model when the Euclidean norm is smaller than other Euclidean norms calculated between at least one second member of a second group consisting of: the first vertical position tags and other vertical position tags of other form models and the first horizontal position tags and horizontal position tags of the other form models.

In another aspect, a computer-readable storage medium is encoded with a system to identify a plurality of form models, each form model comprising vertical position tags identifying relative positions of vertical lines for a corresponding normalized form image normalized for a same selected scale and horizontal position tags identifying relative positions of horizontal lines for the corresponding normalized form image normalized for the same selected scale. The system comprises a plurality of modules executable by at least one processor. The modules comprise a layout extractor, a model image generator, a model representation system, and a matching system. The layout extractor extracts a frame of another form image. The model image generator aligns and vectorizes the frame to generate a model image. The model representation system normalizes the model image for the same selected scale, determines first relative vertical positions of vertical lines of the normalized model image using projection profiling, and determines first relative horizontal positions of horizontal lines of the normalized model image using projection profiling. The model representation system also generates a model with first vertical position tags identifying the first relative vertical positions as a first vector and first horizontal position tags identifying the first relative horizontal positions as a second vector. The matching system compares the first vector to other first vectors, each other first vector having other first vertical position tags for a corresponding form model. The matching system compares the second vector to other second vectors, each other second vector having other second horizontal position tags for the corresponding form model. The matching system then selects a matching form model whose other first vector and other second vector most closely match the first vector and second vector.

In another aspect, a computer-readable storage medium is encoded with a system to identify a plurality of form models, each form model identifying relative positions of vertical and horizontal lines for a corresponding normalized form image normalized for a same selected scale. The system comprises a plurality of modules executable by at least one processor. The modules comprise a layout extractor, a model image generator, a model representation system, and a matching system. The layout extractor extracts a frame of another form image. The model image generator aligns and vectorizes the frame to generate a model image. The model representation system normalizes the model image for the same selected scale, determines other relative positions of other vertical and horizontal lines of the normalized model image, and generates another model identifying the other relative positions of the other vertical and horizontal lines. The matching system compares the other relative positions of the other vertical and horizontal lines of the other model to relative positions of horizontal and vertical lines of the form models to identify a matching model.

BRIEF DESCRIPTION OF THE DRAWINGS

FIGS. 18-23 are examples of form documents.

FIGS. 48A-52B are tables identifying position tags of lines identified in the vertical projection profiles of FIGS. 36-41.

FIGS. 53-57 are tables identifying position tags of lines identified in the horizontal projection profiles of FIGS. 42-47.

FIG. 58 is a table identifying position tags of lines identified in the horizontal projection profile of FIG. 43.

DETAILED DESCRIPTION

Systems and methods of the present invention automatically generate a model of a form or other document and identify the form or other document. In one aspect, a document processing system and method normalizes an image of a document and identifies the relative positions of the horizontal and vertical lines in the normalized document image. The relative positions of the horizontal and vertical lines of the normalized image (position tags) are the model of the document image. The position tags may be stored in a record for the model. A model name and/or other model data optionally may be stored with or for the model. The system compares the relative positions of the horizontal and vertical lines for the model to the relative positions of horizontal and vertical lines of models previously identified and/or stored in the document processing system to identify a matching model. If a matching model is not identified, the system stores the model of the document being processed.

In another aspect, a document processing system and method extract a frame of a document image by performing a morphological opening by reconstruction on the image. A model image then is generated by aligning and vectorizing the lines in the image frame.

The model image is normalized for a selected scale, and vertical and horizontal projection profiles of the normalized model image are generated. Relative positions of vertical and horizontal lines of the normalized model image are determined from the vertical and horizontal projection profiles, and an array optionally is generated with the relative positions of the vertical lines and the relative positions of the horizontal lines.

One or more form models then may be compared to the model image. For each form model, the relative positions of the vertical lines of the normalized model image optionally are aligned with the relative positions of the vertical lines of the form model. Similarly, the relative positions of the horizontal lines of the normalized model image optionally are aligned with the relative positions of the horizontal lines of the form model.

For each form model, a first (vertical) Euclidean norm is calculated between the relative positions of the vertical lines of the normalized model image and the corresponding relative positions of the vertical lines of the form model. A second (horizontal) Euclidean norm is calculated between the relative positions of the horizontal lines of the normalized model image and the corresponding relative positions of the horizontal lines of the form model.

Figure 1:
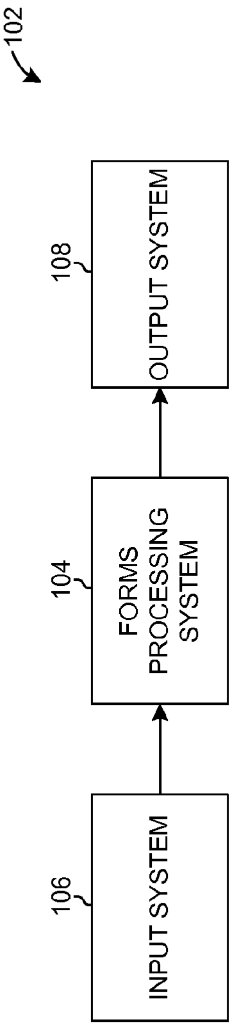
FIG. 1 is a block diagram of a document processing system in accordance with an embodiment of the present invention.

A smallest vertical distance is determined from the first (vertical) Euclidean norms, and a smallest horizontal distance is determined from the second (horizontal) Euclidean norms. The system selects a particular form model as a matching form model if the selected form model has the smallest vertical distance and the smallest horizontal distance. In one example, no matching form is selected if the smallest vertical distance and/or the smallest horizontal distance are not within a threshold distance. If no matching form model is identified, the model image is stored as a new form model FIG. 1 depicts an exemplary embodiment of a document processing system 102. The document processing system 102 processes one or more types of documents, including forms. Forms may include transcripts, invoices, medical forms, business forms, frame-base documents, and other types of forms. These forms typically have horizontal and vertical lines that define a structure for the form. Therefore, a form may be identified by determining the horizontal and vertical lines that define its form structure.

The document processing system 102 determines the form structure of an analyzed form and compares it to the structures of known forms to identify a match to the analyzed form. The document processing system 102 includes a forms processing system 104, an input system 106, and an output system 108.

The forms processing system 104 processes a form or other document to identify its form structure. The forms processing system 104 identifies the relative positions of the horizontal and vertical lines that define the form structure and compares the relative positions of the horizontal and vertical lines to the relative positions of horizontal and vertical lines of existing form models. The forms processing system 104 may temporarily or permanently store the position tags for the relative positions of the horizontal and vertical lines as the model for the form.

Since the origination and type of existing form models are known, the origination and type of the analyzed form being processed will be determined if a match is found. For example, the existing form models may include a model name or other model identifier in addition to the position tags. The model identifier may identify the form, such as being a transcript from a specific school, an invoice from a particular business, or another specific form. If a match is found between an analyzed form and an existing form model, the origination and type of form for the analyzed form will be known. In the present example, if the analyzed form matches an existing form model, such as a transcript from a particular school, the analyzed form also is a transcript from that particular school.

The forms processing system 104 includes one or more processors and volatile and/or nonvolatile memory and can be embodied in one or more distributed or integrated components or systems. The forms processing system 104 may include computer readable media on which one or more algorithms, software, and/or firmware is loaded and/or operates to implement the methods and systems identified herein. The computer readable media may include volatile media, nonvolatile media, removable media, non-removable media, and/or other media or mediums that can be accessed by a general purpose or special purpose computing device. For example, computer readable media may include computer storage media and communication media. Computer storage media further may include volatile, nonvolatile, removable, and/or non-removable media implemented in a method or technology for storage of information, such as computer readable instructions, data structures, program modules, and/or other data. Communication media may, for example, embody computer readable instructions, data structures, program modules, algorithms, and/or other data, including as or in a modulated data signal. The communication media may be embodied in a carrier waive or other transport mechanism and include an information delivery method. The communication media may include wired and wireless connections and technologies and be used to transmit and/or receive wired or wireless communications. Combinations and/or subcombinations of the above and systems and components described herein may be made.

The input system 106 includes one or more systems or devices used to generate an electronic version of one or more documents and other inputs and data to the forms processing system 104. The input system 106 may include a scanner that scans paper documents to an electronic form of the documents. The input system 106 also may include a storage system that stores electronic data, such as electronic documents. The electronic documents can be documents to be processed by the forms processing system 104, existing form models used by the forms processing system while processing a new document, new form models identified by the forms processing system while processing a document, and/or other data. The input system 106 also may be one or more processing systems and/or communication systems that transmit and/or receive electronic documents and/or other data through wireless or wired line communication systems, existing form model data, new form model data, and/or other data to the forms processing system 104. The input system 106 further may include one or more processors, a computer, volatile and/or nonvolatile memory, another data input device, a mouse, a trackball, a touch pad, or other pointer, a keyboard, another data entry device, or another input device or system, and/or a combination of the foregoing. The input system 106 may be embodied by one or more processors or processing systems, one or more distributed or integrated systems, and/or computer readable media. The input system 106 is optional for some embodiments.

The output system 108 includes one or more systems or devices that receive, display, and/or store data. The output system 108 may include a communication system that communicates data with another system or component. The output system 108 may be a storage system that temporarily and/or permanently stores data, such as model data, images of forms and other documents, and/or other data. The output system 108 includes a monitor, one or more processors, a computer, a printer, another data output device, volatile and/or nonvolatile memory, other output devices, and/or a combination of the foregoing. The output system 108 may receive and/or transmit data through wireless or wired line communication systems. The output system 108 may be embodied by one or more processors or processing systems, one or more distributed or integrated systems, and/or computer readable media. The output system 108 is optional for some embodiments.

Figure 2:
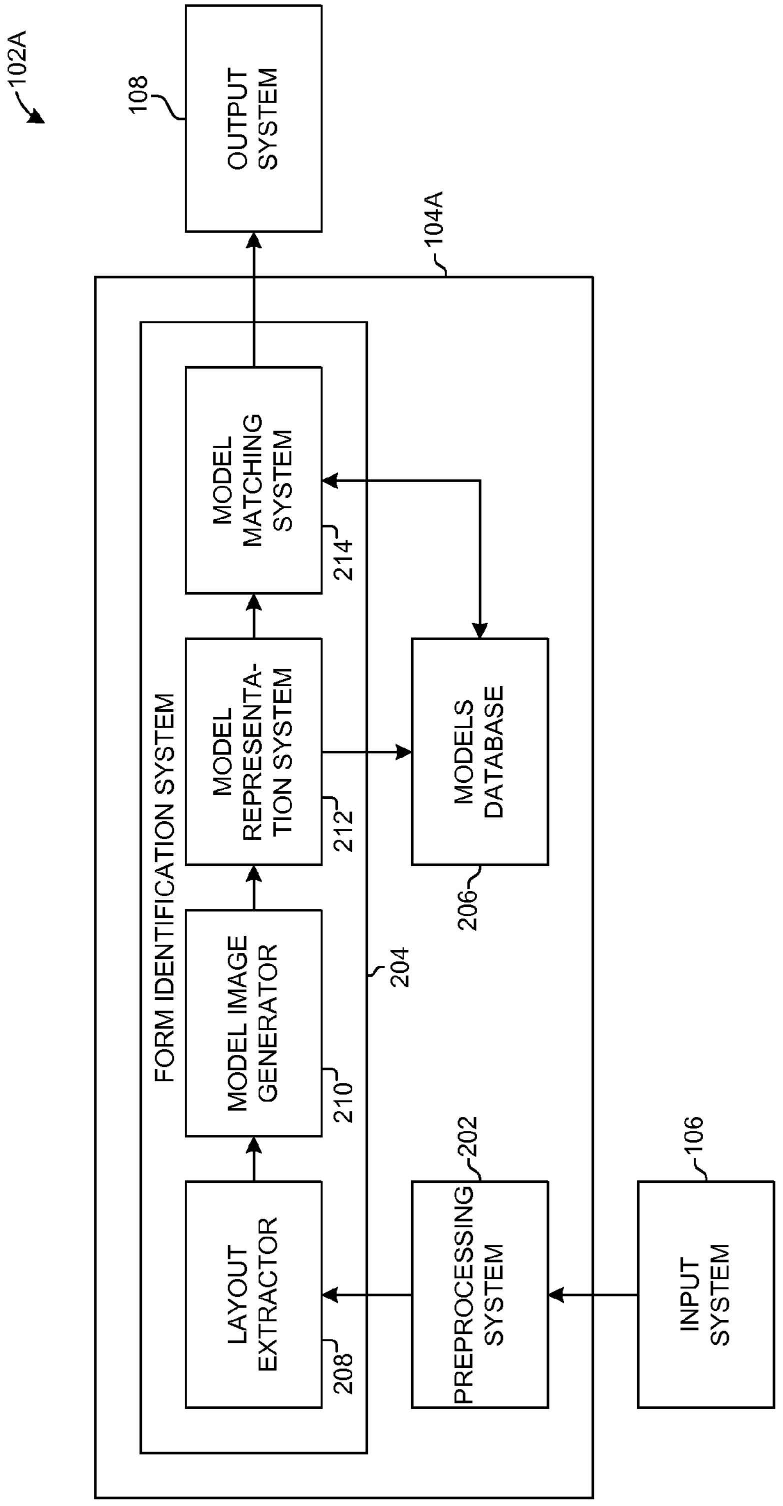
FIG. 2 is a block diagram of a forms processing system in accordance with an embodiment of the present invention.

FIG. 2 depicts an exemplary embodiment of a forms processing system 104A. The forms processing system 104A extracts the structure of a form image and generates a model of the form image with position tags identifying the relative positions of vertical and horizontal lines of the form image after the form image has been normalized for a selected scale.

The forms processing system 104A includes a preprocessing system 202 that receives an electronic document, such as a form image. The preprocessing system 202 initially processes the form image to enable the form identification system 204 to determine the form structure. Examples of preprocessing systems and methods include binarization, deskew, denoise, and/or despeckle. Other preprocessing may be used.

The form identification system 204 automatically identifies the structure of the form, including the relative positions of the horizontal and vertical lines of a normalized form image. The form identification system 204 stores the position tags for the relative positions of the horizontal and vertical lines as a model in the models database 206. A model name, the dimensions of the original form image (the form image prior to normalization), and/or other model data optionally may be stored with the model. The form identification system 204 also retrieves existing form models from the models database 206 for comparison to a new form image being analyzed (analyzed form image). The form identification system 204 includes a layout extractor 208, a model image generator 210, a model representation system 212, and a model matching system 214.

The layout extractor 208 extracts a frame from the form image. The frame is the structure of the horizontal and vertical lines in the form, generally without handwritten or typewritten text, graphics, or other markings. However, in some instances some miscellaneous markings may be present in the frame due to a concentrated or a thick graphic element. These miscellaneous markings may appear as one or more lines, thick lines, or graphic portions in the frame.

The model image generator 210 further processes the frame to align one or more line segments of one or more lines of the frame and to make the lines and/or line segments of the frame a consistent width. In some instances, the model image generator 210 may make further operations on the form image, such as mathematical morphology (morphological) operations.

The model representation system 212 normalizes the form image for a selected scale or range. Normalizing the form image standardizes form images to the selected scale, including form images having different dimensions. For example, during normalization, an image having dimensions of 2500×3200 pixels is converted to a selected scale, such as a range of zero to one. In this example, the vertical dimension is 2500, and the horizontal dimension is 3200. For the horizontal dimensions, a pixel located at column zero on the X (horizontal) axis is normalized to zero, and the pixel located at column 3200 on the X (horizontal) axis is normalized to one. Therefore, a pixel located at column 320 of the original image has a relative position of 0.1 on the X (horizontal) axis after normalization. The pixel located at column 640 of the original image has a relative position of 0.2 on the X (horizontal) axis of the normalized image. For the vertical dimension, a pixel at zero on the Y (vertical) axis of the original image has a relative position of zero on the Y (vertical) axis of the normalized image. A pixel at row 2500 on the Y (vertical) axis of the original image has a relative position of one on the Y (vertical) axis of the normalized image. Thus, a pixel at row 25 of the original image has a relative position of 0.01 on the Y (vertical) axis of the normalized image. As used herein, the term "relative position" means the position after the image has been normalized.

Form images having other dimensions also can be normalized to the same selected scale. For example, a form image having dimensions of 1000×1500 can be normalized to the same selected scale of zero to one. Additionally, a form image having dimensions of 800×1300 can be normalized to the same selected scale of zero to one. Other dimensions may be used and normalized to the selected scale.

Other scales or ranges may be selected. For example, a range of zero to two, −1 to 0, −0.5 to 0.5, or another scale may be selected. Other examples exist.

Because the form images are normalized to a selected scale, the method for comparing an analyzed form image, or the model generated from the analyzed form image, to a comparing form model is not dependent on the dimensions of the corresponding form image and form model. The relative positions of the lines are not dependent upon whether the analyzed form image, or the model generated from the analyzed form image, or the comparing form model were large or small. Thus, the absolute position (the position on the original image with the original dimensions without normalization) is not required. The form identification system 204 is therefore able to compare the relative positions of lines from different form images having different dimensions and their associated models. If the dimensions of the form image are not normalized, the form identification system 204 would have to attempt to compare a line from an image having a larger dimension to another line from another form image having a smaller dimension. The lines could have different positions along the horizontal or vertical axis and would be difficult to compare without a further correction or offset for the scale. However, after normalization, a line at the 320th column along the horizontal axis of a form image having a dimension of 2500×3200 has a relative position of 0.1 when the selected scale is 0 to 1. A line at the 150th column of a form image having a dimension of 1000×1500 also has a relative position of 0.1 after normalization to the same selected scale. Thus, the two images can be compared after normalization to identify whether the relative positions of the horizontal and vertical lines match or are similar.

After the form image is normalized for a selected scale, the model representation system 212 determines the relative positions (position tags) of the horizontal and vertical lines of the form image. In one embodiment, the model representation system 212 generates a vertical projection profile of the vertical lines in the normalized form image and generates a horizontal projection profile of the horizontal lines in the normalized form image. A vertical projection profile is a sum of the black pixels or other selected set of pixels in each column of the normalized form image parallel to the Y (vertical) axis. The horizontal projection profile is a sum of the black pixels or other selected set of pixels of each row of the normalized form image parallel to the X (horizontal) axis. The vertical projection profile identifies the relative positions of the vertical lines (vertical position tags) in the normalized form image and the relative length (number of pixels after normalization) of each vertical line. The horizontal projection profile identifies the relative positions of each horizontal line (horizontal position tags) in the normalized form image and the relative length (number of pixels after normalization) of each horizontal line.

The position tags can be saved as a model in the models database 206. In some instances, the model representation system 212 saves the position tags in a record or structure, such as an array or vector. In one example, the position tags are saved in a bi-dimensional array. In this example, the first column of the array contains the vertical position tags for the relative positions of the vertical lines, and the second column contains the horizontal position tags for the relative positions of the horizontal lines. However, the columns may be switched, or the data may be stored in rows instead of columns. Other examples exist. Other data optionally may be stored with the model, such as the model name, the dimensions of the original form image, the relative lengths of the vertical and/or horizontal lines, and/or other model data. In some instances, the model name is identified solely by a file name or record name of the model, and other model data is not stored with or for the model. In other instances, the model data is identified by its location in a record or other structure.

Once the relative positions of the horizontal and vertical lines are determined for the form model, the model matching system 214 compares the analyzed model to one or more comparing form models in the models database 206. The model matching system 214 determines if the relative positions of the horizontal and vertical lines of the analyzed model match the relative positions of the horizontal and vertical lines of one or more of the comparing form models.

In one embodiment, the model matching system 214 compares the vector for the position tags of vertical lines (vertical position tags) of the analyzed model to the vector of the vertical position tags of each comparing form model in the models database 206 to determine the closest vector comparison, such as a smallest distance between vectors. The model matching system 214 similarly compares the vector for the position tags of horizontal lines (horizontal position tags) of the analyzed model to the vector of the horizontal position tags of each comparing form model in the models database 206 to determine a vector comparison, such as a smallest distance between vectors.

In another embodiment, the model matching system 214 calculates the Euclidean norm between the vertical and horizontal position tags arrays for the analyzed model and the vertical and horizontal position tags arrays for each comparing form model. In this example, the model matching system 214 sequentially calculates the Euclidean norm between the arrays. The Euclidean norm is given by the following equation:

$$\|X\| = \sqrt{\sum_{i=1}^{N} (x_i - y_i)^2},$$

where X is the Euclidean norm between array or set x and array or set y, array or set x includes the relative line positions for one of the models, such as the analyzed model, array or set y includes the relative line positions for another model, such as a comparing model, and N is an integer corresponding to the total or greatest number of relative line positions in array or set x and/or array or set y.

In another example, the model matching system 214 calculates a Euclidean norm between an array having the vertical position tags of the analyzed model and another array having vertical position tags for a comparing form model. The model matching system 214 also calculates the Euclidean norm between an array having the horizontal position tags for the analyzed model and an array having horizontal position tags for the comparing form model. The model matching system 214 makes the same calculations for the Euclidean norms between the arrays for the analyzed model and each array of each comparing form model. In one embodiment, the comparing form model having the smallest Euclidean norm between the vertical position tags arrays and the smallest Euclidean norm between the horizontal position tags arrays is selected as the model matching the analyzed model.

In another embodiment, the Euclidean norm must be less than a selected Euclidean norm threshold to be considered a possible matching model. In one example, the Euclidean norm between two arrays must meet a Euclidean norm threshold of less than 0.5 to be eligible to be selected as a matching model. In another example, the Euclidean norm threshold must be less than 0.1 to be eligible to be selected as a matching model. In another example, the Euclidean norm threshold must be less than 1.0 to be eligible to be selected as a matching model. Other examples exist.

In one embodiment, the average size of text within the form image is determined, and a line length threshold is defined as being greater than the average size of the text. If a projection profile identifies a line, but the line is not greater than the line length threshold, the line is discarded as being noise. The line length threshold may be any selectable threshold value, such as a particular pixel height, pixel length, line distance, or a size of text, such as an average size of text or a percentage of an average size of text.

Figures 3, 4, 5A, 5B, 6, 7, 8A, 8B, 8C:
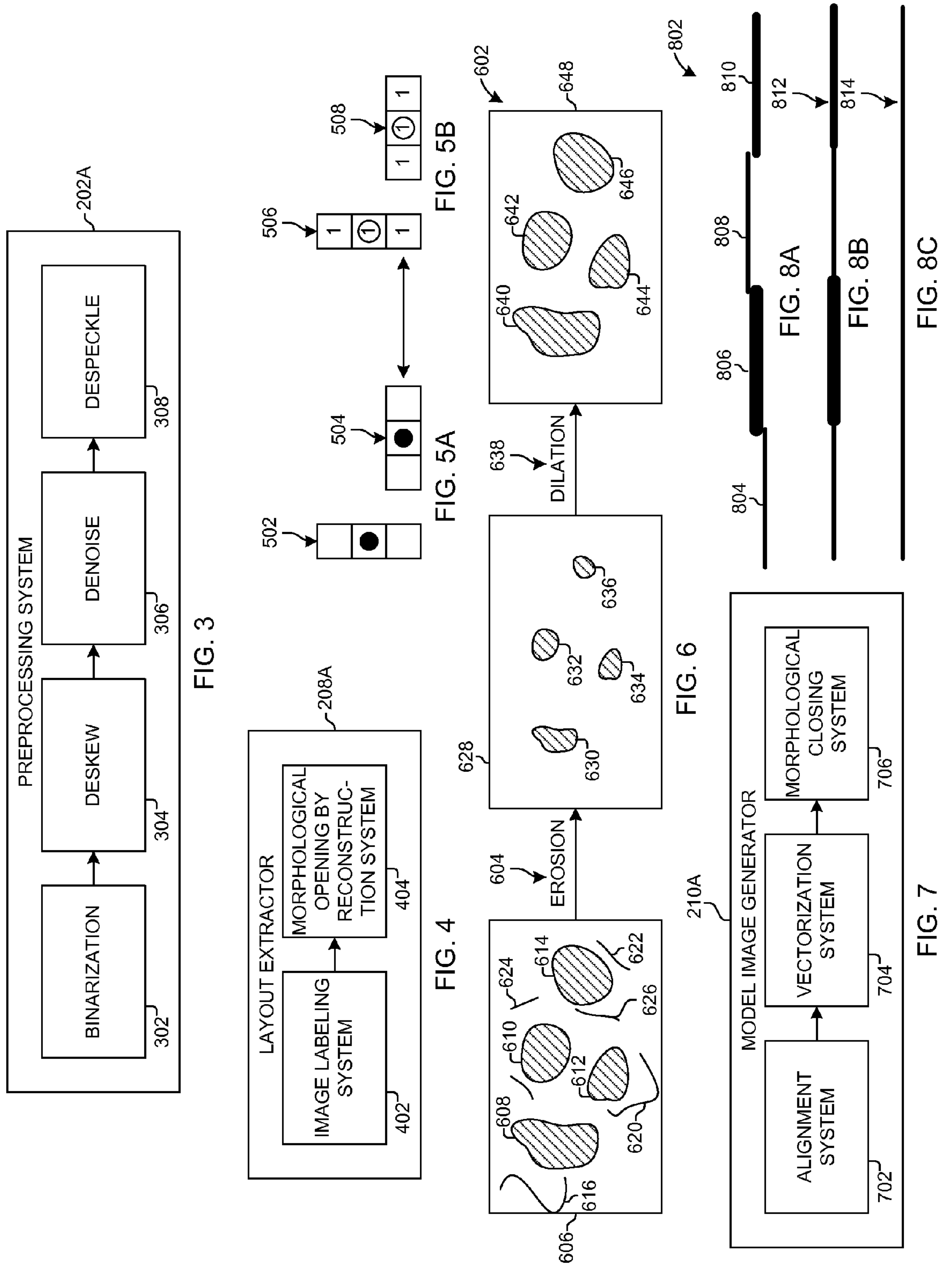
FIG. 3 is a block diagram of a preprocessing system in accordance with an embodiment of the present invention.
FIG. 4 is a block diagram of a layout extractor in accordance with an embodiment of the present invention.
FIGS. 5A-5B are diagrams of structuring elements.
FIG. 6 is a diagram of an example of a morphological opening by reconstruction.
FIG. 7 is a block diagram of a model image generator in accordance with an embodiment of the present invention.
FIGS. 8A-8C are diagrams of examples of alignment and vectorization in accordance with an embodiment of the present invention.

FIG. 3 depicts an exemplary embodiment of a preprocessing system 202A. The preprocessing system 202A includes a binarization process 302, a deskew process 304, a denoise process 306, and a despeckle process 308.

The binarization process 302 changes a color or gray scaled image to black and white. The deskew process 304 corrects a skew angle from the form image. A skew angle results in an image being tilted clockwise or counterclockwise from the X-Y axis. The deskew process 304 corrects the skew angle so that the form image aligns more closely to the X-Y axis. The denoise process 306 removes dots, lines, and other noise from the form image. The despeckle process 308 removes speckles from the form image.

FIG. 4 depicts an exemplary embodiment of a layout extractor 208A. The layout extractor 208A extracts the layout or structure of the vertical and horizontal lines of the form image. The form structure alternately is referred to as the form frame. The layout extractor 208A has an image labeling system 402 and a morphological opening by reconstruction system 404.

The image labeling system 402 labels each character of each block of text in the form image and determines the average size of text in the form image. In one embodiment, the image labeling system 402 labels every character in the form image, determines the height and the width of each character, and then determines the average size of the text. In one example, the image labeling system 402 separately determines the average height and the average width of the text. In another example, the image labeling system 402 only determines an average size of text, which accounts for both the height and the width. In another example, only the height or the width of the text is measured and used for the average text size determination.

In one embodiment, text and/or graphics having an extremely large size or an extremely low size are eliminated from the calculation of the average text size. Thus, the image labeling system 402 measures only the average text (that is, the characters remaining after the large and small characters have been eliminated) to determine the average text size. An upper character size threshold and a lower character size threshold may be selected to identify those characters that are to be eliminated from the average text size measurement. For example, if the average size of text generally is 15×12 pixels, the lower character threshold may be set at four pixels for the height and/or width, and the upper character threshold may be set at 48 pixels for the height and/or width. Any text having a character size below or above the lower and upper character thresholds will be eliminated and not used to calculate the average size of the average text. The upper and lower character thresholds may be set for height, width, or height and width. The upper and lower character thresholds may be pre-selected or selected based upon an initial calculation made of text size in an image. For example, if a selected percentage of characters are approximately 15×12 pixels, the lower and upper character thresholds can be selected based upon that initial calculation, such as a percentage or factor of the initial calculation.

The morphological opening by reconstruction system 404 uses one or more structuring elements to perform a morphological opening by reconstruction on the form image. The opening by reconstruction includes one or more morphological erosions followed by one or more morphological dilations. The erosions create markers from an original form image, while removing unwanted material. The dilations use the original form image as a mask and dilate the markers one or more times.

Examples of structuring elements are depicted in FIGS. 5A-5B. In the example of 5A, a 1×3 90 degree structuring element 502 and a 1×3 zero degree structuring element 504 are used for the erosion and dilation of the morphological opening by reconstruction. FIG. 5B depicts another way of displaying the 1×3 90 degree structuring element 506 and the 1×3 zero degree structuring element 508. The 90 degree structuring element 502 of FIG. 5A and the 90 degree structuring element 506 of FIG. 5B are the same structuring element. They are merely depicted differently. Similarly, the zero degree structuring element 504 of FIG. 5A and the zero degree structuring element 508 of FIG. 5B are the same. They are merely depicted differently.

The morphological opening by reconstruction system 404 selects the size of the structuring elements 502 and 504 based on the average size of text or average size of average text (average text size) determined by the image labeling system 402. If the structuring elements 502 and 504 are too small, text required for later processes (i.e. processes performed after the model matching system 214) will be eliminated. If the size of the structuring elements 502 and 504 is too large, vertical and/or horizontal lines of the form image will not be clearly located on a form image. If the text is not required for future processes, the size of the structuring elements 502 and 504 can be smaller in some embodiments.

The size of the structuring elements 502 and 504 may be based on the average height of text, the average width of text, or the average text size. In one example, the size of the structuring elements 502 and 504 are the same size as the average text size. In another example, the size of the structuring elements 502 and 504 are smaller or larger than the average text size.

In another example, the 90 degree structuring element 502 is between approximately two and four times the average text height. In another example, the zero degree structuring element 504 is between approximately two and four times the size of the average text width. In other examples, the 90 degree structuring element 502 and/or the zero degree structuring element 504 are between one and six times the average text size. However, the structuring elements 502 and 504 can be larger or smaller in some instances. Other examples exist.

FIG. 6 depicts an exemplary embodiment of a morphological opening by reconstruction 602. The morphological opening by reconstruction system 404 performs a morphological erosion 604 on the form image 606 using the structuring elements 502 and 504. One or more erosions may be performed. The erosion 604 is used to retain certain structures 608-614 of the form image 606 while eliminating unwanted elements 616-626. The eroded form image 628 contains markers 630-636 that correspond to the structures 608-614. A morphological dilation 638 is performed using the structuring elements 502 and 504 to reconstruct the image from the markers 630-636 using the original image 606 as a mask. Thus, the dilation 638 dilates the markers 630-636 using the structuring elements 502 and 504 until the original structures 608-614 identified by the mask are reconstructed to form reconstructed elements 640-646 in the dilated image 648. One or more dilations may be performed using the structuring elements 502 and 504.

An exemplary embodiment of a model image generator 210A is depicted in FIG. 7. The model image generator 210A generates a model image from the frame generated by the layout extractor 208. The actual model is generated by the model representation system 212 from the model image. In the example of FIG. 7, the model image generator 210A has an alignment system 702 and a vectorization system 704. Optionally, the model image generator 210A may include a morphological closing system 706.

The alignment system 702 aligns one or more line segments for one or more lines of the frame, and the vectorization system 704 modifies the lines or line segments to be a selected line width, such as one pixel, three pixels, or another width. An example of the alignment and vectorization are depicted in FIGS. 8A-8C. In FIG. 8A, a line 802 has multiple line segments 804-810 having different widths. The line segments 804-810 also are not aligned on a single plane. The alignment system 702 aligns each of the line segments 804-810 into a single plane, resulting in the aligned line segments 812 identified in FIG. 8B. The vectorization system 704 then modifies the line segments 804-810 so they are a single selected line width, such as one pixel wide, three pixels wide, or another selected width. Other selected line widths may be used. The resulting vectorized line 814 is identified in FIG. 8C.

Figures 9A, 9B, 9C, 9D, 9E, 9F, 9G:
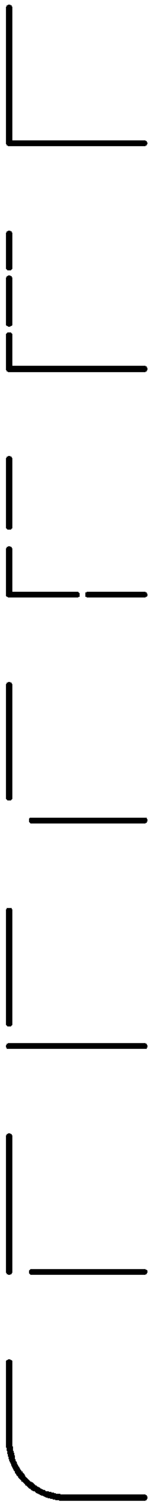
FIGS. 9A-9G are diagrams of examples of line segments and lines before and after a morphological closing.

The model image generator 210A optionally may include a morphological closing system 706. A morphological closing includes one or more morphological dilations of an image by the structuring elements 502 and 504 followed by one or more morphological erosions of the dilated image by the structuring elements to result in a closed image. The morphological closing generally is performed to close gaps in lines and to change rounded corners to 90 degree corners. FIGS. 9A-9F depict examples of gaps and rounded corners to be corrected by a morphological closing. One example of a result of a morphological closing is depicted in FIG. 9G.

Figure 10:
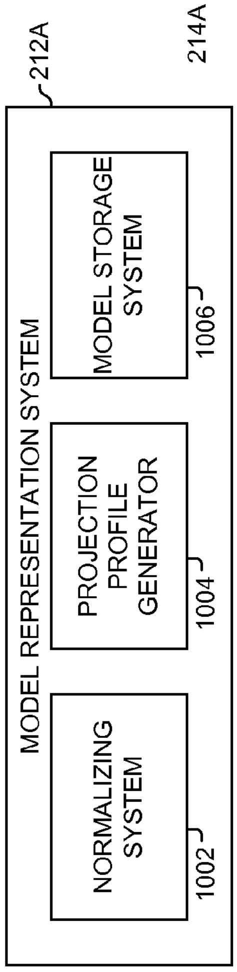
FIG. 10 is a block diagram of a model representation system in accordance with an embodiment of the present invention.

FIG. 10 depicts an exemplary embodiment of a model representation system 212A. A normalizing system 1002 normalizes the dimensions of the form image for the selected scale. At this point in the processing, the frame has been extracted from the form image, and the lines and line segments of the frame have been aligned, vectorized, and optionally morphologically closed to result in a model image. Therefore, the normalizing system 1002 normalizes the model image from the dimensions of the original form image to the selected scale.

A projection profile generator 1004 generates a vertical projection profile of the vertical lines of the normalized model image and generates a horizontal projection profile of the horizontal lines of the normalized model image. The vertical projection profile identifies the relative positions of the vertical lines from the normalized model image. The horizontal projection profile identifies the relative positions of the horizontal lines of the normalized model image. The relative positions of the vertical lines are identified by vertical position tags, and the relative positions of the horizontal lines are identified by horizontal position tags.

The vertical projection profile also identifies the relative length of each vertical line, and the horizontal projection profile identifies the relative length of each horizontal line in the model image. Since the model image has been normalized, the relative lengths of the lines are determined, not the absolute line lengths from the original image.

An optional model storage system 1006 stores the position tags for the relative positions of the vertical and horizontal lines, such as in an array, a record, or another structure or storage mechanism. The position tags are stored as a model. The relative line lengths, a model name, dimensions of the original image, and/or other model data optionally is stored with or for the model. In one embodiment, the absolute line positions, the absolute line lengths, and/or the selected scale value also are stored with or for the model.

Figure 11:
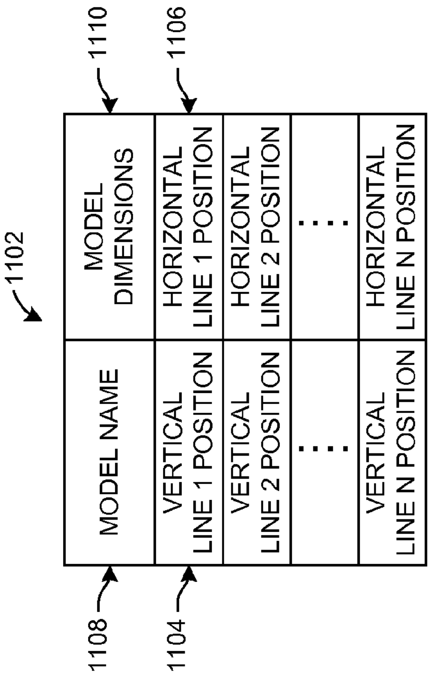
FIG. 11 is a diagram of an array for a model in accordance with an embodiment of the present invention.

FIG. 11 depicts an exemplary embodiment of a model 1102. In the example of FIG. 11, the model 1102 is a bi-dimensional array. One dimension of the array 1104 includes the position tags for each of the vertical lines of the model image. Thus, the position tags for vertical line 1 through vertical line N are stored in one dimension of the array, where N is an integer. A second dimension of the array 1106 includes the position tags for the horizontal lines. Thus, the position tags for horizontal line 1 through horizontal line N are stored in the second dimension of the array, where N is an integer. The model optionally may include the model name 1108 and/or the dimensions of the form image 1110 prior to normalization. Other model data, such as the relative lengths of each line, may be included in other embodiments. Other types of records may be used to store the model, and other formats may be used.

Figure 12:
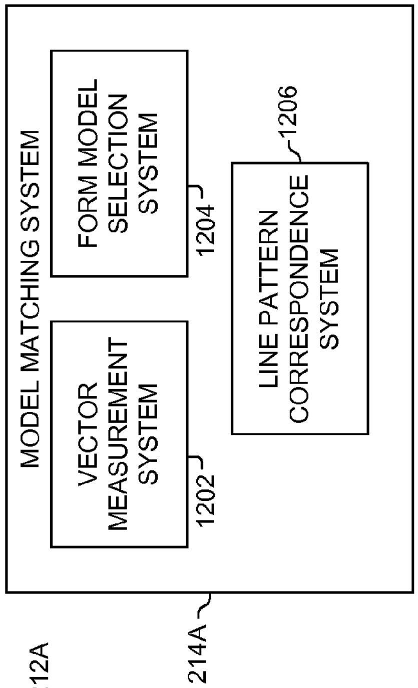
FIG. 12 is a block diagram of a model matching system in accordance with an embodiment of the present invention.

FIG. 12 depicts an exemplary embodiment of a model matching system 214A. The model matching system 214A compares the relative positions of lines for a model being analyzed to the relative positions of lines for comparing form models to identify a matching model. In the example of FIG. 12, the model matching system 214A includes a vector measurement system 1202 and a form model selection system 1204.

The vector measurement system 1202 calculates a Euclidean norm between a model being analyzed and one or more comparing form models. In one example, the vector measurement system 1202 calculates the Euclidean norm between an array with the vertical position tags for the analyzed model and another array having the vertical position tags of a comparing form model, such as a model from the models database 206. The vector measurement system 1202 makes the same Euclidean norm calculation between the vertical position tags array of the analyzed model and vertical position tags arrays of additional comparing form models.

The vector measurement system 1202 performs the same Euclidean norm calculation for the horizontal arrays. For example, the vector measurement system 1202 calculates the Euclidean norm between the horizontal position tags array of the analyzed model and a horizontal position tags array of a comparing form model, such as a model from the models database 206. The vector measurement system 1202 calculates the Euclidean norm between the horizontal position tags array of the analyzed model and the horizontal position tags array of one or more additional comparing form models.

The form model selection system 1204 compares the Euclidean norms calculated for each of the vertical position tags arrays and selects a comparing form model having the smallest vertical Euclidean norm to the analyzed model. The form model selection system 1204 also compares the Euclidean norms calculated for each of the horizontal position tags arrays and selects a comparing form model having the smallest horizontal Euclidean norm to the analyzed model.

In one example, a single comparing form model has both the smallest Euclidean norm between the vertical position tags arrays and the smallest Euclidean norm between the horizontal position tags arrays. In this example, that comparing form model is selected as the matching model.

In other examples, the Euclidean norm for the vertical position tags arrays is the smallest for one comparing form model, and the Euclidean norm for the horizontal position tags arrays is the smallest for another comparing form model. In one embodiment, the form selection system 1204 selects the particular comparing form model depending on the type of form. For example, transcripts typically have more vertical lines than horizontal lines. In this example, the vertical lines may be given more weight than the horizontal lines. Therefore, the Euclidean norm for the vertical position tags is given more weight in this example than the Euclidean norm for the horizontal position tags. In this embodiment, the model is selected based upon the smallest Euclidean norm for the vertical position tags arrays.

In another embodiment, a form image may include a box, rectangle, block, stamp, or other set of lines ("line pattern") that are placed in different locations on the form. The line pattern often has horizontal and/or vertical lines having an approximately consistent distance between the lines. Therefore, the line pattern and the distance between the lines of the line pattern are the same or approximately the same, but the line pattern varies in location.

The line pattern can be taken into consideration when determining the Euclidean norm between the horizontal position tags arrays and/or the vertical position tags arrays. If the line pattern is identified for one or more models, the position tags for those lines may be eliminated from the Euclidean norm calculation for both the analyzed model and the comparing form model, such as by eliminating the position tags for the line pattern from the position tags arrays of the respective models. This may result in determining a closer matching model. In this example, the Euclidean norm for the position tags may be smaller between the analyzed model and a comparing form model once the position tags for the line pattern are removed from the position tags arrays of each model.

In one embodiment, a line pattern correspondence system of the model representation system 212A and/or the model matching system 214A determines if a line pattern is identified in one or more analyzed models and/or comparing form models. In one example, the model matching system 214A includes the line pattern correspondence system 1206, which identifies the line pattern based on a distance between vertical lines, a distance between horizontal lines, a relative position of one or more vertical lines, a relative position of one or more horizontal lines, a relative length of one or more vertical lines, a relative length of one or more horizontal lines, or a combination of one or more of the foregoing. Alternately, the line pattern correspondence system 1206 is implemented in the model representation system 212A. In one example, it is implemented after the projection profile generator 1004.

In another embodiment, model data identifying the line pattern is stored with each model for which the line pattern exists. The line pattern data identifies that the line pattern exists for the comparing form model, the distance or approximate distance between the lines of the line pattern, and/or whether or not the position tags for the line pattern may be eliminated by the vector measurement system 1202 and/or the form model selection system 1204 during the model comparing and matching process. In this embodiment, the line pattern correspondence system 1206 uses the line pattern data to locate one or more line patterns in the comparing form model and/or the analyzed form model.

Figure 13:
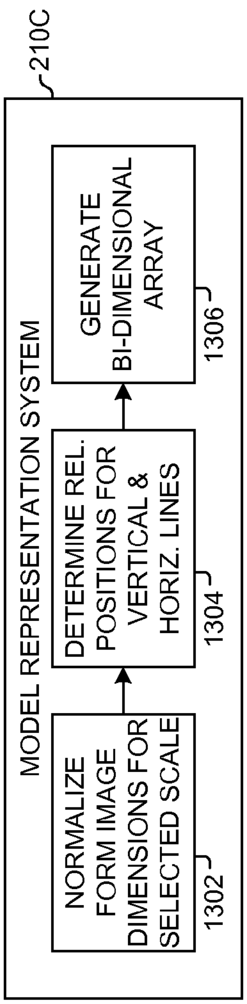
FIG. 13 is a block diagram of a model representation system in accordance with another embodiment of the present invention.

FIG. 13 depicts another exemplary embodiment of a model representation system 210C. In the example of FIG. 13, the model representation system 210C normalizes the form image dimensions for the selected scale at 1302. The model representation system 212A then determines the relative positions between the horizontal and vertical lines of the normalized form image at 1304. The model representation system 210C generates a bi-dimensional array with the relative positions of the vertical and horizontal lines at 1306.

Figure 14:
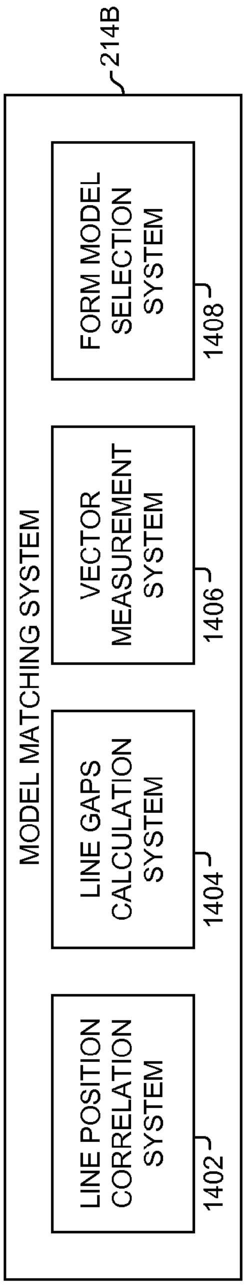
FIG. 14 is a block diagram of a model matching system in accordance with another embodiment of the present invention.

FIG. 14 depicts an exemplary embodiment of another model matching system 214B. The model matching system has a line position correlation system 1402 that correlates the relative positions of the vertical and horizontal lines of the analyzed model to the relative positions of the vertical and horizontal lines of the comparing form model. This initially enables the model matching system 214B to determine if the lines of the analyzed model have corresponding lines in the comparing form model. If a line from the analyzed model does not have a corresponding line in the comparing form model, a line gap exists. Similarly, if a line from the comparing form model does not have a corresponding line in the analyzed model, a line gap exists.

In one embodiment, a gap threshold is used to determine whether a line from one model corresponds to a line from another model. For example, if a vertical line of an analyzed model has a relative position of 0.3, and the gap threshold is set for 0.05, no corresponding line is present in the comparing form model if there is not a vertical line in the comparing form model with a relative position between 0.025 and 0.035. In one example, if the comparing line is not within the gap threshold, the comparing line does not correspond to a line in the other model, and a line gap exists. In one example, the gap threshold is 0.1. In another example, the gap threshold is 0.05. In other examples, the gap threshold may be selected between 0.001 and 1. Other examples exist.

In another embodiment, the gap threshold is selected based on the scale or range used to normalize the form image. For example, if the scale is from zero to two, the gap threshold may be 0.2 instead of 0.1. The gap threshold may be a percentage or factor of the selected scale. Other examples exist.

In another embodiment, the position tags from the analyzed model are correlated or aligned with the position tags of a comparing form model. If a comparing line of, for example, a comparing form model is between two lines of an analyzed model, the comparing line from the comparing form model is correlated to the closest position tag of the analyzed model. The next line from the comparing form model is then compared to the same set or next set of lines of the analyzed model.

In one example, the vertical position tags from a comparing form model are correlated to the vertical position tags of the analyzed model. The line position correlation system 1402 aligns the vertical position tags from the comparing form model with the vertical position tags of the analyzed model. If a particular vertical position tag from the comparing form model is not within the gap threshold when compared to the vertical position tags of an analyzed model, the line position correlation system 1402 identifies a gap for the vertical position tag of the analyzed model. Similarly, if a particular vertical position tag from the analyzed model is not within the gap threshold when compared to the vertical position tags of the comparing form model, the line position correlation system 1402 identifies a gap for that position of the comparing form model.

In another example, the horizontal position tags from a comparing form model are correlated to the horizontal position tags of the analyzed model. The line position correlation system 1402 aligns the horizontal position tags from the comparing form model with the horizontal position tags of the analyzed model. If a particular horizontal position tag from the comparing form model is not within the gap threshold when compared to the position tags of the analyzed model, the line position correlation system 1402 identifies a gap for the horizontal position tag of the analyzed model. Similarly, if a particular horizontal position tag from the analyzed model is not within the gap threshold when compared to the horizontal position tags of the comparing form model, the line position correlation system 1402 identifies a gap for that position of the comparing form model.

In another embodiment, once the line position correlation system 1402 correlates the lines from the analyzed model with the comparing form model, the position tags are analyzed to determine if each of the position tags from the comparing form model are shifted by a shift distance. For example, if all of the position tags from the comparing form model are different by 0.01 when compared to the position tags from the analyzed model, the position tags from the comparing form model are shifted by the shift distance of 0.01 before the vector measurement is made. In this instance, the comparing form model appears to be the same as, or similar to, the analyzed model, but the position tags are each off slightly. Correcting the position tags by the shift distance provides a better comparison when the vector measurement is made.

In another embodiment, the line position correlation system 1402 determines whether a selected number of lines or a selected percentage of lines from the analyzed model are within a line position threshold when compared to the analyzed form. For example, if none of the lines from the comparing form model are within the line position threshold when compared to the analyzed model, the comparing form model does not match the analyzed model, and no further comparison is necessary. The selected number or percentage of lines can vary from zero to N, where N is an integer.

The line gaps calculation system 1404 calculates the number of line gaps between the analyzed model and the comparing form model. The number of line gaps optionally is used as a factor in determining whether the analyzed model matches a comparing form model. In one embodiment, the line gaps calculation system 1404 separately calculates the number of gaps for the vertical position tags to determine a vertical line gaps number and another number of gaps for the horizontal position tags to determine a horizontal line gaps number. In another embodiment, the line gaps calculation system 1404 calculates a total line gaps number between the analyzed model and the comparing form model, which includes the vertical line gaps and the horizontal line gaps.

The vector measurement system 1406 includes the functions of the vector measurement system 1202 of FIG. 12. However, the vector measurement system 1406 may include other systems for determining a distance between the vertical position tags array of the analyzed model and the vertical position tags array of the comparing form model. Similarly, other measurement systems may be used to determine the distance or difference between the horizontal position tags array of the analyzed model and the horizontal position tags array of the comparing form model.

The form model selection 1408 compares the Euclidean norms calculated for each comparison of the analyzed model to one or more comparing form models as explained with regard to the form model selection system 1204 of FIG. 12. However, the form model selection system 1408 also includes the number of vertical line gaps and horizontal line gaps as factors when selecting a matching form model. In one embodiment, the form model selection system 1408 equally weights as factors the Euclidean norm between the vertical position tags arrays, the Euclidean norm between the horizontal position tags arrays, the number of vertical line gaps, and the number of horizontal line gaps. In this embodiment, the smallest Euclidean norms and the smallest number of line gaps results in a matching form model. In other embodiments, one or more of the factors may be weighted with greater importance. For example, the Euclidean norms may be weighted higher or have a greater weight than the number of line gaps. Similarly, a smallest vertical Euclidean norm and a smallest vertical line gaps number may be weighted greater than a horizontal Euclidean norm and a horizontal line gaps number. In one embodiment, the line pattern correspondence system 1206 is included with the model matching system 214B of FIG. 14. Other combinations or sub-combinations of the systems and methods described above may be included with the model matching system 214B of FIG. 14.

Figure 15:
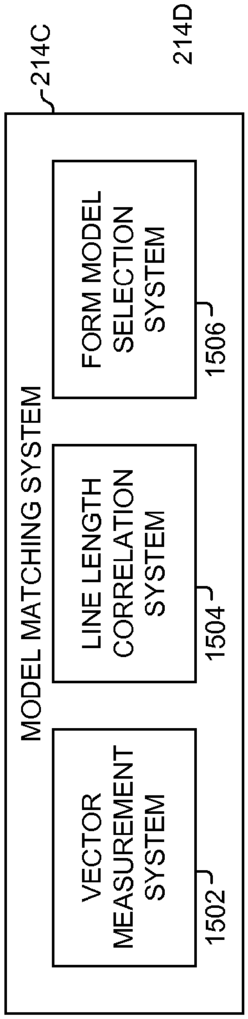
FIG. 15 is a block diagram of a model matching system in accordance with another embodiment of the present invention.

FIG. 15 depicts another exemplary embodiment of a model matching system 214C. The model matching system 214C of FIG. 15 includes a vector measurement system 1502, a line length correlation system 1504, and a form model selection system 1506. The vector measurement system 1502 may be the same as or similar to the vector measurement system 1202 of FIG. 12 or the vector measurement system 1406 of FIG. 14.

The line length correlation system 1504 calculates the length of each vertical and horizontal line. The length of each line is used as a factor to determine how closely a comparing form model matches an analyzed model. In one embodiment, the line length correlation system 1504 uses the line length calculated with the projection profile.

In this embodiment, the line length correlation system 1504 correlates the relative line length of each vertical line from the analyzed model to the relative line length of each vertical line in the comparing form model. Similarly, the line length correlation system 1504 correlates the relative line length of each horizontal line of the analyzed model to the relative line length of each horizontal line from the comparing form model. A line length correlation factor is generated based on the comparison. For example, the length of a line from a comparing form model may be 90% of the length of the comparing line from the analyzed model or the difference between two relative line lengths. The line length correlation factor may be identified as a percentage, a relative difference in the values of the relative line lengths (such as 0.9−0.85=0.05), or in another manner. In one embodiment, the total line length correlation factor is a sum of each line length correlation factor.

In another embodiment, the line length correlation system 1504 is used with the line position correlation system 1402 of FIG. 14. Once the line position correlation system 1402 has correlated the lines between the analyzed model and the comparing form model, the line length correlation system 1504 likewise correlates the percentage or relative distance between the analyzed model line and the comparing form model line. In another example, a total line length correlation factor is calculated based upon the percentages or relative values of each compared line.

The form model selection system 1506 operates according to the form model selection system 1204 of FIG. 12 and/or the form model selection system 1408 of FIG. 14. In addition, the form model selection system 1506 uses the line length correlation factor as an additional factor in determining a matching form model. The line length correlation factor may be weighted equally to other factors, such as the Euclidean norm of the vertical position tags, the Euclidean norm of the horizontal position tags, the vertical line gaps number, and the horizontal line gaps number. In other embodiments, the factors, including the total line length correlation factor, may be weighted differently.

Figure 16:
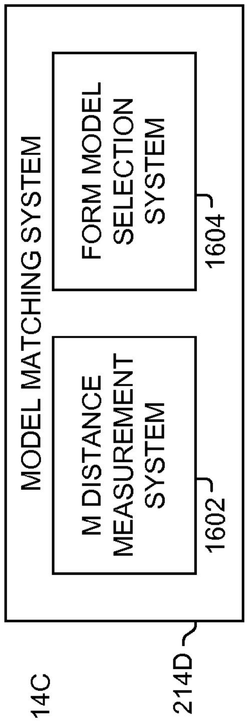
FIG. 16 is a block diagram of a model matching system in accordance with another embodiment of the present invention.

FIG. 16 depicts another exemplary embodiment of a model matching system 214D. In this embodiment, the model matching system includes a Mahalanobis distance ("M distance") measurement system 1602 in place of the Euclidean vector measurement system. The Mahalanobis distance is given by the following equation:

$$d(\vec{x},\vec{y})=\sqrt{(\vec{x}-\vec{y})^T\Sigma^{-1}(\vec{x}-\vec{y})}$$

where $\vec{x}$ is the vector x with the position tags for a model, such as an analyzed model, $\vec{y}$ is the vector y with the positions tags for another model, such as a comparing form model, T identifies the transpose, and Σ is the covariance matrix for vectors x and y.

The M distance measurement system 1602 measures the Mahalanobis distance between the vertical position tags array of an analyzed model and a vertical position tags array of a comparing form model. The M distance measurement system 1602 also measures the Mahalanobis distance between the horizontal position tags array of an analyzed model and the horizontal position tags array of a comparing form model.

The form model selection system 1604 selects a comparing model having a smallest Mahalanobis distance for the vertical position tags arrays and a smallest Mahalanobis distance between the horizontal position tags arrays. In another embodiment, the Mahalanobis distance between the vertical position tags arrays may be given a greater weight than the Mahalanobis distance between the horizontal position tags arrays.

Figure 17:
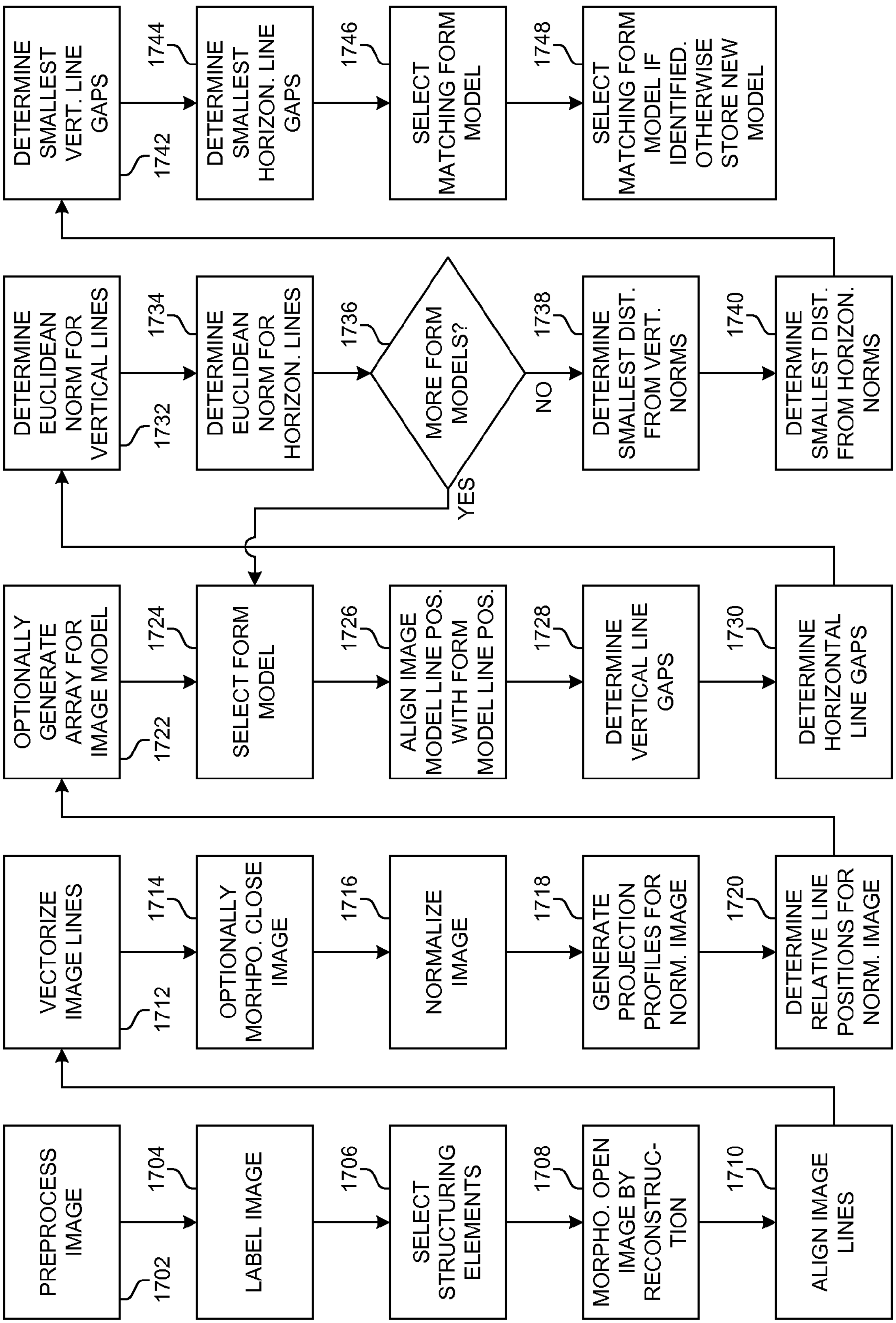
FIG. 17 is a flow diagram for automatically processing forms in accordance with another embodiment of the present invention.

FIG. 17 depicts an exemplary embodiment of a method for automatically processing forms. The method may be accomplished by executing instructions on or using a processor, including executable programming instructions or other code stored on computer readable media, such as memory. In one example, the method is accomplished using a forms processing system.

An image is preprocessed at step 1702. Preprocessing may include binarization, deskew, denoise, and/or despeckle of a form image. Image labeling is performed at step 1704 where characters in the form image are labeled and the average text size in the form image is determined. At step 1706, one or more structuring elements are selected, and the sizes of the structuring elements are based on the average text size determined in the image labeling step 1704.

A frame of the image is extracted by performing a morphological opening by reconstruction on the form image at step 1708. A model image then is generated by aligning, vectorizing, and morphologically closing the image frame at steps 1710-1714. The morphological closing step 1714 is optional.

The model image is normalized for the selected scale at step 1716, and vertical and horizontal projection profiles of the normalized model image are generated at step 1718. The relative positions of vertical and horizontal lines of the normalized model image are determined from the vertical and horizontal projection profiles at step 1720, and an array optionally is generated with the relative positions of the vertical lines and the relative positions of the horizontal lines at step 1722.

A form model is selected for analysis at step 1724. For example, multiple form models may be saved in a models database or other structure or record. At least one of the form models is selected for analysis from the database or other structure or record. At step 1726, the relative positions of the vertical lines of the normalized model image are aligned with the relative positions of the vertical lines of the form model. Similarly, the relative positions of the horizontal lines of the normalized model image are aligned with the relative positions of the horizontal lines of the form model.

The aligned relative positions of the vertical lines of the normalized model image are compared to the corresponding relative positions of the vertical lines of the form model at step 1728 to determine a number of vertical line gaps between the model image and the form model. Each vertical line gaps number indicates a location where at least one vertical line of the normalized model image does not have a corresponding vertical line in the form model. The aligned relative positions of the horizontal lines of the normalized model image are compared to the corresponding relative positions of the horizontal lines of the form model at step 1730 to determine a number of horizontal line gaps between the model image and the form model. Each horizontal line gaps number indicates a location where at least one horizontal line of the normalized model image does not have a corresponding horizontal line in the form model. Steps 1728 and 1730 are optional in some embodiments.

A first (vertical) Euclidean norm is calculated between the aligned relative positions of the vertical lines of the normalized model image and the corresponding relative positions of the vertical lines of the form model at step 1732. A second (horizontal) Euclidean norm is calculated between the aligned relative positions of the horizontal lines of the normalized model image and the corresponding relative positions of the horizontal lines of the form model at step 1734.

At step 1736, it is determined whether another form model is to be analyzed. If another form model is to be analyzed, the process goes back to step 1724. Otherwise, the process moves to step 1738.

A smallest vertical distance is determined from the first (vertical) Euclidean norms at step 1738, and a smallest horizontal distance is determined from the second (horizontal) Euclidean norms at step 1740. A smallest vertical line gaps number is determined from the vertical line gaps numbers at step 1742, and a smallest horizontal line gaps number is determined from the horizontal line gaps numbers at step 1744. Steps 1742 and 1744 are optional in some embodiments.

At step 1746, a particular form model is selected as a matching form model from the form models if the selected form model has the smallest vertical distance, the smallest horizontal distance, the smallest vertical line gaps number, and the smallest horizontal line gaps number. In other examples, the particular form model is selected as a matching form model if the selected form model has the smallest vertical distance and the smallest horizontal distance. In other examples, the particular form model is selected as a matching form model if the selected form model has one or more of the smallest vertical distance, the smallest horizontal distance, the smallest vertical line gaps number, and the smallest horizontal line gaps number. In other examples, the particular form model is selected as a matching form model using the following factors: the smallest vertical distance, the smallest horizontal distance, the smallest vertical line gaps number, and the smallest horizontal line gaps number. In some instances, the factors are weighted equally. In other instances, the factors are weighted differently. For example, the smallest vertical distance and the smallest horizontal distance are weighted greater in one example. The smallest vertical distance and the smallest vertical line gaps number are weighted greater in another example. In still another example, no matching form is selected if the smallest vertical distance and/or the smallest horizontal distance are not within a Euclidean norm threshold. If no matching form model is identified at step 1746, the image model is stored as a new form model.

Combinations and subcombinations of the systems and methods described in association with FIGS. 1-17 may be made. Therefore, combinations and subcombinations of the systems and methods of FIGS. 3-17 may be included in the systems and methods of FIG. 1 and/or FIG. 2.

FIGS. 18-22 depict examples of form images corresponding to form models stored in the models database 206. In these examples, the form images are transcripts from various colleges. FIG. 23 depicts an example of a form image being analyzed by the forms processing system 104A to determine if the analyzed form image and its associated analyzed model match any of the comparing form models stored in the models database 206. FIGS. 24-29 depict the frames generated by the layout extractor 208A for each of the images identified in FIGS. 18-23, respectively. FIGS. 30-35 depict models generated by the model image generator 210A for each of the frames identified in FIGS. 24-29, respectively. FIGS. 36-41 depict vertical projection profiles generated by the projection profile generator 1014 for each of the models identified in FIGS. 30-35, respectively. FIGS. 42-47 depict horizontal projection profiles generated by the projection profile generator 1014 for each of the models identified in FIGS. 30-35, respectively.

Figure 24:
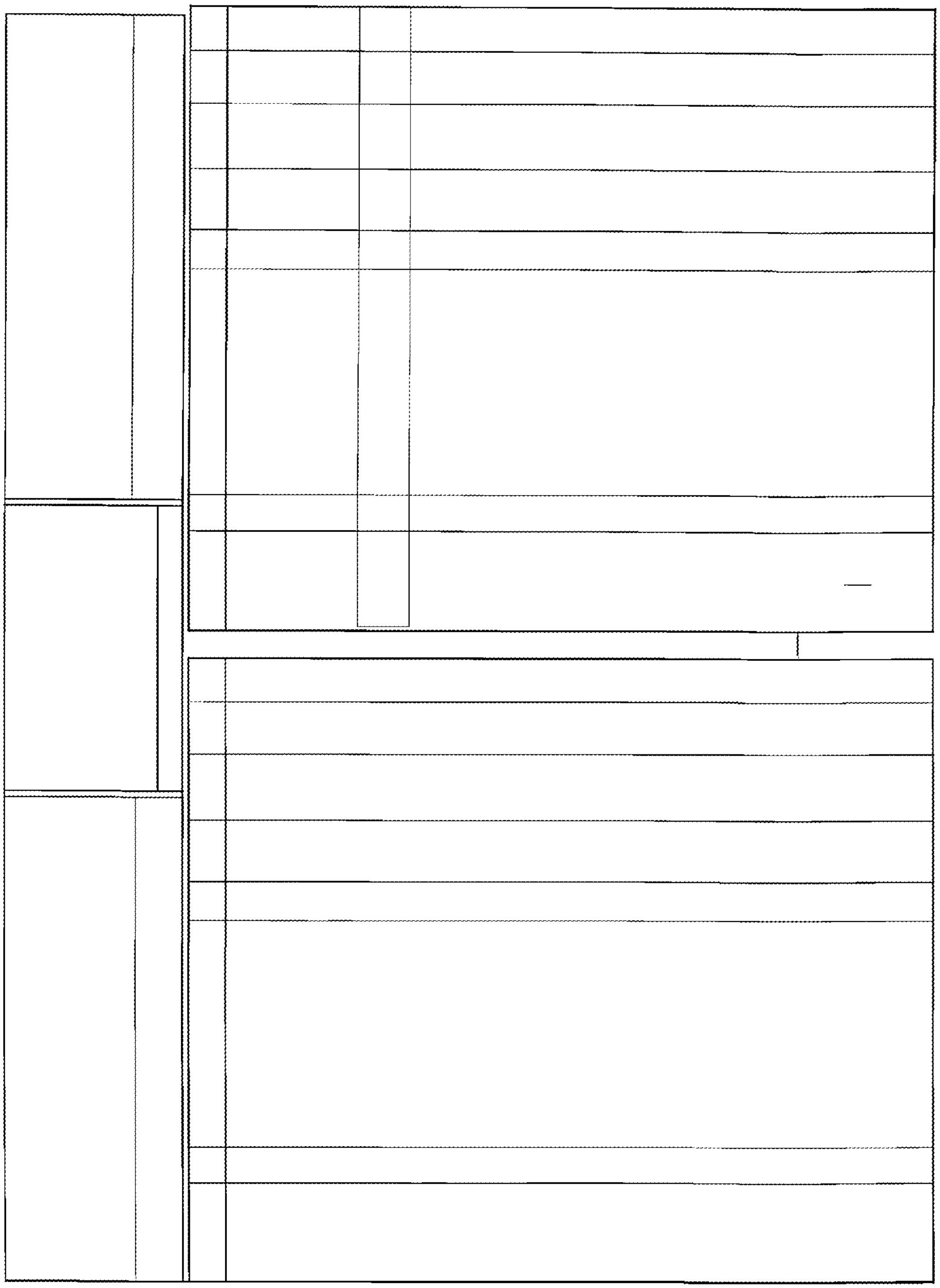
FIGS. 24-29 are frames corresponding to the exemplary forms of FIGS. 18-23.
Figure 25:
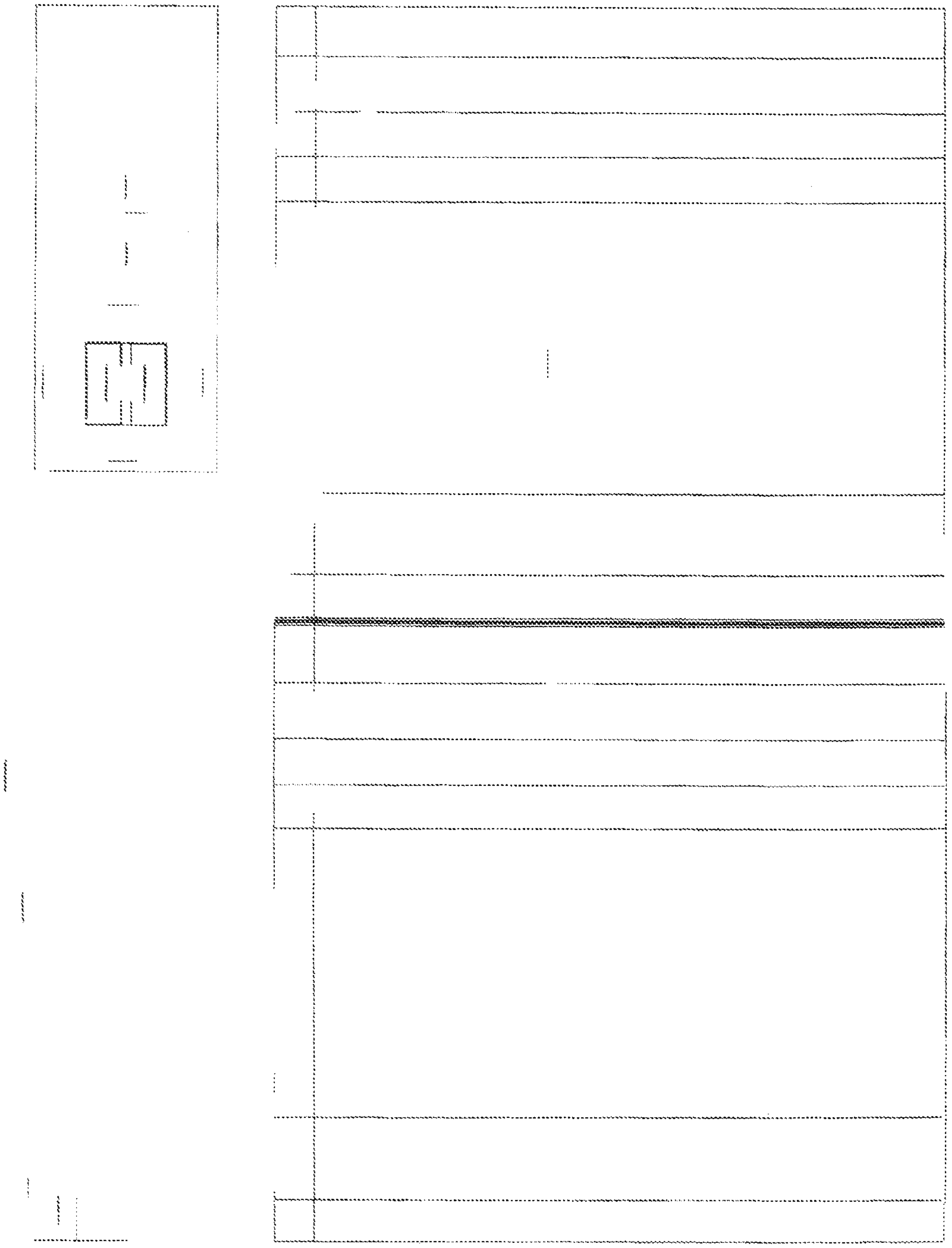
Figure 26:
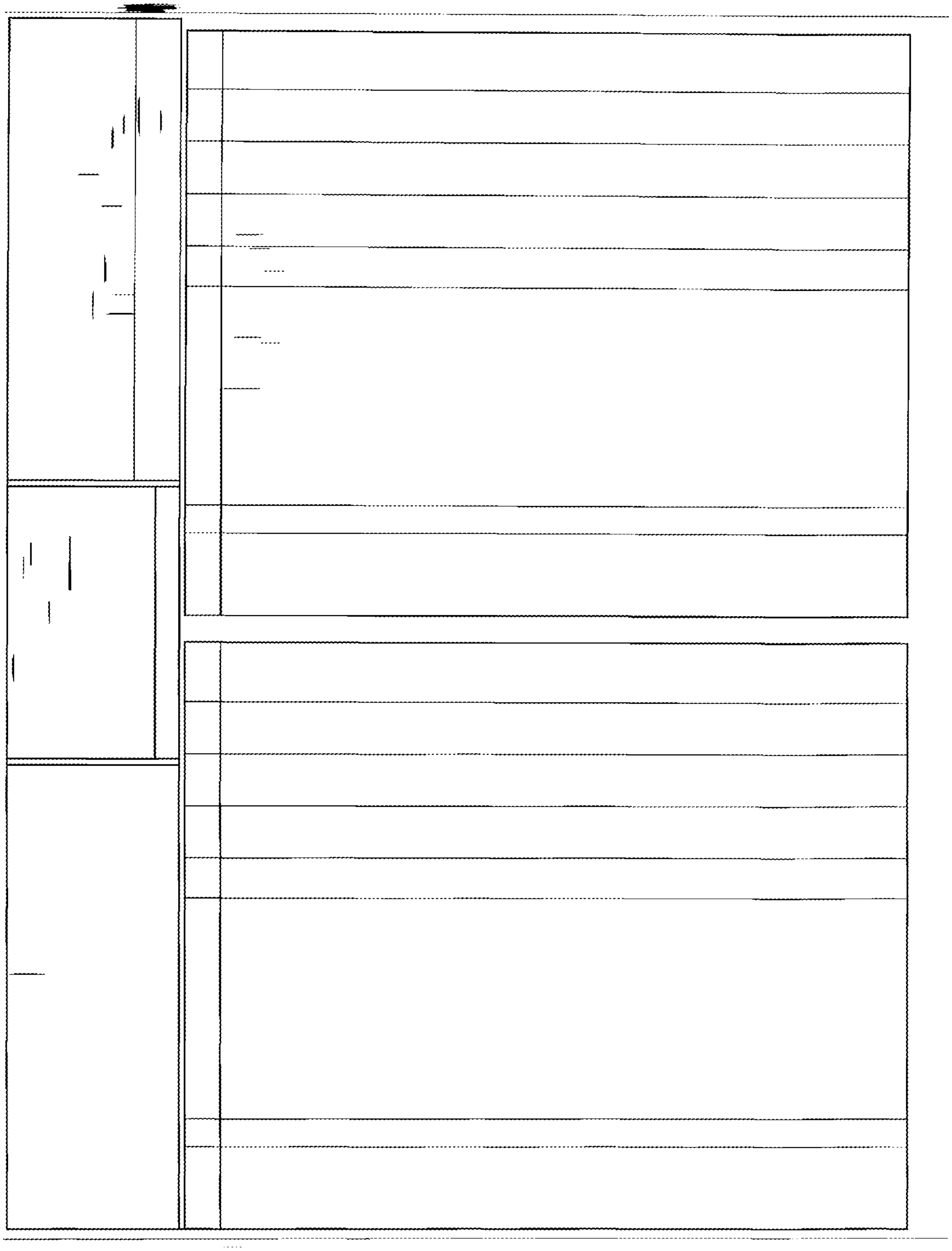
Figure 27:
Figure 28:
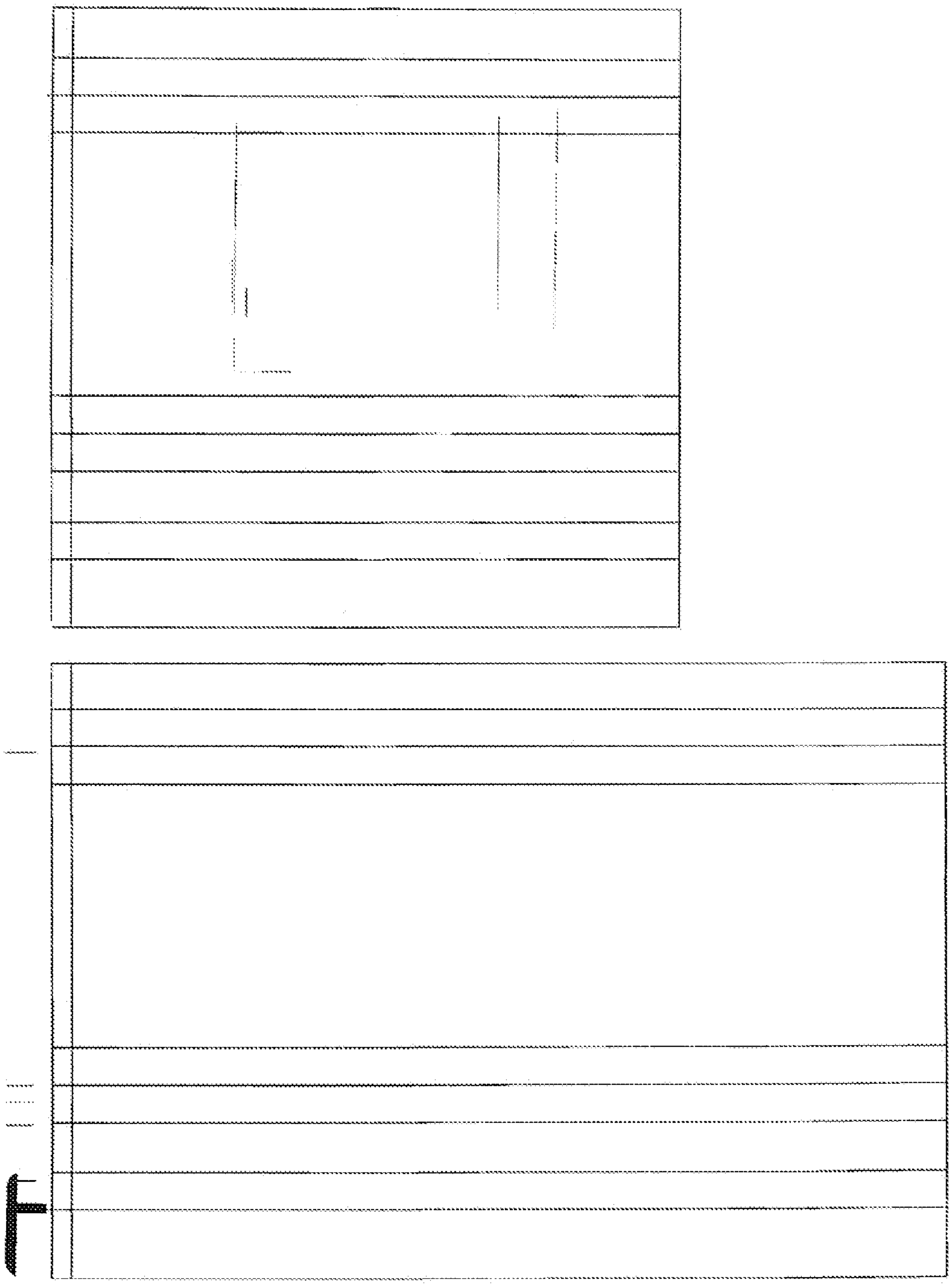
Figure 30:
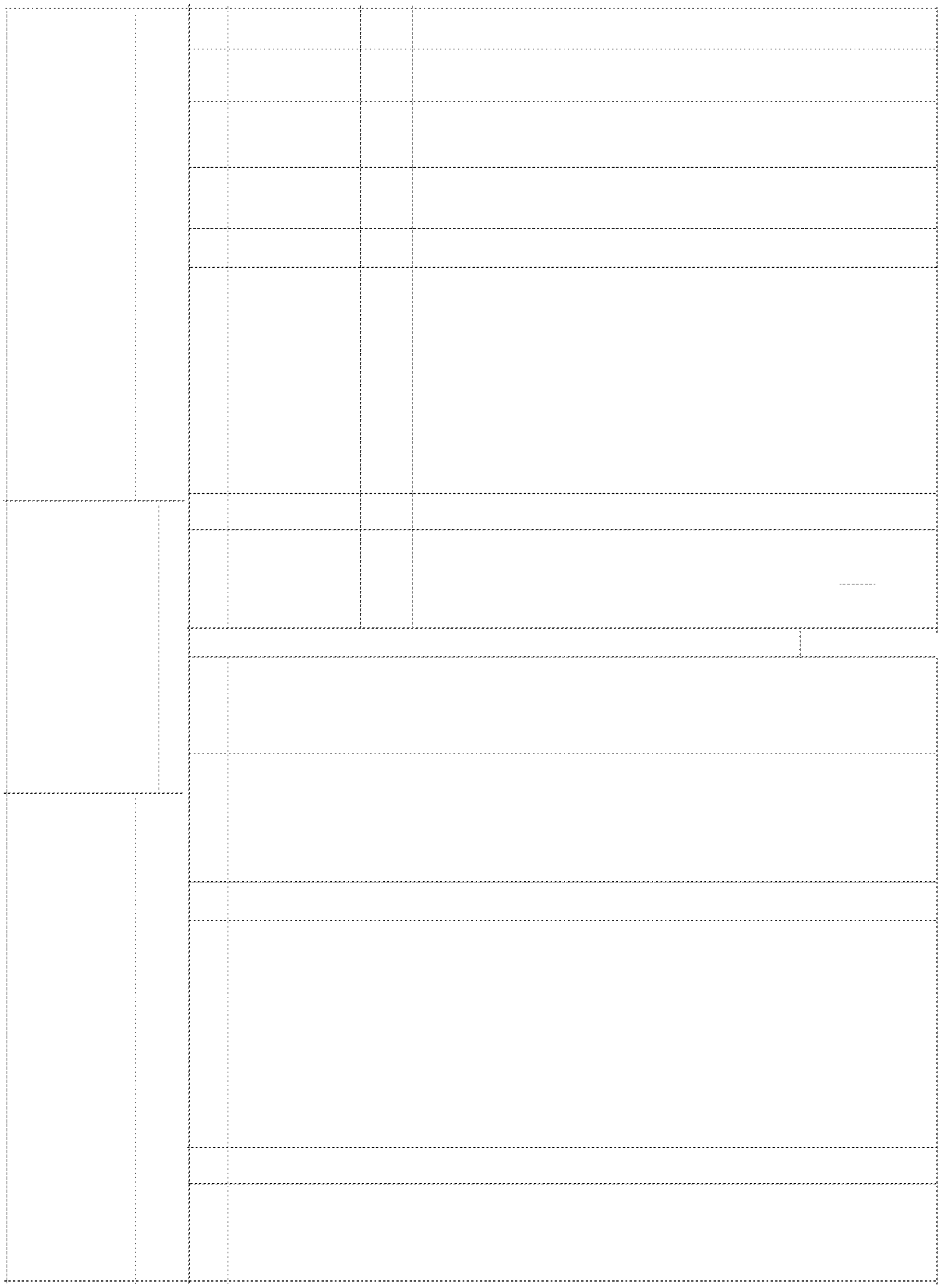
FIGS. 30-35 are model images corresponding to the frames of FIGS. 24-29.
Figure 31:
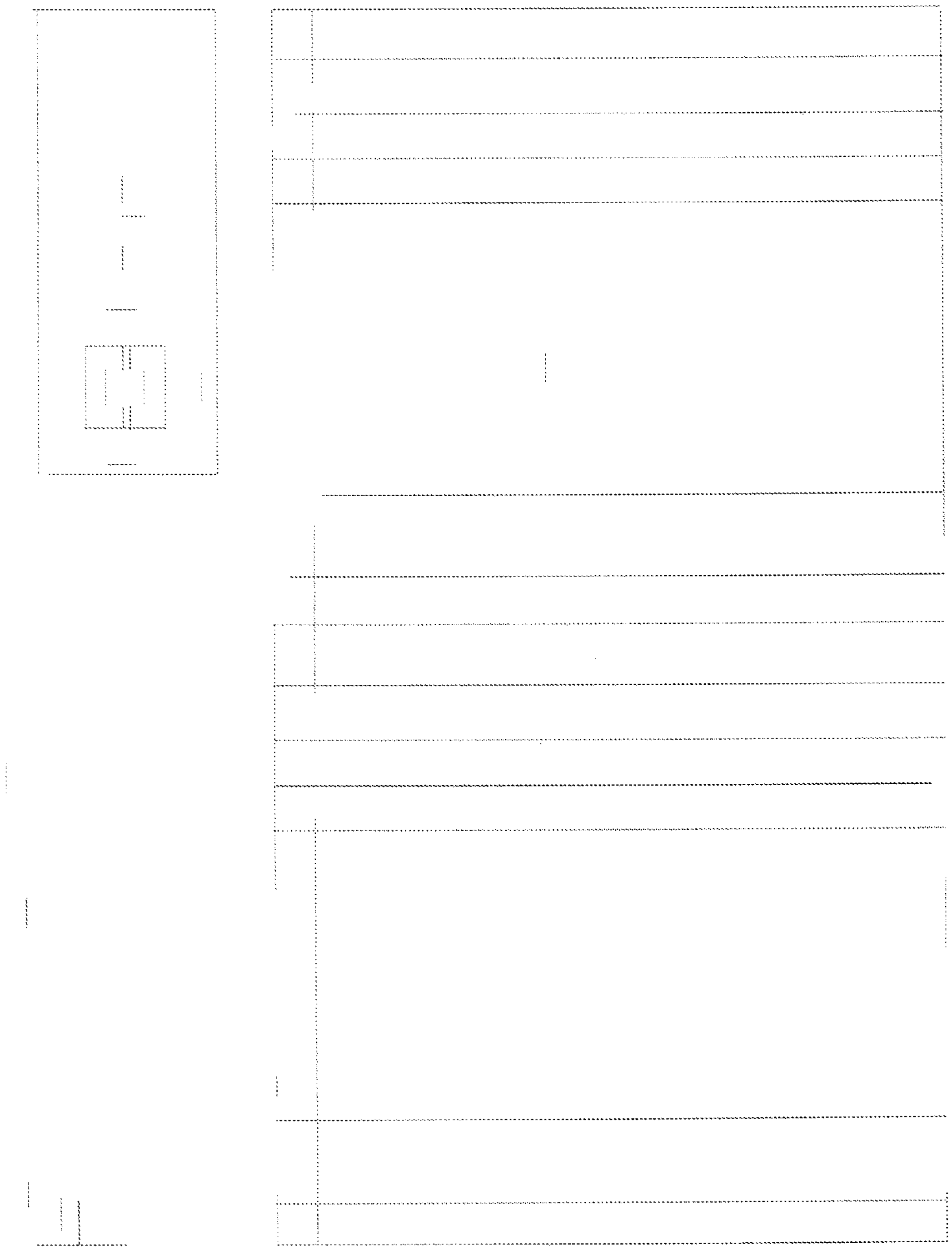
Figure 32:
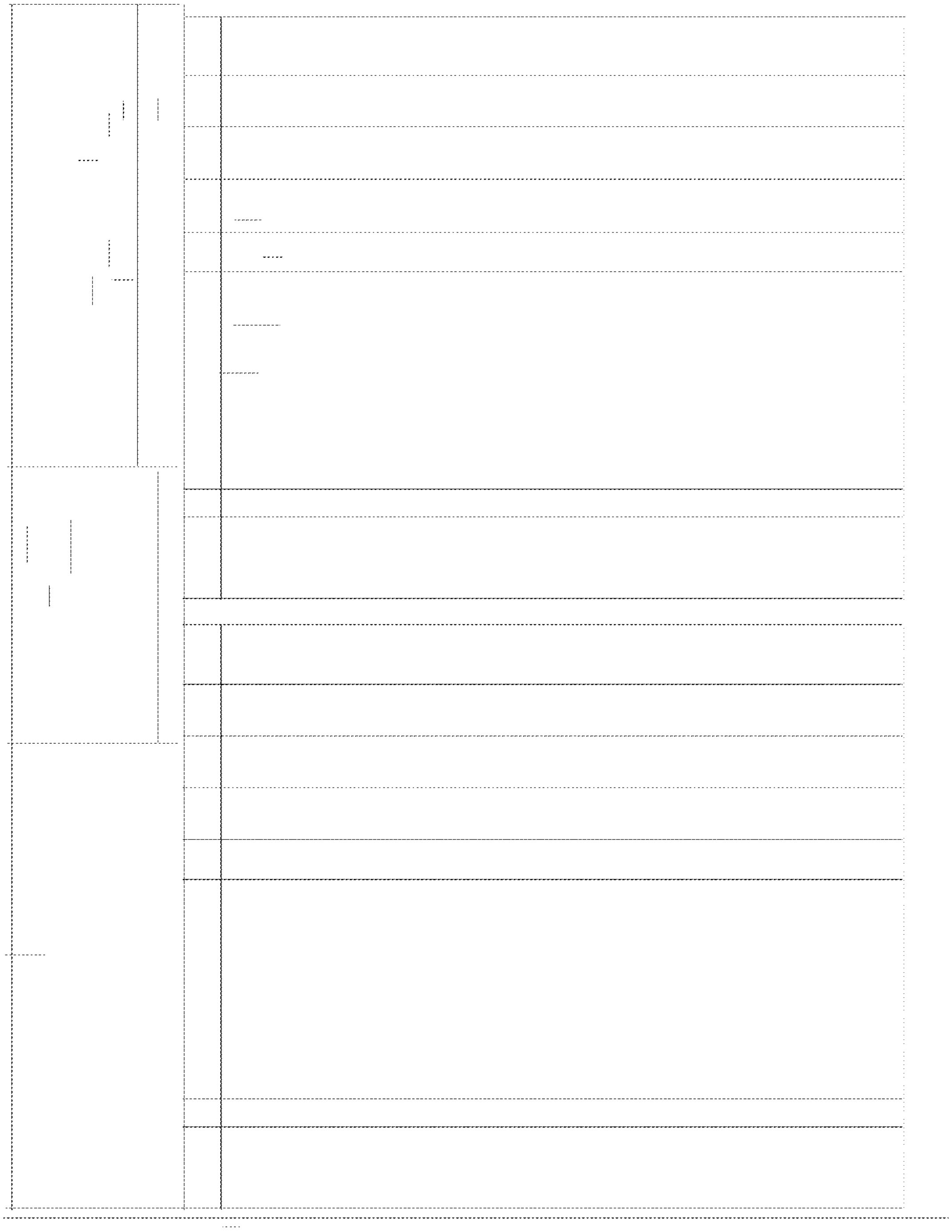
Figure 33:
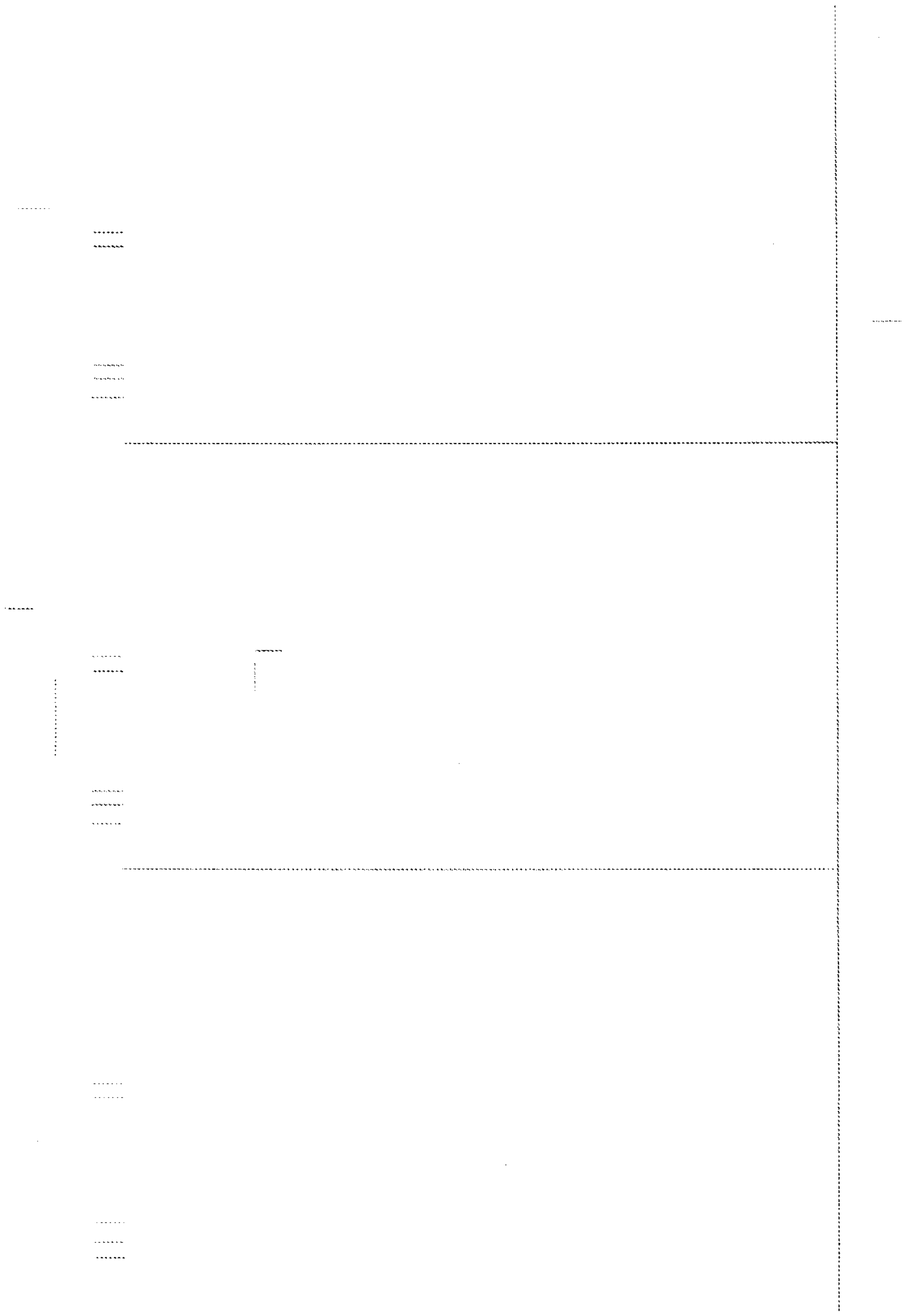
Figure 34:
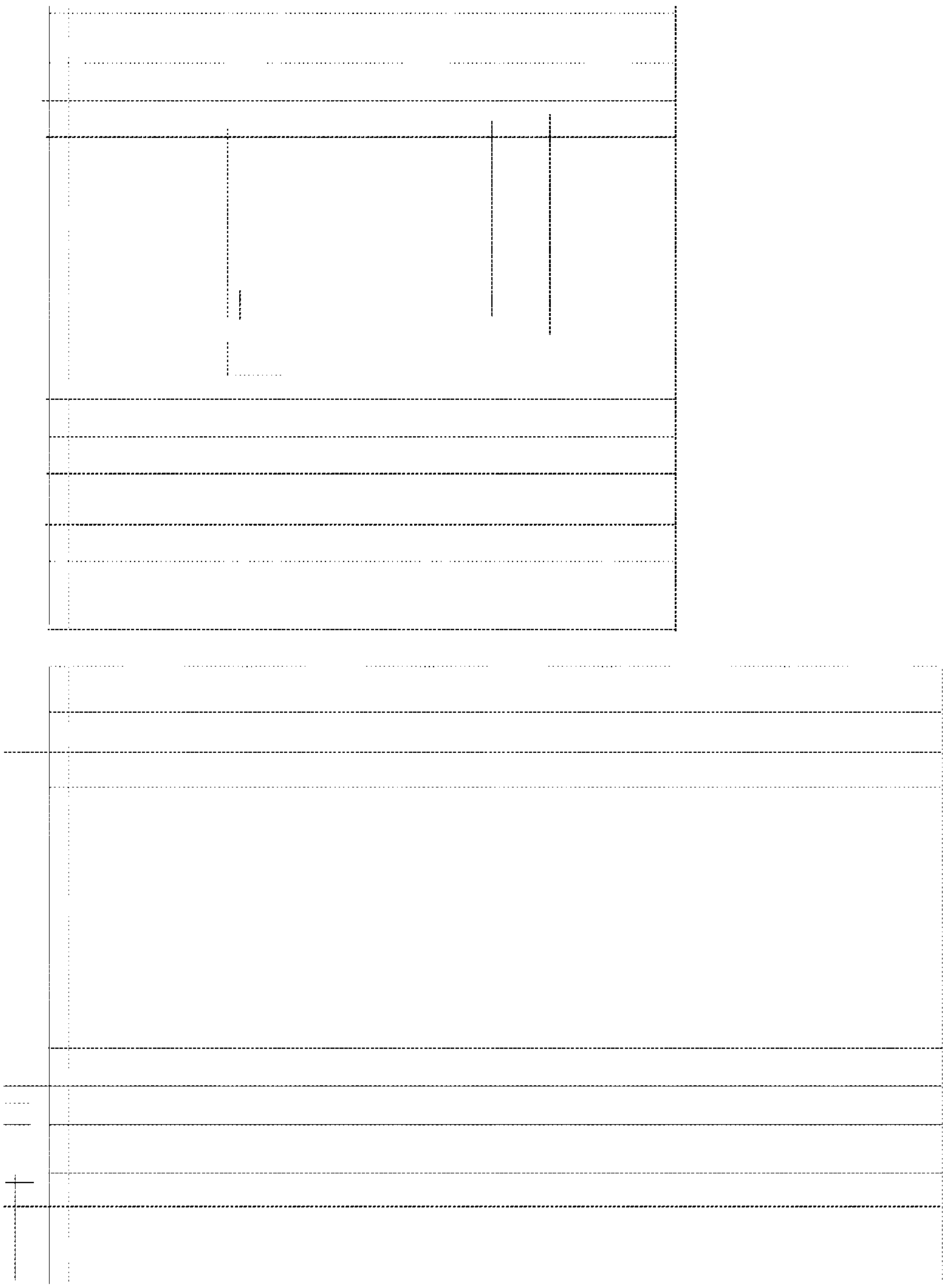
Figure 36:
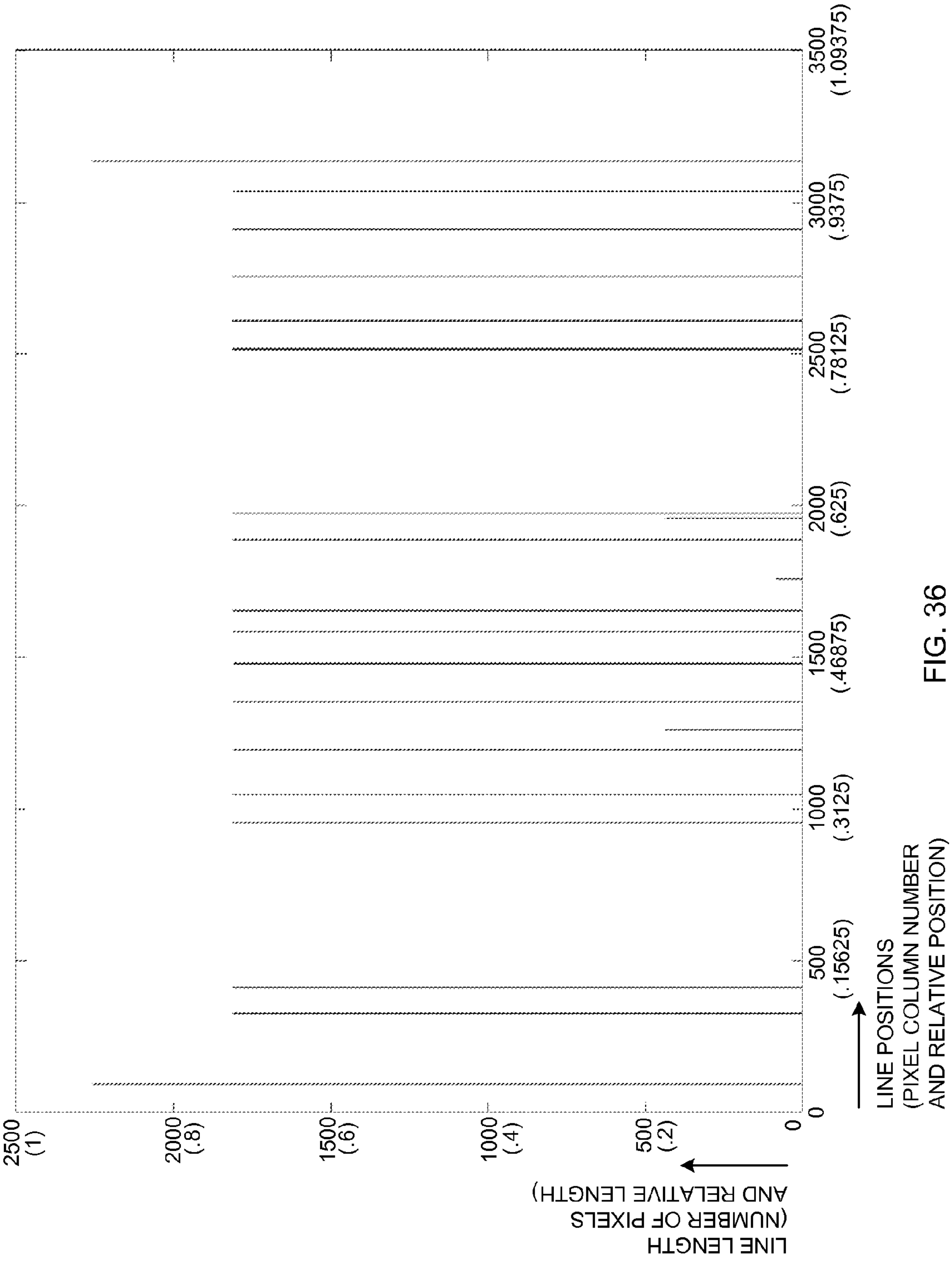
FIGS. 36-41 are vertical projection profiles of the model images of FIGS. 30-35.
Figure 37:
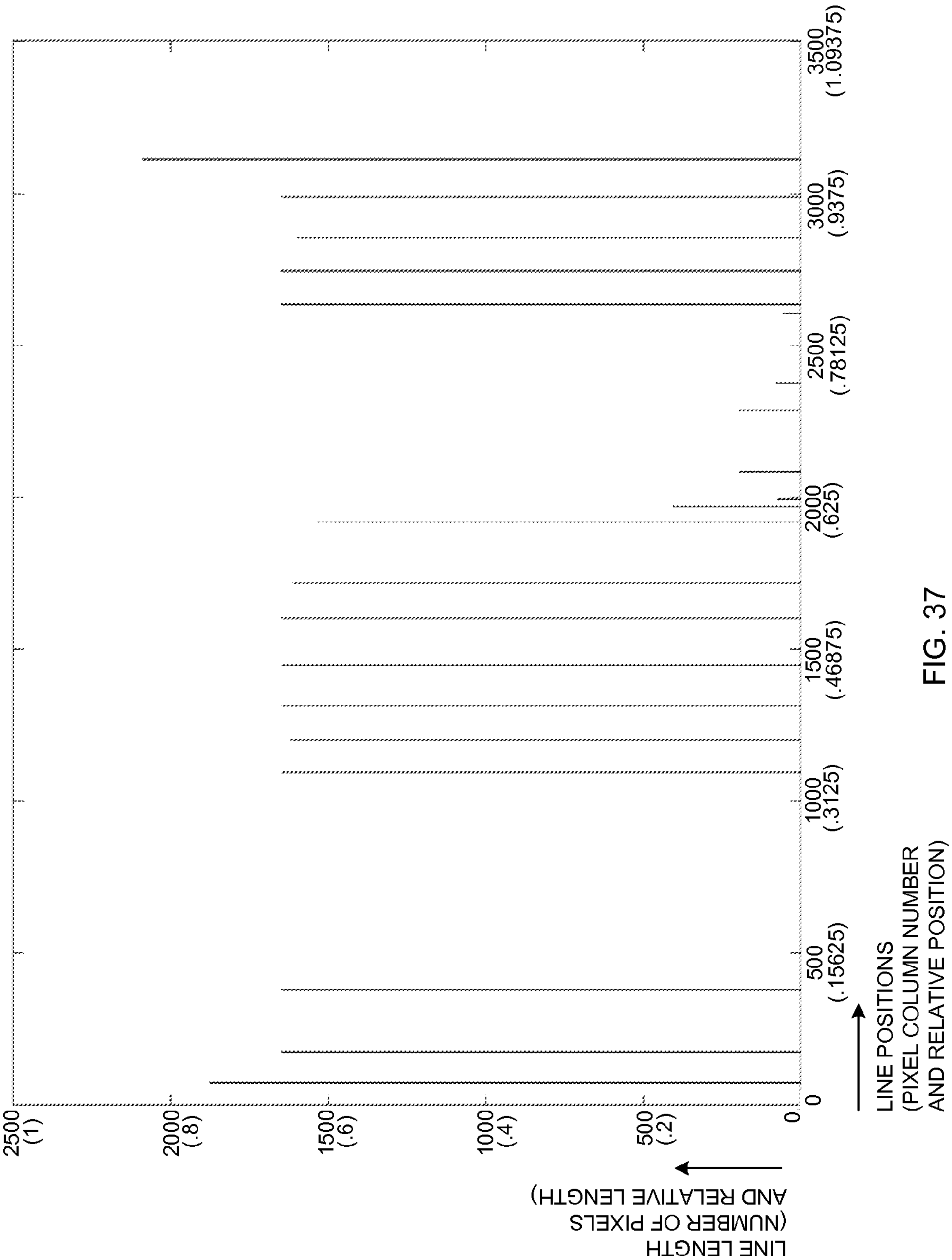
Figure 38:
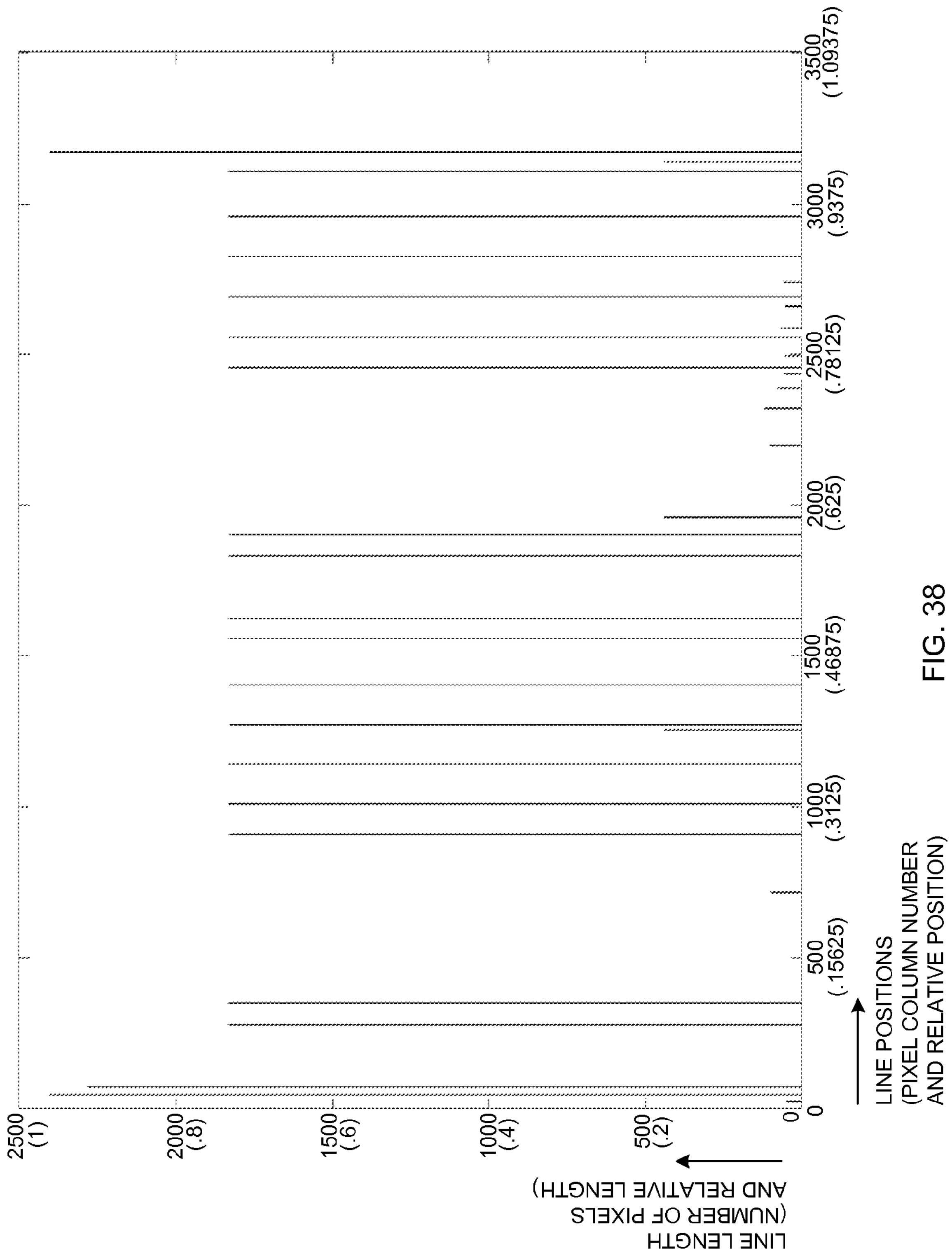
Figure 39:
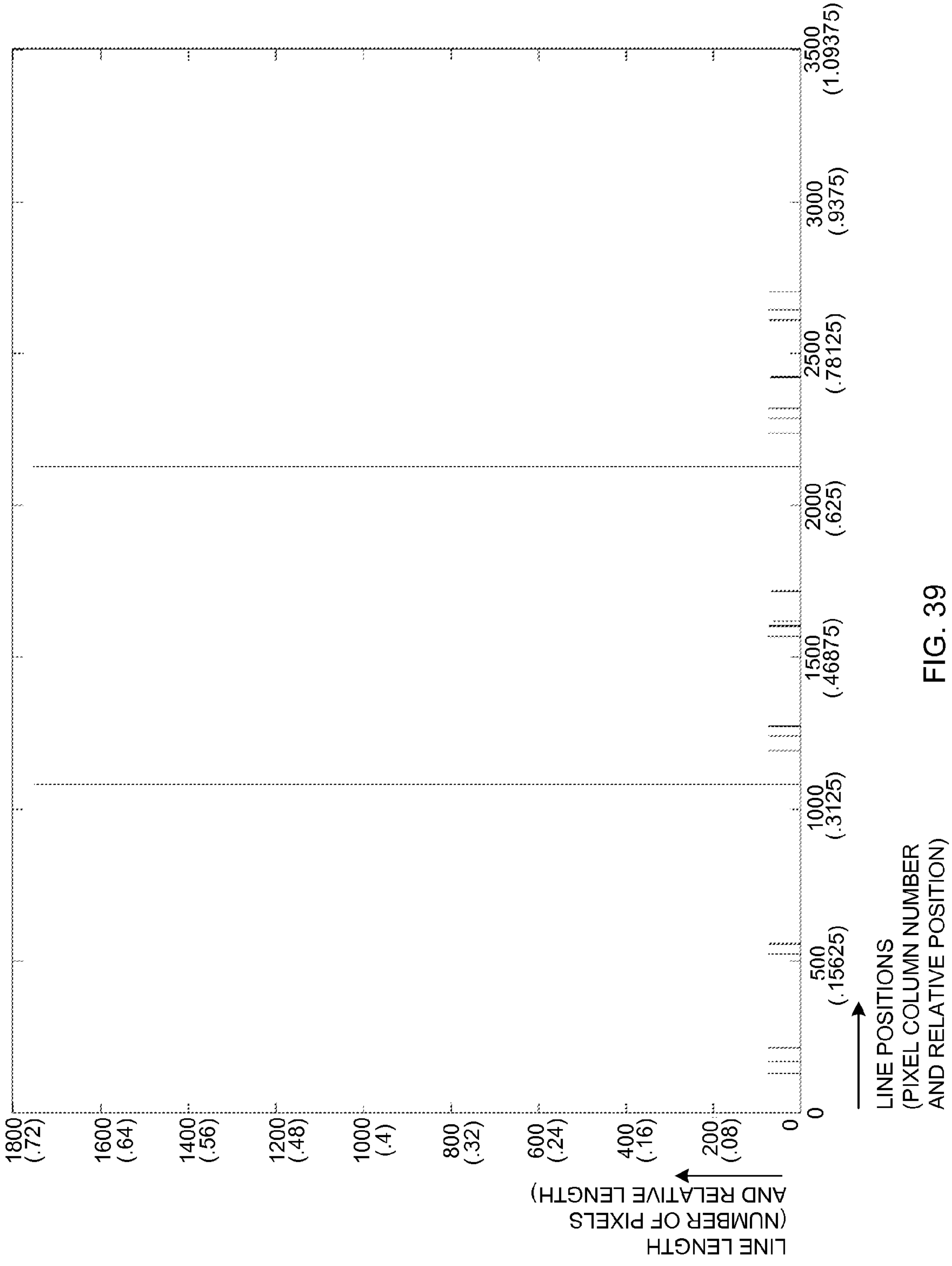
Figure 40:
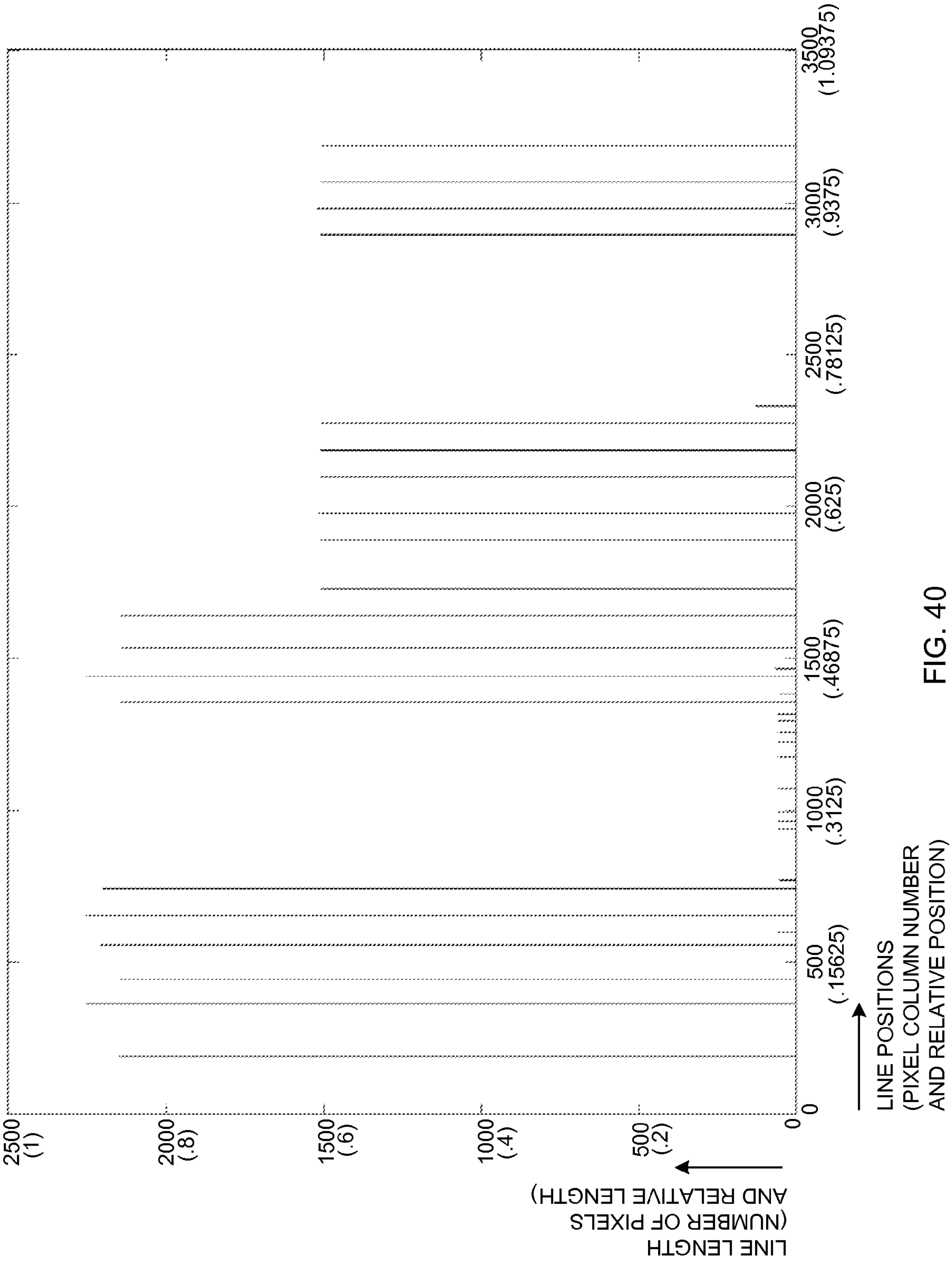
Figure 42:
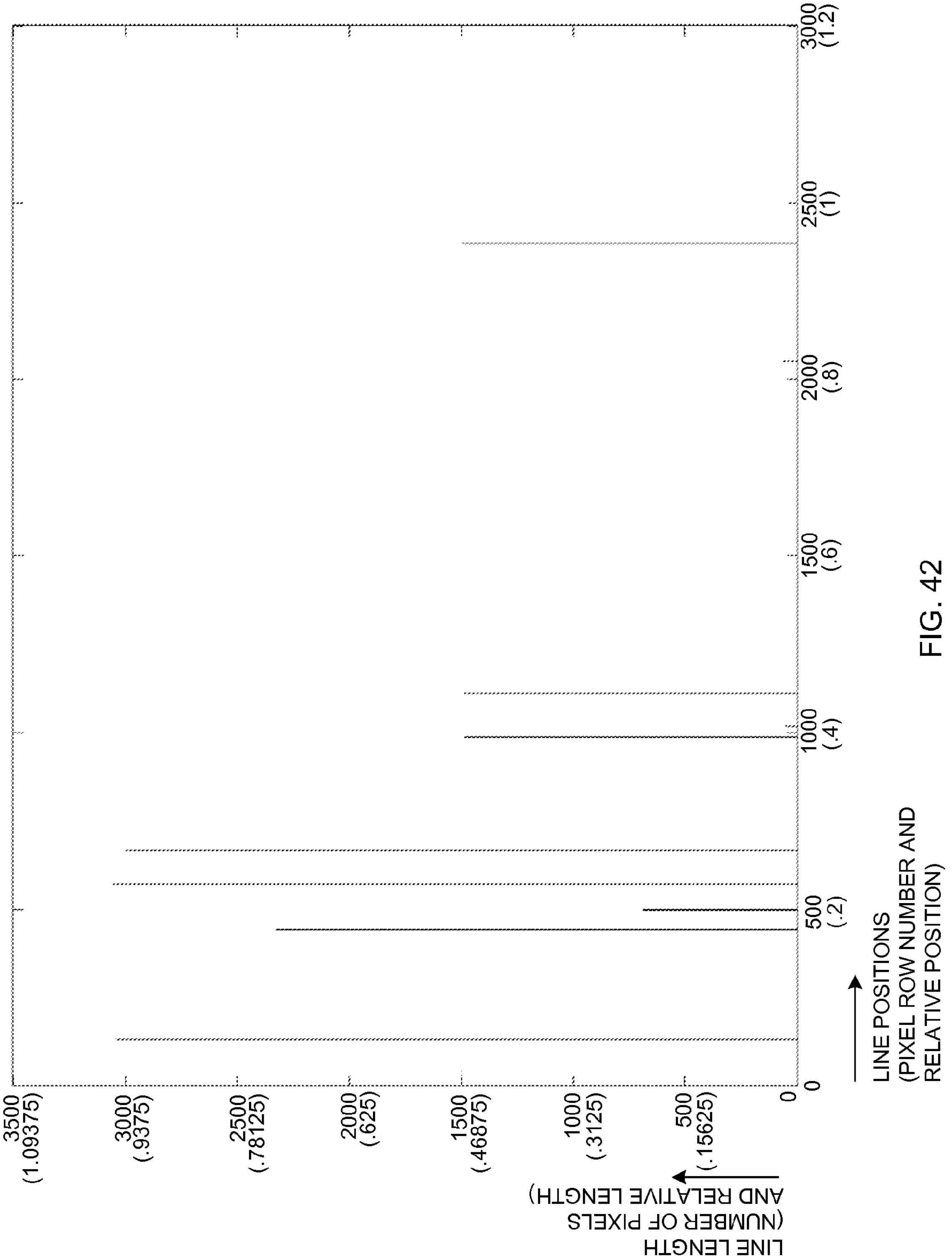
FIGS. 42-47 are horizontal projection profiles of the model images of FIGS. 30-35.
Figure 43:
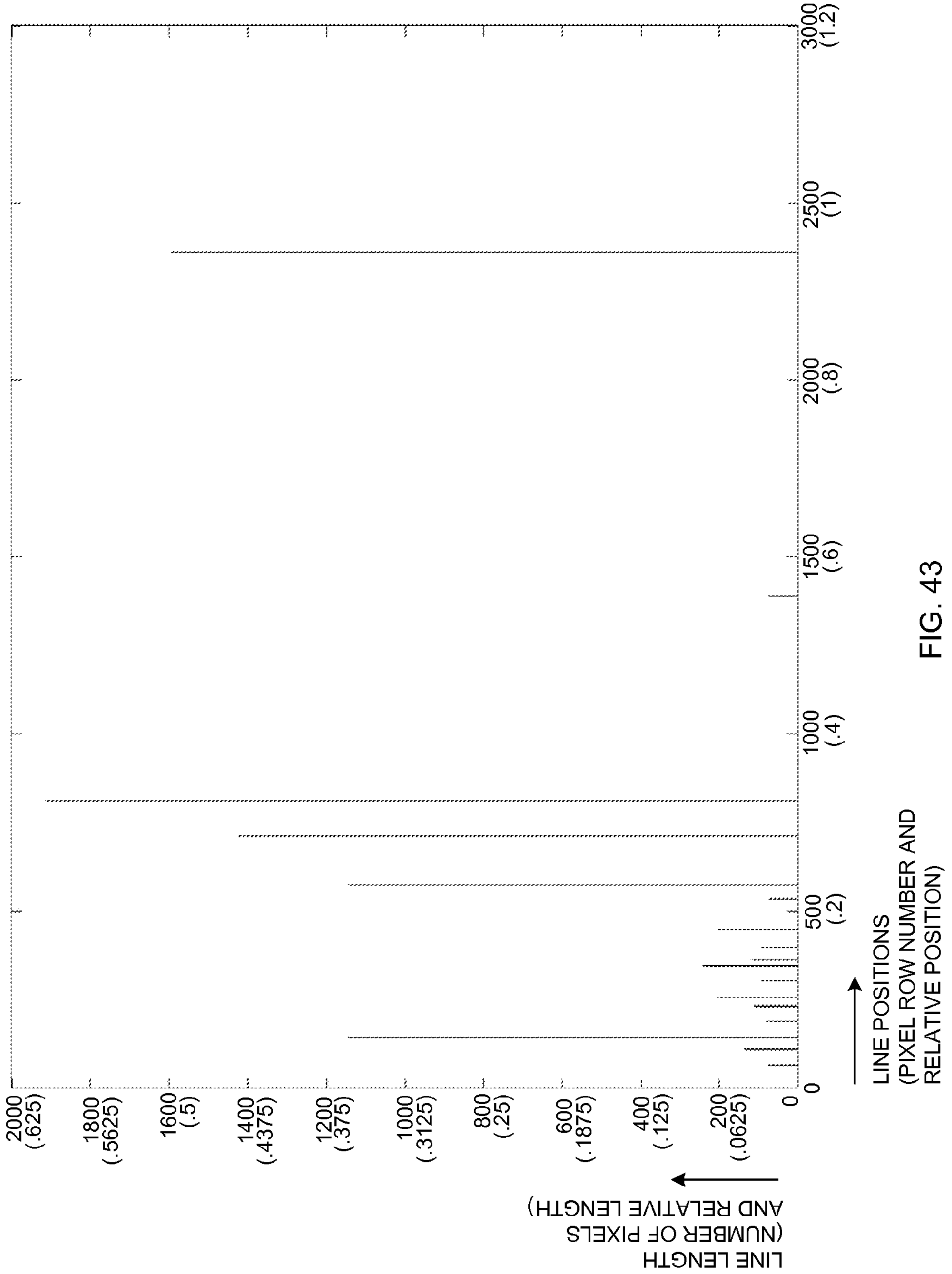
Figure 44:
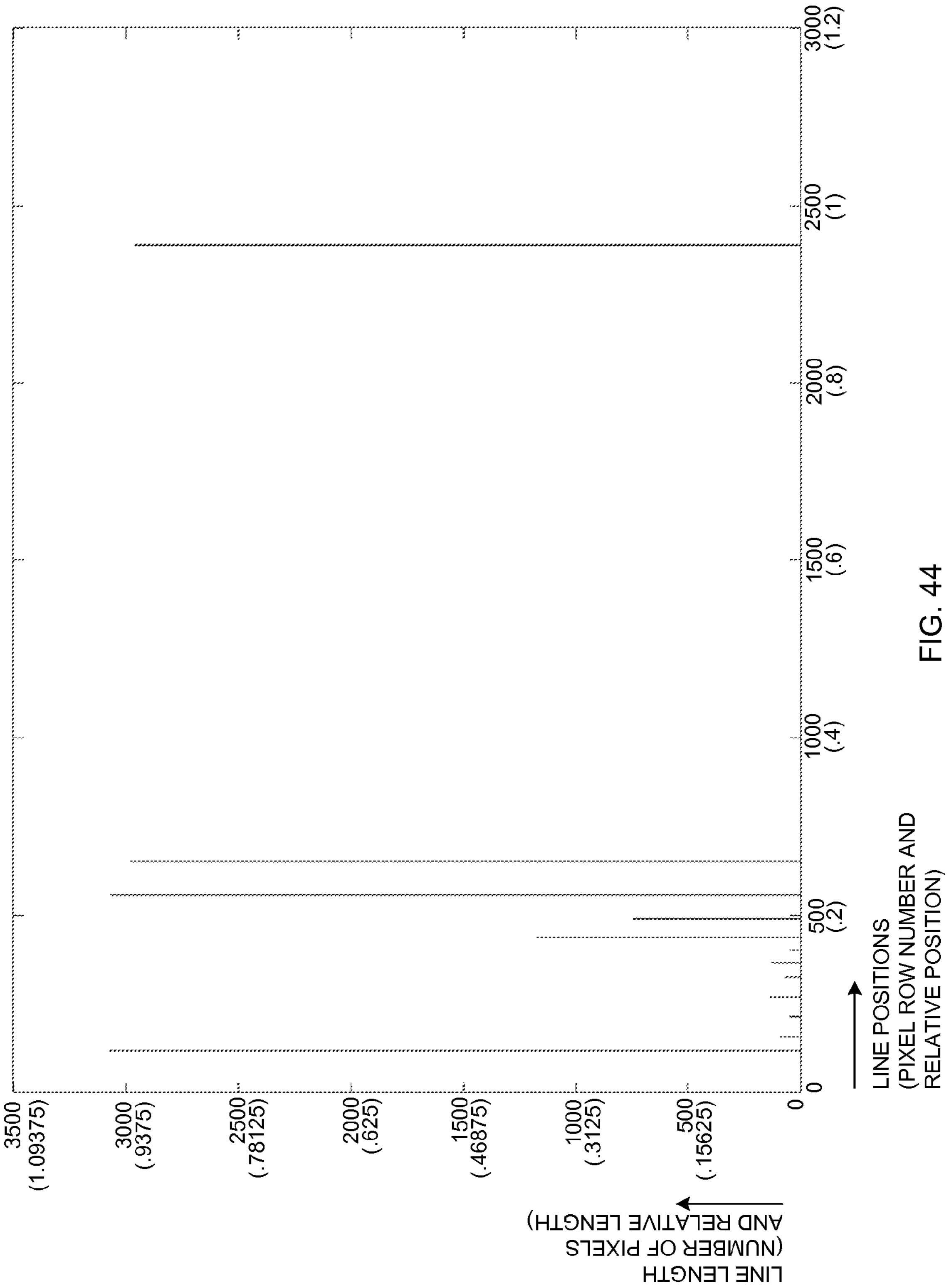
Figure 45:
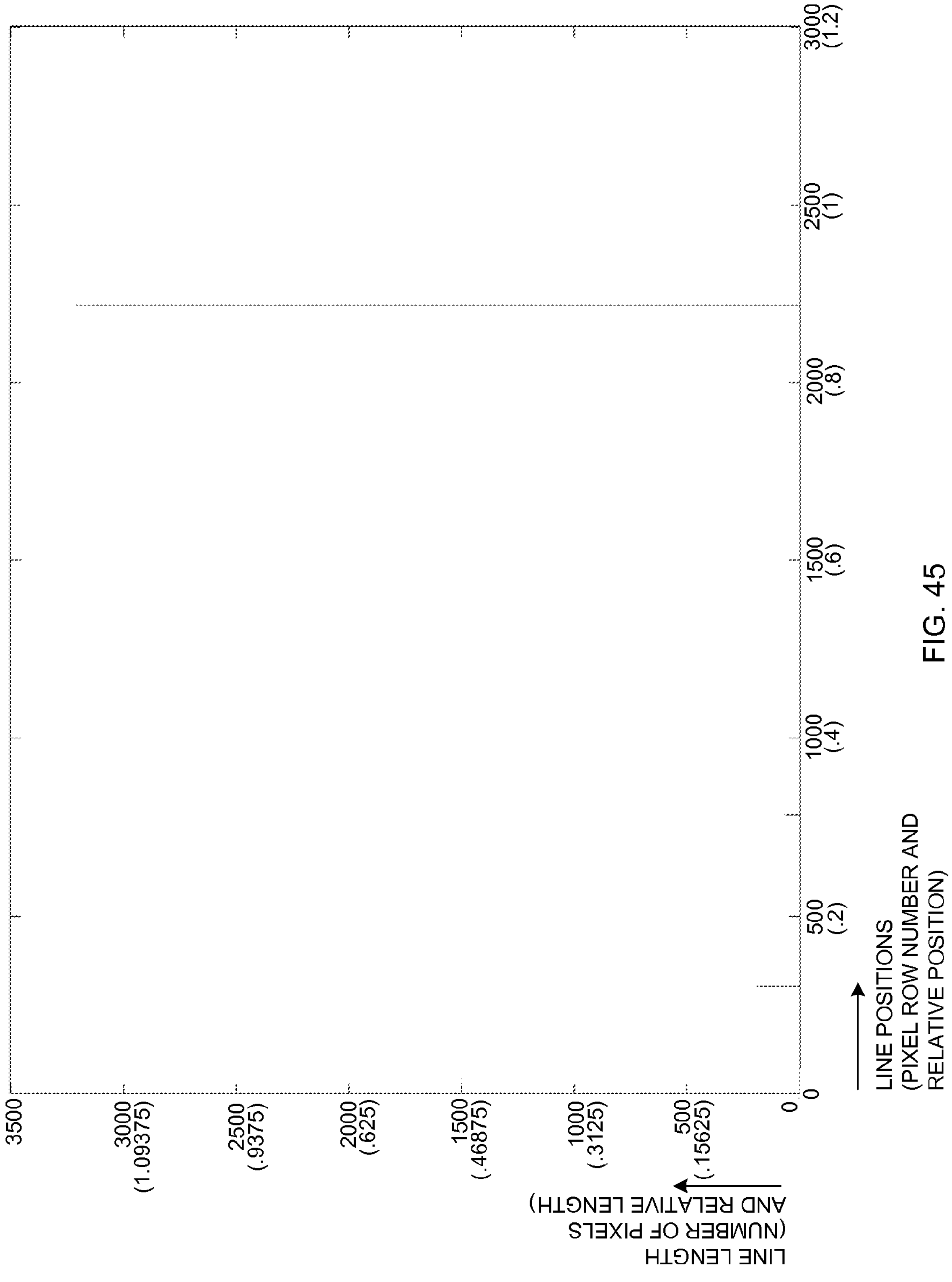
Figure 46:
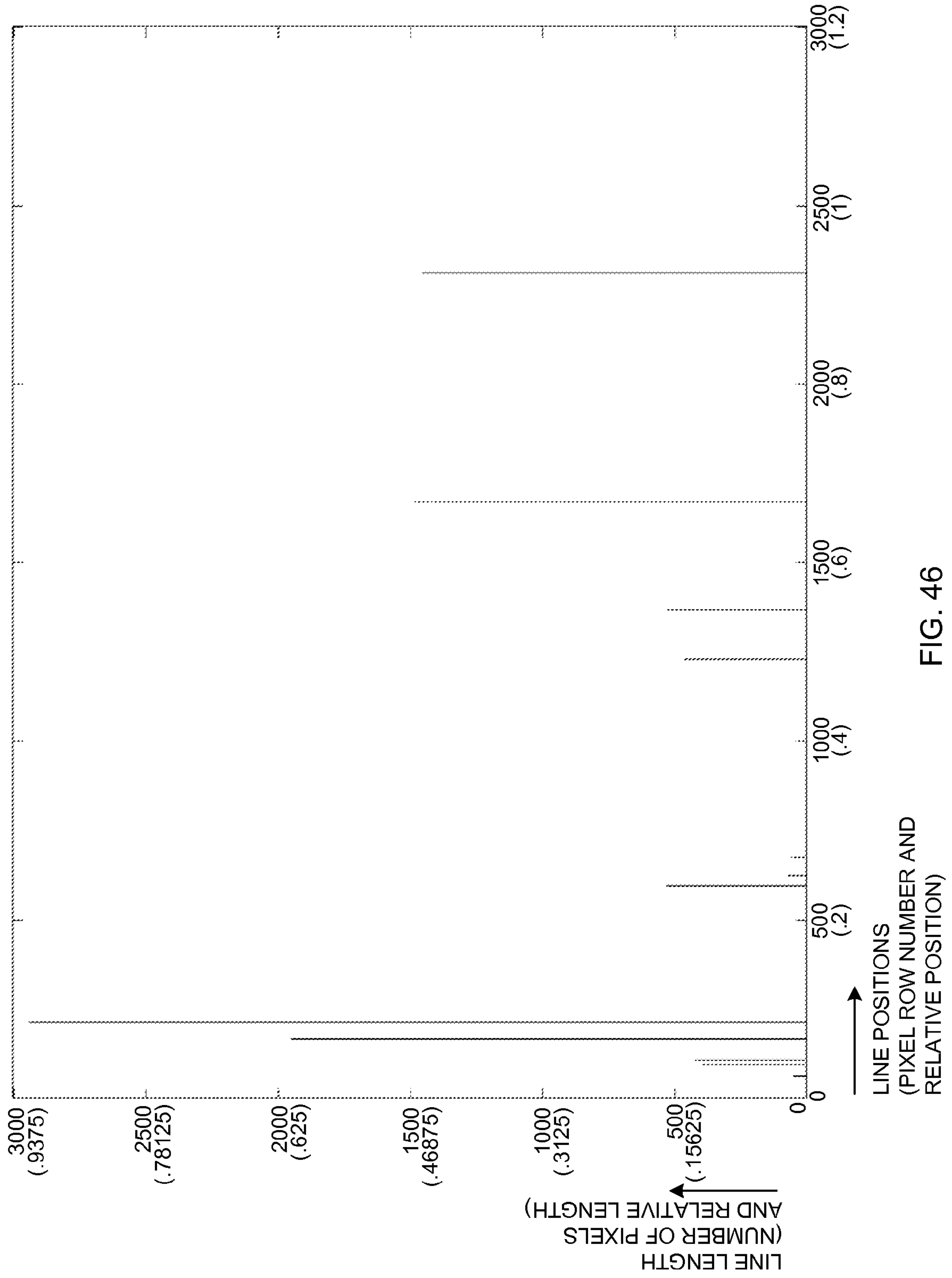

For example, FIG. 18 depicts a form image of a transcript from Blinn College. FIG. 24 depicts the frame extracted for the form image of FIG. 18, and FIG. 30 depicts the model image generated for the frame of FIG. 24. FIG. 36 depicts the vertical projection profile of the model image identified in FIG. 30, and FIG. 42 depicts the horizontal projection profile of the model image identified in FIG. 30.

Figure 29:
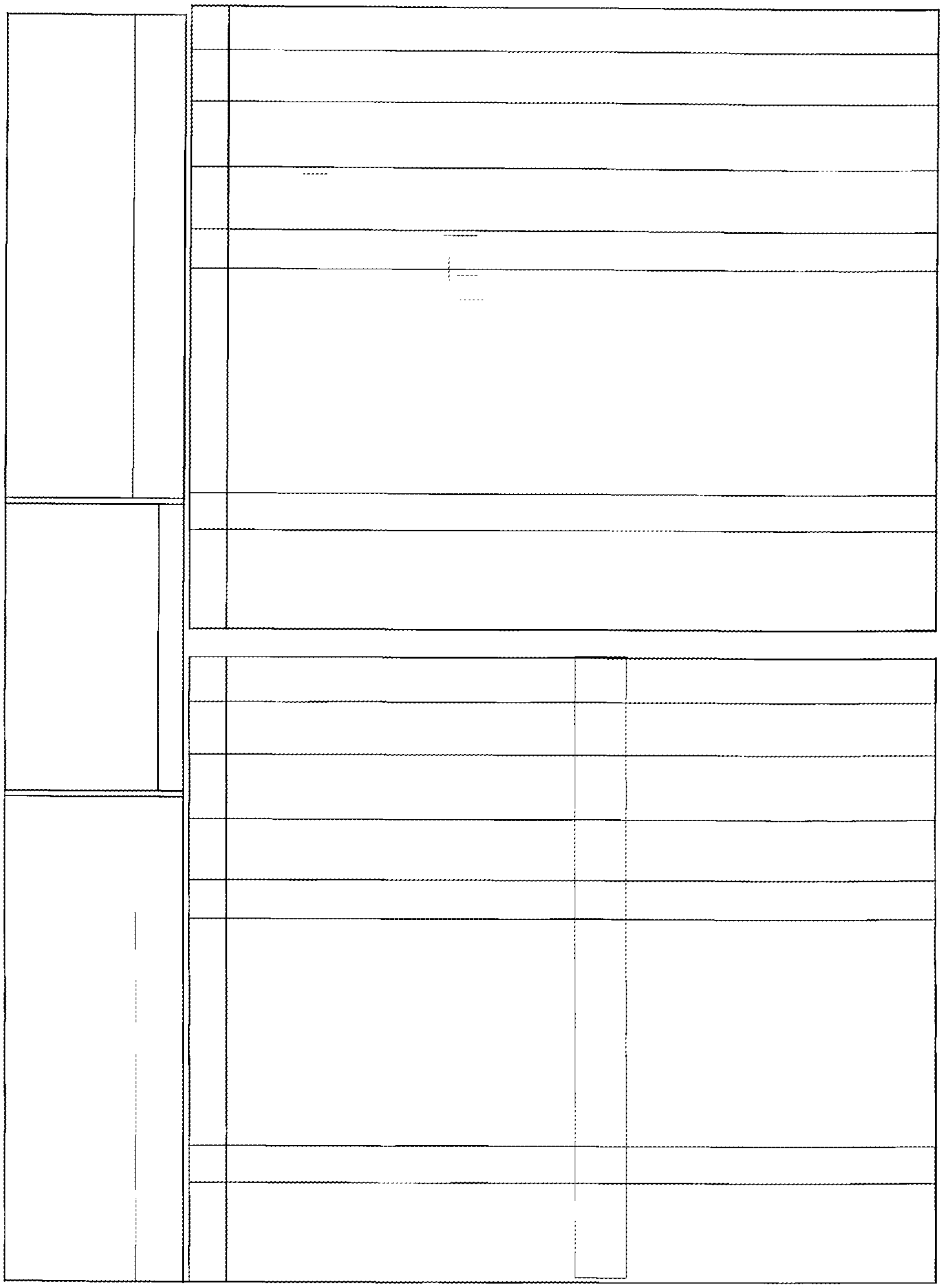
Figure 35:
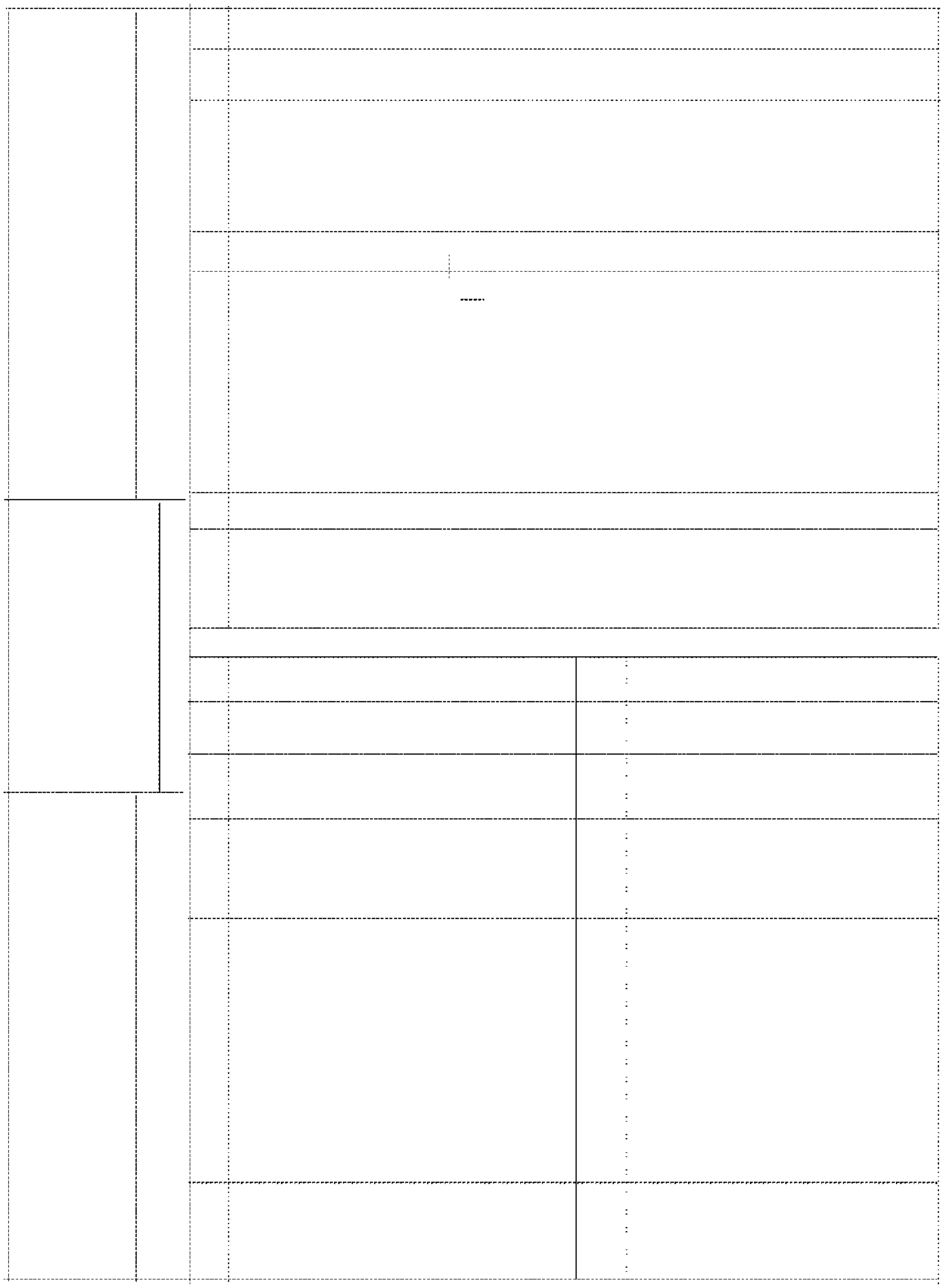
Figure 41:
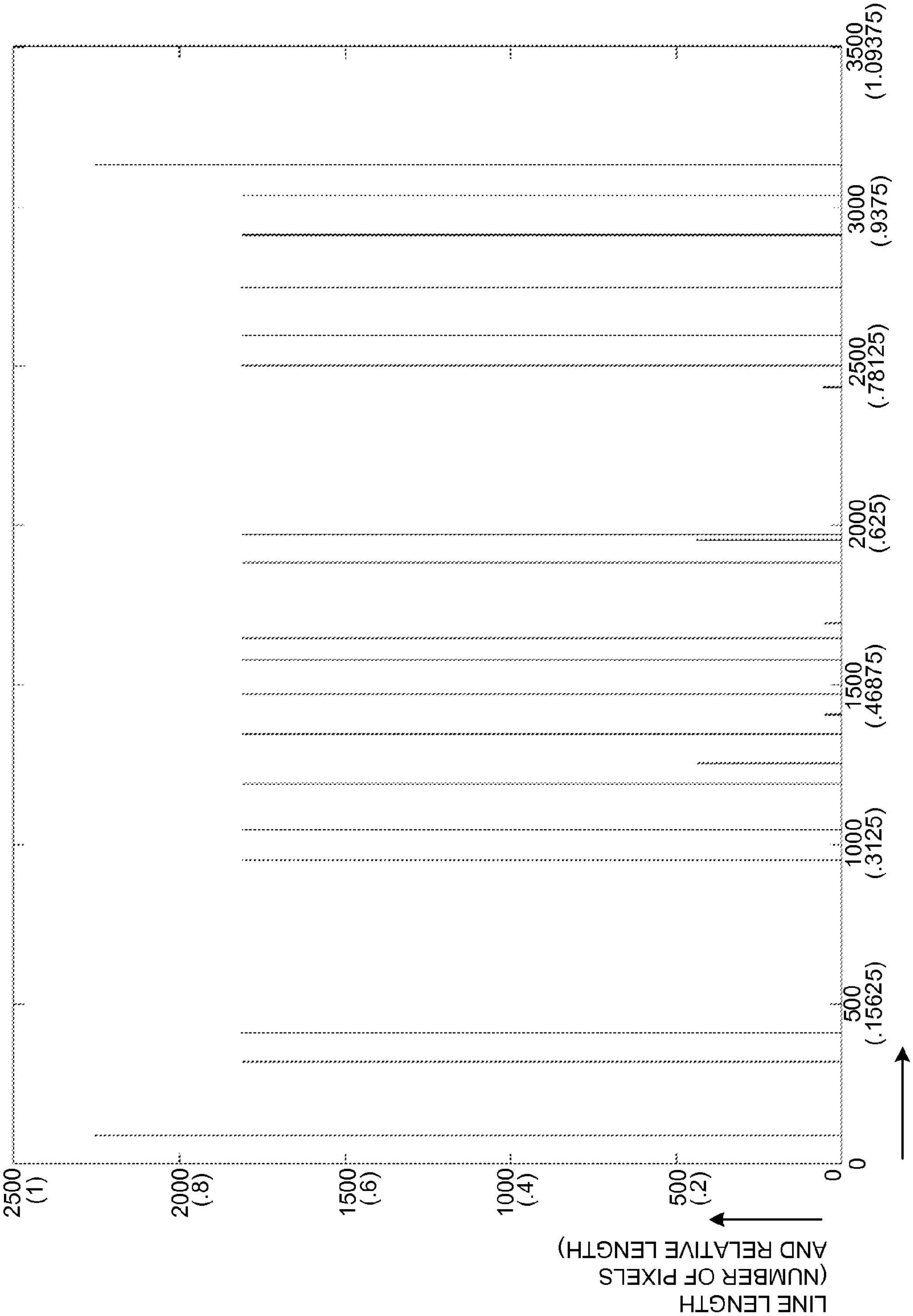
Figure 47:
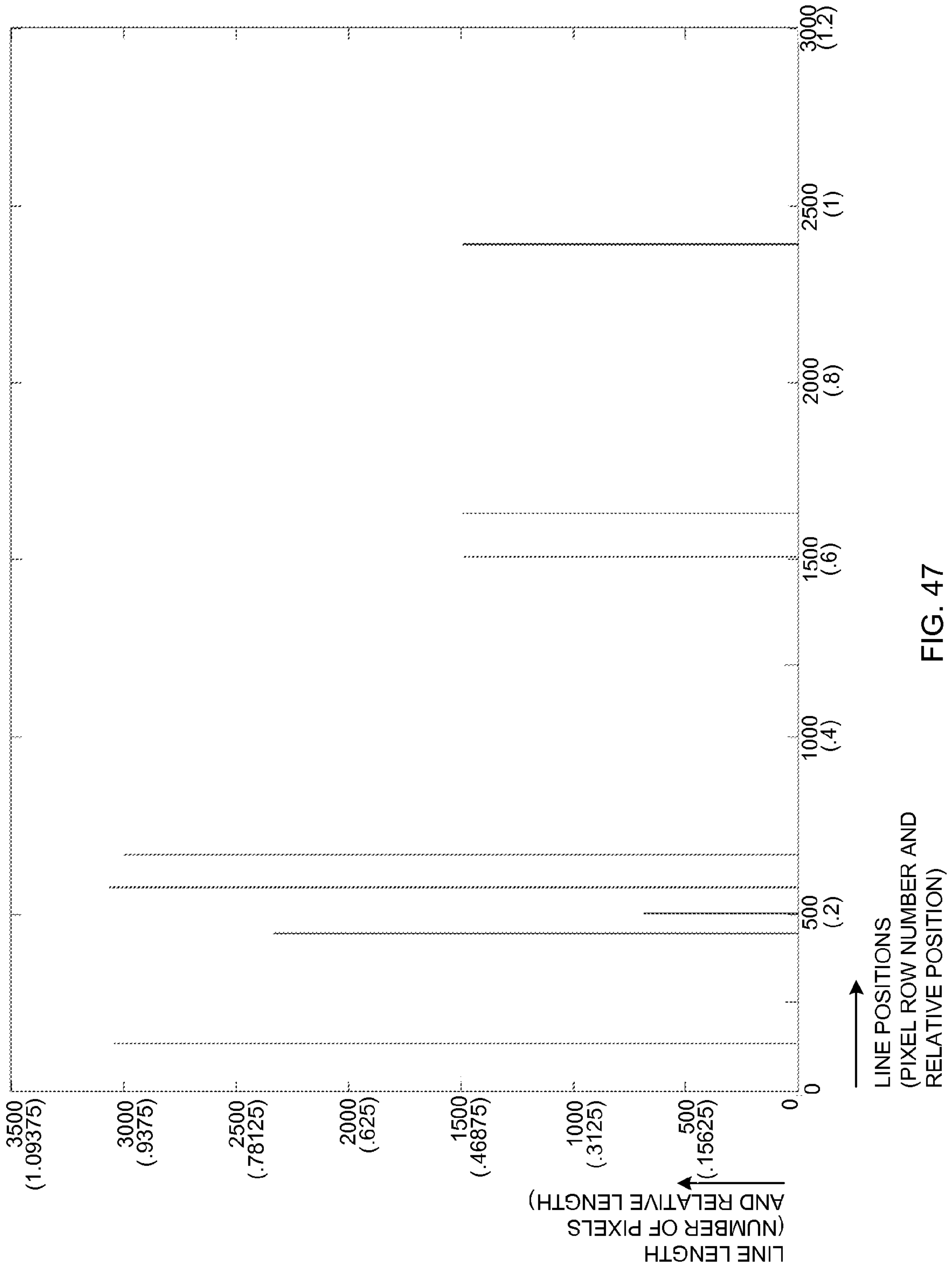

As another example, FIG. 23 depicts a form image of another transcript from Blinn College. FIG. 29 depicts the frame extracted from the form image of FIG. 23. FIG. 35 depicts the model image generated from the frame of FIG. 29. FIG. 41 depicts the vertical projection profile generated for the model image of FIG. 35, and FIG. 47 depicts the horizontal projection profile of the model image of FIG. 35. The other form images, frames, model images, vertical projection profiles, and horizontal projection profiles similarly correspond to the respective figures.

The vertical projection profiles and the horizontal projection profiles of FIGS. 36-47 identify the absolute positions of the lines (upper number of pixels along each horizontal axis) and the relative positions of those lines after normalization (lower relative position number along each horizontal axis in parentheticals). FIGS. 36-47 also identify the absolute length of each line (upper number of pixels along each vertical axis) before normalization and the relative length of each line after normalization (lower relative length number along each vertical axis in parentheticals).

FIGS. 48A-52B depict the vertical position tags arrays for each comparing form model as compared to an analyzed model. A figure number followed by an "A" designates a first part of an array, and the same figure number followed by a "B" designates the second part of the same array. With reference to FIG. 48A, the vertical position tags of the comparing form model are identified in the first row 4802 of each table. The vertical position tags for the analyzed model are identified in the second row 4804 of each table. The position tags have been correlated so that natural gaps are identified as they exist for the various tables. The third row 4806 of each table identifies the square of the analyzed model position tag subtracted from the comparing form model position tag. The Euclidean norm 4808 and the total number of line gaps 4810 for each array are specified at the end of each table.

FIGS. 53-57 depict the horizontal position tags arrays for each comparing form model as compared to the analyzed model. The horizontal position tags of the comparing form model are identified in the first row 5302 of each table. The horizontal position tags for the analyzed model are identified in the second row 5304 of each table. The position tags have been correlated so that natural gaps are identified as they exist for the various tables. The third row 5306 of each table identifies the square of the analyzed model position tag subtracted from the comparing form model position tag. The Euclidean norm 5308 and the total number of line gaps 5310 for each array are specified at the end of each table.

FIG. 58 depicts the horizontal position tags from the table of FIG. 54. However, the table of FIG. 54 included position tags for a line pattern in both the analyzed model (0.6032 and 0.6524) and the comparing form model (0.3944 and 0.444). The table of FIG. 58 eliminates the position tags for the line pattern from each model.

In the tables of FIGS. 48A-58, the model for the form image, frame, model image, and projection profiles of the transcript of FIG. 18 is model A. The model for the form image, frame, model image, and projection profiles of the transcript of FIG. 19 is model B. The model for the form image, frame, model image, and projection profiles of the transcript of FIG. 20 is model C. The model for the form image, frame, model image, and projection profiles of the transcript of FIG. 21 is model D. The model for the form image, frame, model image, and projection profiles of the transcript of FIG. 22 is model E. The model for the form image, frame, model image, and projection profiles of the transcript of FIG. 23 is model X.

The table of FIGS. 48A-48B compares model C (the comparing form model) identified by the transcript of FIG. 20 (Coastal Bend College) to model X (the analyzed model) identified by the transcript of FIG. 23 (Blinn College). The vertical position tags of FIGS. 48A-48B have been correlated by a line position correlation system so that the natural gaps between the arrays are identified. The vertical position tags for model C are identified in the first row 4802. The vertical position tags for model X are identified in the second row 4804. The square of the analyzed vertical position tags subtracted from the comparing vertical position tags are identified in the third row 4806 of the table. The calculated Euclidean norm 4808 and the total number of vertical line gaps 4810 are identified at the end of each table.

FIGS. 49A-49B depict the same process for a comparison of model A (Blinn College transcript number two) and model X (Blinn College transcript number one). FIGS. 50A-50B similarly compare model B (Cedar Valley College) to model X (Blinn College transcript number one). FIGS. 51A-51B similarly compare model D (DeVry) to model X (Blinn College transcript number one). FIGS. 52A-52B similarly compare model E (Community College of Philadelphia) to model X (Blinn College transcript number one).

The horizontal position tags similarly are compared in the tables of FIGS. 53-58. For example, FIG. 53 compares model C (Coastal Bend College) to model X (Blinn College transcript number one). The horizontal position tags have been correlated so that the natural gaps between the arrays are identified. The horizontal position tags for model C are identified in the first row 5302. The horizontal position tags for model X are identified in the second row 5304. The square of the analyzed horizontal position tags subtracted from the comparing horizontal position tags are identified in the third row 5306 of the table. The calculated Euclidean norm 5308 and the total number of horizontal line gaps 5310 are identified at the end of each table.

FIG. 54 depicts the position tags of model A (Blinn College transcript number two) compared to the position tags of model X (Blinn College transcript number one). FIG. 55 depicts the position tags of model B (Cedar Valley College) compared to the position tags of model X (Blinn College transcript number one). FIG. 55 depicts the position tags of model B (Cedar Valley) compared to the position tags of model X (Blinn College transcript number one). FIG. 56 depicts the position tags of model D (DeVry) compared to the position tags of model X (Blinn College transcript number one). FIG. 57 depicts the position tags of model E (Community College of Philadelphia) compared to the position tags of model X (Blinn College transcript number one). FIG. 58 depicts the position tags of model A (Blinn College transcript number two) compared to the position tags of model X (Blinn College transcript number one). However, in FIG. 58, the position tags for an identified line pattern have been eliminated from the arrays of both model A and model X.

Referring now to the vertical position tags comparison identified in FIGS. 48A-52B, the comparison of the models A and X identifies the smallest Euclidean norm and the smallest number of vertical line position gaps. Therefore, model A is the closest comparison to model X. Based solely on the comparison of the vertical position tags, model A matches model X.

Referring now to FIGS. 53-57, model E has the smallest Euclidean norm, and model A has the smallest number of horizontal line position gaps. Thus, there is a discrepancy between the evaluation of the horizontal position tags and the vertical position tags. However, model X includes a standardized block of text that varies in position according to the specific transcript. The model matching system identified the line pattern of the standardized block as being present in both model A and model X. The position tags for the line pattern were removed from model A and model X, and the position tags were again compared as depicted in FIG. 58. After removing the position tags for the line pattern, the Euclidean norm identified in FIG. 58 is the smallest, and the number of horizontal line position gaps is the smallest. Therefore, based on the horizontal position tags, model A is the closest matching model to model X. Model A therefore is selected as the matching model for model X. Upon reviewing the images for these models, both models are transcripts from Blinn College. See FIG. 18 (model A) and FIG. 23 (model X).

Those skilled in the art will appreciate that variations from the specific embodiments disclosed above are contemplated by the invention. The invention should not be restricted to the above embodiments, but should be measured by the following claims.

What is claimed is:

1. A computer-readable storage medium encoded with a system for identifying a form from model data identifying relative positions of vertical and horizontal lines for a plurality of form models having; dimensions normalized for a selected scale, the system comprising a plurality of modules executable by at least one processor, the modules comprising:

a preprocessing system to binarize, deskew, denoise, and despeckle an electronic form image of at least one document;

a layout extractor to extract a frame of the form image by performing a morphological opening by reconstruction on the form image, the opening using a zero degree structuring element and a ninety degree structuring element, each structuring element having a size based on an average text size of average text in the form image;

a model image generator to align, vectorize, and morphologically close the frame of the form image using the zero degree structuring element and the ninety degree structuring element to generate a model image;

a model representation system to normalize dimensions of the model image for the selected scale, to generate a vertical projection profile of the normalized model image, to determine relative positions of vertical lines of the normalized model image from the vertical projection profile, to generate a horizontal projection profile of the normalized model image, to determine relative positions of horizontal lines of the normalized model image from the horizontal projection profile, and to generate an array with the relative positions of vertical lines and the relative positions of horizontal lines; and a matching system to:

for each of the plurality of form models, align the relative positions of vertical lines of the normalized model image with closest corresponding relative positions of vertical lines of the form model;

for each of the plurality of form models, align the relative positions of horizontal lines of the normalized model image with closest corresponding relative positions of horizontal lines of the form model;

for each of the plurality of form models, compare the aligned relative positions of vertical lines of the normalized model image to the corresponding relative positions of vertical lines of the form model to determine a number of vertical line gaps between the model image and the form model, each vertical line gaps number indicating a location where at least one vertical line of the normalized model image does not have a corresponding vertical line in the form model;

for each of the plurality of form models, compare the aligned relative positions of horizontal lines of the normalized model image to the corresponding relative positions of horizontal lines of the form model to determine a number of horizontal line gaps between the model image and the form model, each horizontal line gaps number indicating, a location where at least one horizontal line of the normalized model image does not have a corresponding horizontal line in the form model;

for each of the plurality of form models, determine a first Euclidean noun between the aligned relative positions of vertical lines of the normalized model image and the corresponding relative positions of vertical lines of the form model;

for each of the plurality of form models, determine a second Euclidean norm between the aligned relative positions of horizontal lines of the normalized model image and the corresponding relative positions of horizontal lines of the form model;

determine a first smallest distance from the first Euclidean norms determine a second smallest distance from the second Euclidean norms;

determine a smallest vertical line gaps number from the vertical line gaps numbers;

determine a smallest horizontal line gaps number from the horizontal line gaps numbers; and select a particular form model from the plurality of form models, the particular form model having the first smallest distance, the second smallest distance, the smallest vertical line gaps number, and the smallest horizontal line gaps number.

2. A computer-readable storage medium encoded with a system for identifying a form from a plurality of form models identifying relative positions of vertical and horizontal lines for a corresponding normalized form image normalized for a same selected scale, the system comprising a plurality of modules executable by at least one processor, the modules comprising:

a layout extractor to extract a frame of an electronic form image;

a model image generator to align and vectorize the frame to generate a model image;

a model representation system to normalize the it image for the same selected scale, to determine relative positions of vertical and horizontal lines of the normalized model image, and to generate a model with the relative positions of vertical lines of the normalized model image and the relative positions of horizontal lines of the normalized model image; and a matching system to:

align the relative positions of vertical lines of the model with relative positions of vertical lines of at least one form model;

align the relative positions of horizontal lines of the model with relative positions of horizontal lines of the at least one form model;

determine a first Euclidean norm between the aligned relative positions of vertical lines of the model and the relative positions of vertical lines of the at least one form model;

determine a second Euclidean norm between the aligned relative, positions of horizontal lines of the model and the relative positions of horizontal lines of the at least one form model; and determine whether the at least one form model matches the model based on the first Euclidean norm and the second Euclidean norm.

3. The system of claim 2 wherein the layout extractor comprises an image labeling system to label characters in blocks of text in the electronic form image to measure each labeled character, and to calculate an average text size in the electronic form image based on the measurement of each labeled character.

4. The system of claim 3 wherein the average text size comprises at least one member of a group consisting of average size of average text height, average size of average text width, and average size of average text height and average text width.

5. The system of claim 3 wherein the average text size comprises at least one member of a group consisting of average size of text height, average size of text width, and average size of text height and text width.

6. The system of claim 3 wherein the image labeling system further is configured to consider only characters having sizes between a lower character threshold and an upper character threshold when calculating the average text size.

7. The system of claim 3 wherein the layout extractor comprises a morphological opening by reconstruction system to perform a morphological opening on the electronic form image using a zero degree structuring element and a ninety degree structuring element, each structuring element having a structuring element size based on the average text size in the electronic form image.

8. The system of claim 7 wherein the model image generator comprises a morphological closing system to perform a morphological closing on the frame after the frame is aligned and vectorized, the morphological closing using the zero degree structuring element and the ninety degree structuring element to generate the model image.

9. The system of claim 2 wherein the layout extractor comprises a morphological opening by reconstruction system to perform a morphological opening on the electronic form image using a zero degree structuring element and a ninety degree structuring element, each structuring element having a structuring element size based on an average character size in the electronic form image.

10. The system of claim 2 wherein the model representation system comprises a normalizing system to normalize the model image for the same selected scale.

11. The system of claim 2 wherein the model representation system comprises a projection profile generator to generate a vertical projection profile of the normalized model image, to determine the relative positions of vertical lines of the normalized model image from the vertical projection profile, to generate a horizontal projection profile of the normalized model image, to determine the relative positions of horizontal lines of the normalized model image from the horizontal projection profile, and to generate an array with the relative positions of vertical lines of the model and the relative positions of horizontal lines of the model.

12. The system of claim 2 wherein the model representation system comprises a model storage system to store the model with the relative positions of vertical lines of the normalized model image and the relative positions of horizontal lines of the normalized model image.

13. The system of claim 2 wherein the matching system comprises a vector measurement system to align the relative positions of vertical lines and horizontal lines of the model with the relative positions of vertical lines and horizontal lines of the at least one form model and to measure the first Euclidean norm and the second Euclidean norm.

14. The system of claim 2 wherein the matching system comprises a form model selection system to compare the first Euclidean norm and the second Euclidean norm to other Euclidean norms calculated between the model and other form models and to select the at least one form model as a matching model when the first Euclidean norm and the second Euclidean norm are smallest vertical and horizontal Euclidean norms.

15. The system of claim 2 wherein the matching system comprises a form model selection system configured compare the first Euclidean norm and the second Euclidean norm to a Euclidean norm threshold and to select the at least one form model as a matching model when the first Euclidean norm and the second Euclidean are within the Euclidean norm threshold.

16. The system of claim 2 wherein the matching system is configured to compare the first Euclidean norm and the second Euclidean norm to a Euclidean norm threshold and to eliminate the at least one model as a matching model when the first Euclidean norm or the second Euclidean norm is not within the Euclidean norm threshold.

17. The system of claim 2 wherein the matching system comprises a line pattern correspondence system to determine a line pattern in the model or the at least one form model and to eliminate particular relative positions of horizontal lines of the model and other particular relative positions of horizontal lines of the at least one form model before the second Euclidean norm is determined.

18. The system of claim 2 wherein the matching system comprises a line position correlation system to align the relative positions of vertical lines of the model with closest corresponding relative positions of vertical lines of the at least one form model and to align the relative positions of horizontal lines of the model with closest corresponding relative positions of horizontal lines of the at least one form model before the first and second Euclidean norms are determined.

19. The system of claim 18 wherein the matching system comprises a line gaps calculation system to:

compare the aligned relative positions of vertical lines of the model to the corresponding relative positions of vertical lines of the at least one form model to determine a number of vertical line gaps between the model and the at least one form model, the vertical line gaps number indicating whether at least one vertical line of the model does not have a corresponding vertical line in the at least one form model; and compare the aligned relative positions of horizontal lines of the model to the corresponding relative positions of horizontal lines of the at least one form model to determine a number of horizontal line gaps between the model and the at least one form model, the horizontal line gaps number indicating whether at least one horizontal line of the model does not have a corresponding horizontal line in the at least one form model.

20. The system of claim 19 wherein the line gaps calculation system is configured to determine whether a particular line position is within a gap threshold when compared to a comparing line position and to identify a gap for the particular line position when the comparing line position is not within the gap threshold.

21. The system of claim 19 wherein the matching system comprises a form model selection system configured to compare the first Euclidean norm and the second Euclidean norm to other Euclidean norms calculated between the model and other form models, to compare the vertical line gaps number to other vertical line gaps numbers calculated for other form models, to compare the horizontal line gaps number to other horizontal line gaps numbers calculated for other form models, and to select the at least one form model as a matching model when the first Euclidean norm and the second Euclidean norm are smallest Euclidean norms and the vertical line gaps number and the horizontal line gaps number are smallest line gaps numbers.

22. The system of claim 18 wherein the line position correlation system is configured to determine whether a plurality of line positions of the at least one form model are within a line position threshold when compared to a plurality of other line positions from the model and to determine the at least one form model does not match the model When the plurality of lines are not within the line position threshold.

23. The system of claim 2 wherein the matching system comprises a line length correlation system to correlate vertical line lengths for vertical lines of the model and corresponding vertical lines of the at least one form model, to determine a vertical line length correlation factor from the correlated vertical line lengths, to correlate horizontal line lengths for horizontal lines of the model and corresponding horizontal lines of the at least one form model, and to determine a horizontal line length correlation factor from the correlated horizontal line lengths.

24. The system of claim 23 wherein the matching system comprises a form model selection system configured to compare the first Euclidean norm and the second Euclidean norm to other Euclidean norms calculated between the model and other form models, to compare the vertical line length correlation factor to other vertical line length correlation factors calculated for other form models, to compare the horizontal line length correlation factor to other horizontal line length correlation factors calculated for other form models, and to select the at least one form model as a matching model when the first Euclidean norm and the second Euclidean norm are smallest Euclidean norms and the vertical line length correlation factor and the horizontal line length correlation factor are smallest line length correlation factors.

25. The system of claim 2 wherein the matching system comprises a form model selection system to compare the first Euclidean norm and the second Euclidean norm to other Euclidean norms calculated between the model and other form models, to weight a smallest vertical Euclidean norm greater than a smallest horizontal Euclidean norm, and to select the at least one form model as a matching model when the first Euclidean norm is the smallest vertical Euclidean norm.

26. The system of claim 25 wherein the form model selection system is configured to weight a smallest vertical Euclidean norm greater when comparing form models having a transcript form type.

27. The system of claim 2 wherein the matching system comprises a form model selection system to compare the first Euclidean norm and the second Euclidean norm to other Euclidean norms calculated between the model and other form models and to select the at least one form model as a matching model when the first Euclidean norm is a smallest vertical Euclidean norm.

28. The system of claim 2 wherein the matching system comprises a form model selection system to compare the first Euclidean norm and the second Euclidean norm to other Euclidean norms calculated between the model and other form models, to weight a smallest horizontal Euclidean norm greater than a smallest vertical Euclidean norm, and to select the at least one form model as a matching model when the second Euclidean norm is the smallest horizontal Euclidean norm.

29. The system of claim 2 wherein the matching system comprises a form model selection system to compare the first Euclidean norm and the second Euclidean norm to other Euclidean norms calculated between the model and other form models and to select the at least one form model as a matching model when the second Euclidean norm is a smallest horizontal Euclidean norm.

30. The system of claim 2 wherein the matching system comprises a line position correlation system to shift a plurality of relative positions of lines by a shift distance before determining the first Euclidean norm and the second Euclidean norm.

31. A computer-readable storage medium encoded with a system for identifying a plurality of form models comprising vertical position tags identifying relative positions of vertical lines for a corresponding normalized form image normalized for a same selected scale and horizontal position tags identifying relative positions of horizontal lines for the corresponding normalized form image normalized for the same selected scale, the system comprising a plurality of modules executable by at least one processor, the modules comprising:

a layout extractor to extract a frame of another form image;

a model image generator to align and vectorize the frame to generate a model image;

a model representation system to normalize the model image for the same selected scale, to determine first relative vertical positions of vertical lines of the normalized model image using projection profiling, to determine first relative horizontal positions of horizontal lines of the normalized model image using projection profiling, and to generate a model with first vertical position tags identifying the first relative vertical positions of vertical lines of the normalized model image and first horizontal position tags identifying the first relative horizontal positions of horizontal lines of the normalized model image; and a matching system to:

align the first vertical position tags with second vertical position tags of at least one form model;

align the first horizontal position tags with second horizontal position tags of the at least one form model;

calculate a first Euclidean norm between the aligned first and second vertical position tags;

calculate a second Euclidean norm between the aligned first and second horizontal position tags; and select the at least one form model as a matching model when the first Euclidean norm is smaller than other first Euclidean norms calculated between the first vertical position tags and other vertical position tags of other form models and the second Euclidean norm is smaller than other second Euclidean norms calculated between the first horizontal position tags and other horizontal position tags of the other form models.

32. A computer-readable storage medium encoded with a system for identifying a plurality of form models comprising vertical position tags identifying relative positions of vertical lines for a corresponding normalized form image normalized for a same selected scale and horizontal position tags identifying relative positions of horizontal lines for the corresponding normalized form image normalized for the same selected scale, the system comprising a plurality of modules executable by at least one processor, the modules comprising:

a layout extractor to extract a frame of another form image;

a model image generator to align and vectorize the frame to generate a model image;

a model representation system to normalize the model image for the same selected scale, to determine first relative vertical positions of vertical lines of the normalized model image using, projection profiling, to determine first relative horizontal positions of horizontal lines of the normalized model image using projection profiling, and to generate a model with first vertical position tags identifying the first relative vertical positions of vertical lines of the normalized model image and first horizontal position tags identifying the first relative horizontal positions of horizontal lines of the normalized model image; and a matching system to:

align the first vertical position tags with second vertical position tags of at least one form model;

align the first horizontal position tags with second horizontal position tags of the at least one form model;

calculate a Euclidean norm between at least one member of a group consisting of:

the aligned first and second vertical position tags; and the aligned first and second horizontal position tags; and select the at least one form model as a matching model when the Euclidean norm is smaller than other Euclidean norms calculated between at least one second member of a second group consisting of:

the first vertical position tags and other vertical position tags of other form models; and the first horizontal position tags and horizontal position tags of the other form models.

33. A computer-readable storage medium encoded with a system for identifying a plurality of form models comprising vertical position tags identifying relative positions of vertical lines for a corresponding normalized form image normalized for a same selected scale and horizontal position tags identifying relative positions of horizontal lines for the corresponding normalized form image normalized for the same selected scale, the system comprising a plurality of modules executable by at least one processor, the modules comprising:

a layout extractor to extract a frame of another form image;

a model image generator to align and vectorize the frame to generate a model image;

a model representation system to normalize the model image for the same selected scale, to determine first relative vertical positions of vertical lines of the normalized model image using projection profiling, to determine first relative horizontal positions of horizontal lines of the normalized model image using projection profiling, and to generate a model with first vertical position tags identifying the first relative vertical positions as a first vector and first horizontal position tags identifying the first relative horizontal positions as a second vector; and a matching system to compare the first vector to other first vectors, each other first vector having other first vertical position tags for a corresponding form model and align the first vertical position tags of the first vector with other first vertical position tags of the other first vectors, to compare the second vector to other second vectors, each other second vector having other second horizontal position tags for the corresponding form model and align the first horizontal position tags of the second vector with other second horizontal position tags of the other second vectors, and select a matching form model whose other first vector and other second vector most closely match the first vector and second vector, wherein the matching system compares the first vector to the other first vectors by calculating first Euclidean norms between the first vector and the other first vectors;

compares the second vector to the other second vectors by calculating second Euclidean norms between the second vector and the other second vectors; and selects the matching form model whose other first vector and other second vector most closely match the first vector and second vector by selecting the matching form model having a smallest first Euclidean norm from the first Euclidean norms and a smallest second Euclidean norm from the second Euclidean norms.

34. A computer-readable storage medium encoded with a system for identifying a plurality of form models identifying, relative positions of vertical and horizontal lines for a corresponding normalized form image normalized for a same selected scale, the system comprising a plurality of modules executable by at least one processor, the modules comprising:

a layout extractor to extract a frame of another form image;

a model image generator to align and vectorize the frame to generate a model image;

a model representation system to normalize the model image for the same selected scale to determine other relative positions of other vertical and horizontal lines of the normalized model image, and to generate another model identifying the other relative positions of the other vertical and horizontal lines; and a matching system to align the other relative positions of the other vertical lines of the another model to relative positions of vertical lines of the form models and align the other relative positions of the other horizontal lines of the another model to relative positions of horizontal lines of the form models to identity a matching model, wherein the matching system compares the first vector to the other first vectors by calculating first Euclidean norms between the first vector and the other first vectors;

compares the second vector to the other second vectors by calculating second Euclidean norms between the second vector and the other second vectors; and selects the matching form model whose other first vector and other second vector most closely match the first vector and second vector by selecting the matching form model having a smallest first Euclidean norm from the first Euclidean norms and a smallest second Euclidean norm from the second Euclidean norms.

* * * * *